United States Patent [19]

Thomas et al.

[11] Patent Number: 4,739,398

[45] Date of Patent: Apr. 19, 1988

[54] METHOD, APPARATUS AND SYSTEM FOR RECOGNIZING BROADCAST SEGMENTS

[75] Inventors: William L. Thomas, Arapahoe County; Steven J. Sletten, Aurora; John W. Mathews, Jr., Pine; Jeffrey C. Swinehart, Arapahoe County; Michael W. Fellinger; John E. Hershey, both of Boulder; George P. Hyatt; Robert F. Kubichek, both of Nederland, all of Colo.

[73] Assignee: Control Data Corporation, Bloomington, Minn.

[21] Appl. No.: 859,134

[22] Filed: May 2, 1986

[51] Int. Cl.$^4$ .................. H04N 17/00; H04H 9/00
[52] U.S. Cl. ............................ 358/84; 455/2; 382/16
[58] Field of Search ............ 358/84, 139, 908; 455/2, 67; 382/16, 32, 33

[56] References Cited

U.S. PATENT DOCUMENTS

| | | | |
|---|---|---|---|
| 2,330,241 | 9/1943 | Roberts | 250/20 |
| 2,630,525 | 3/1953 | Tomberlin et al. | 250/6 |
| 3,004,104 | 10/1961 | Hembrooke | 179/2 |
| 3,070,798 | 12/1962 | Currey et al. | 346/37 |
| 3,143,705 | 8/1964 | Currey et al. | 325/31 |
| 3,148,245 | 9/1964 | Currey et al. | 179/2 |
| 3,396,240 | 8/1968 | Abbey et al. | 178/69 |
| 3,415,947 | 12/1968 | Abbey et al. | 178/69 |
| 3,466,394 | 9/1969 | French | 179/1 |
| 3,700,815 | 10/1972 | Doddington et al. | 179/1 SA |
| 3,760,275 | 9/1973 | Ohsawa et al. | 325/31 |
| 3,845,391 | 10/1974 | Crosby | 325/64 |
| 3,885,217 | 5/1975 | Cintron | 325/26 |
| 3,919,479 | 11/1975 | Moon et al. | 179/1 SB |
| 4,025,851 | 5/1977 | Haselwood et al. | 325/31 |
| 4,200,861 | 4/1980 | Hubach et al. | 340/146.3 Q |
| 4,225,967 | 9/1980 | Miwa et al. | 455/68 |
| 4,227,177 | 10/1980 | Moshier | 340/146.3 R |
| 4,230,990 | 10/1980 | Lert, Jr. et al. | 455/67 |
| 4,244,029 | 1/1981 | Hogan et al. | 364/728 |
| 4,281,217 | 7/1981 | Dolby | 179/1 GN |
| 4,283,735 | 8/1981 | Jagger | 358/4 |
| 4,305,101 | 12/1981 | Yarbrough et al. | 360/69 |
| 4,390,904 | 6/1983 | Johnston et al. | 358/335 |
| 4,420,769 | 12/1983 | Novak | 358/139 |
| 4,450,531 | 5/1984 | Kenyon et al. | 364/604 |
| 4,466,122 | 8/1984 | Auerbach | 382/17 |
| 4,499,601 | 2/1985 | Matthews | 455/166 |
| 4,511,917 | 4/1985 | Köhler et al. | 358/84 |
| 4,520,404 | 5/1985 | Von Kohorn | 358/335 |
| 4,547,804 | 10/1985 | Greenberg | 358/142 |
| 4,574,304 | 3/1986 | Watanabe et al. | 358/84 |
| 4,677,466 | 6/1987 | Lert, Jr. et al. | 358/84 |

FOREIGN PATENT DOCUMENTS 161512 11/1985 European Pat. Off. ............ 358/84

OTHER PUBLICATIONS

"Television Video Recognition System Documentation".
"TV Sources on the Sage 68000".
Various Computer Program Listings and Other Documents, (pertaining to items 1 and 2, above).
"Television Signal Processor", report by David Schmidling, dated Feb. 20, 1985.

Primary Examiner—Keith E. George
Attorney, Agent, or Firm—Laurence S. Rogers; Jeffrey H. Ingerman

[57] ABSTRACT

A method, apparatus and system are provided for recognizing broadcast segments, such as commercials, in real time by continuous pattern recognition without resorting to cues or codes in the broadcast signal. Each broadcast frame is parametized to yield a digital word and a signature is constructed for segments to be recognized by selecting, in accordance with a set of predefined rules, a number of words from among random locations throughout the segment and storing them along with offset information indicating their relative locations. As a broadcast signal is monitored, it is parametized in the same way and the library of signatures is compared against each digital word and words offset therefrom by the stored offset amounts. A data reduction technique minimizes the number of comparisons required while still maintaining a large database.

47 Claims, 18 Drawing Sheets

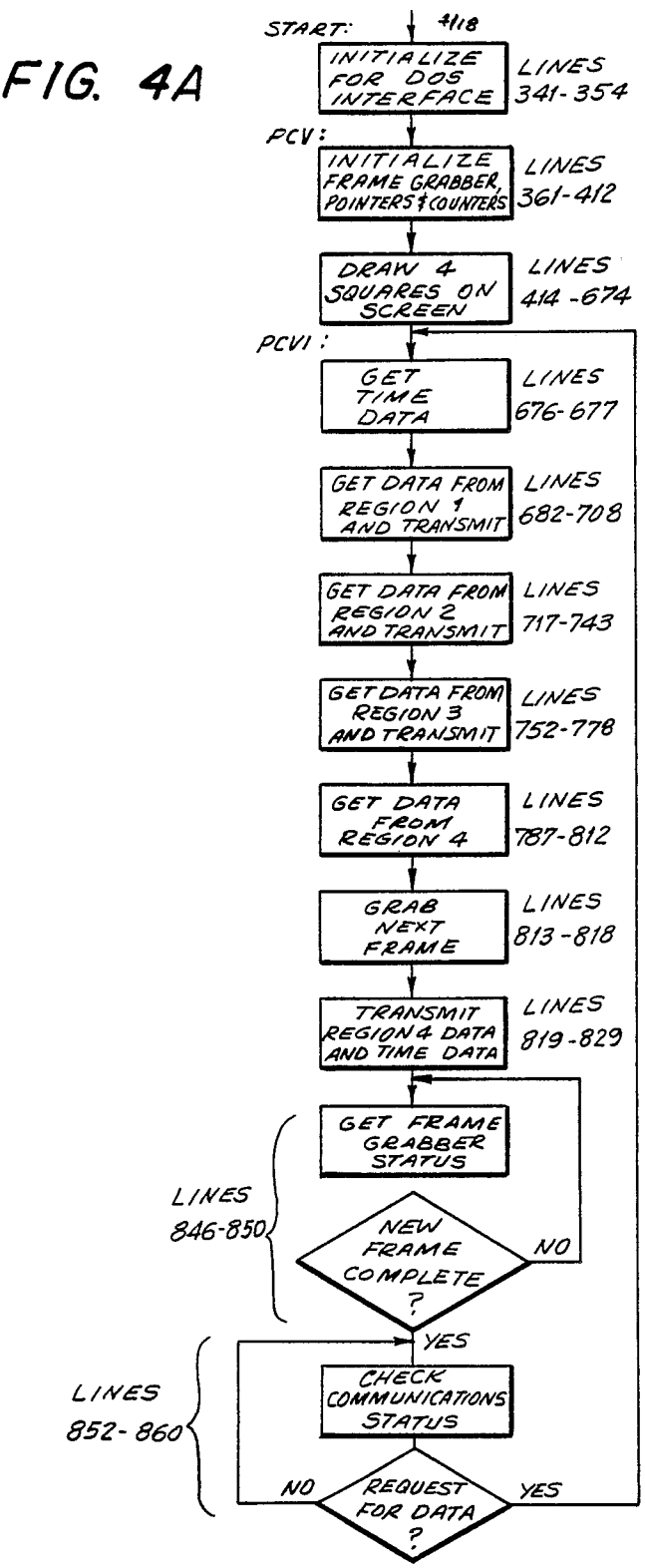

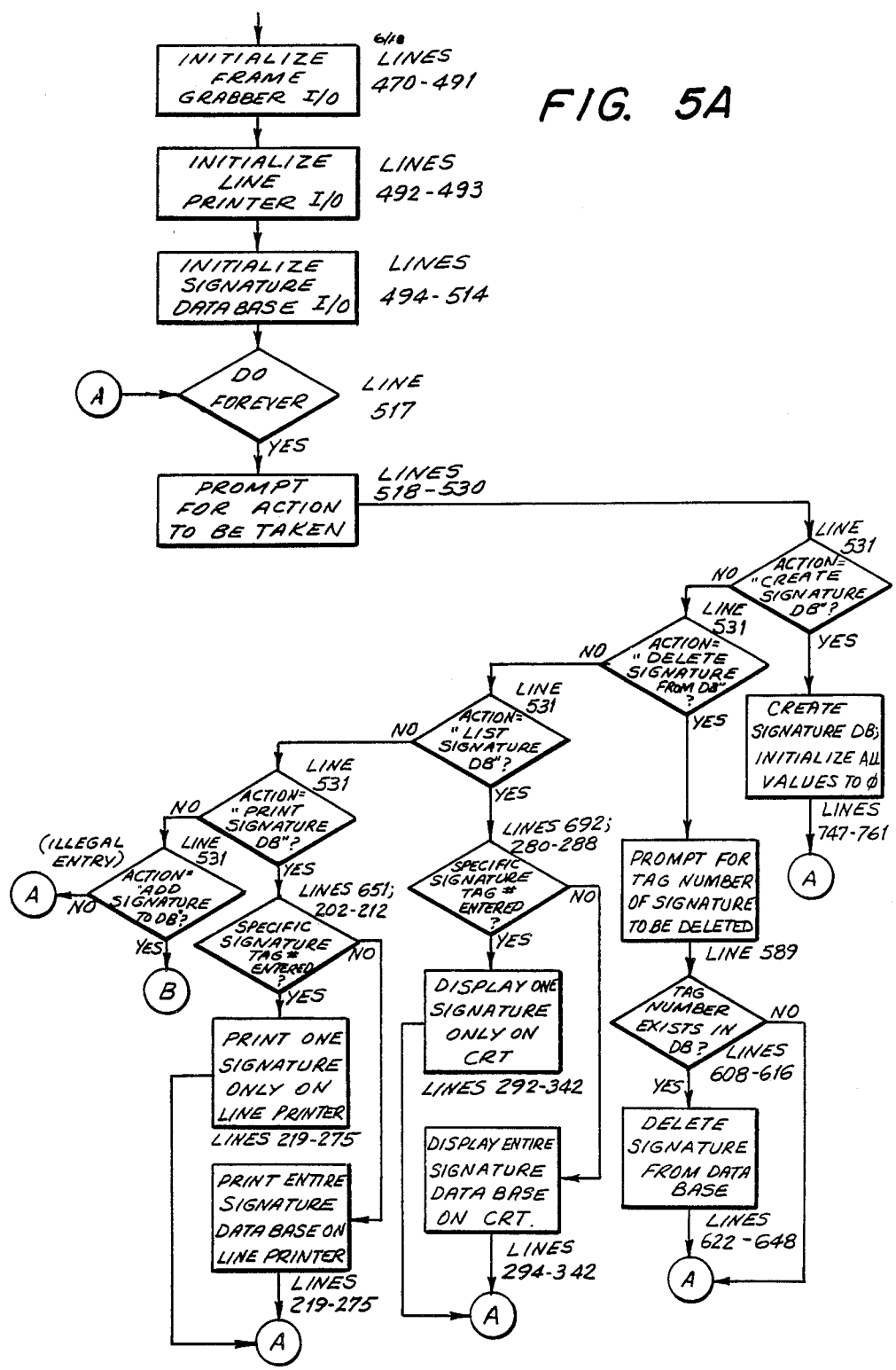

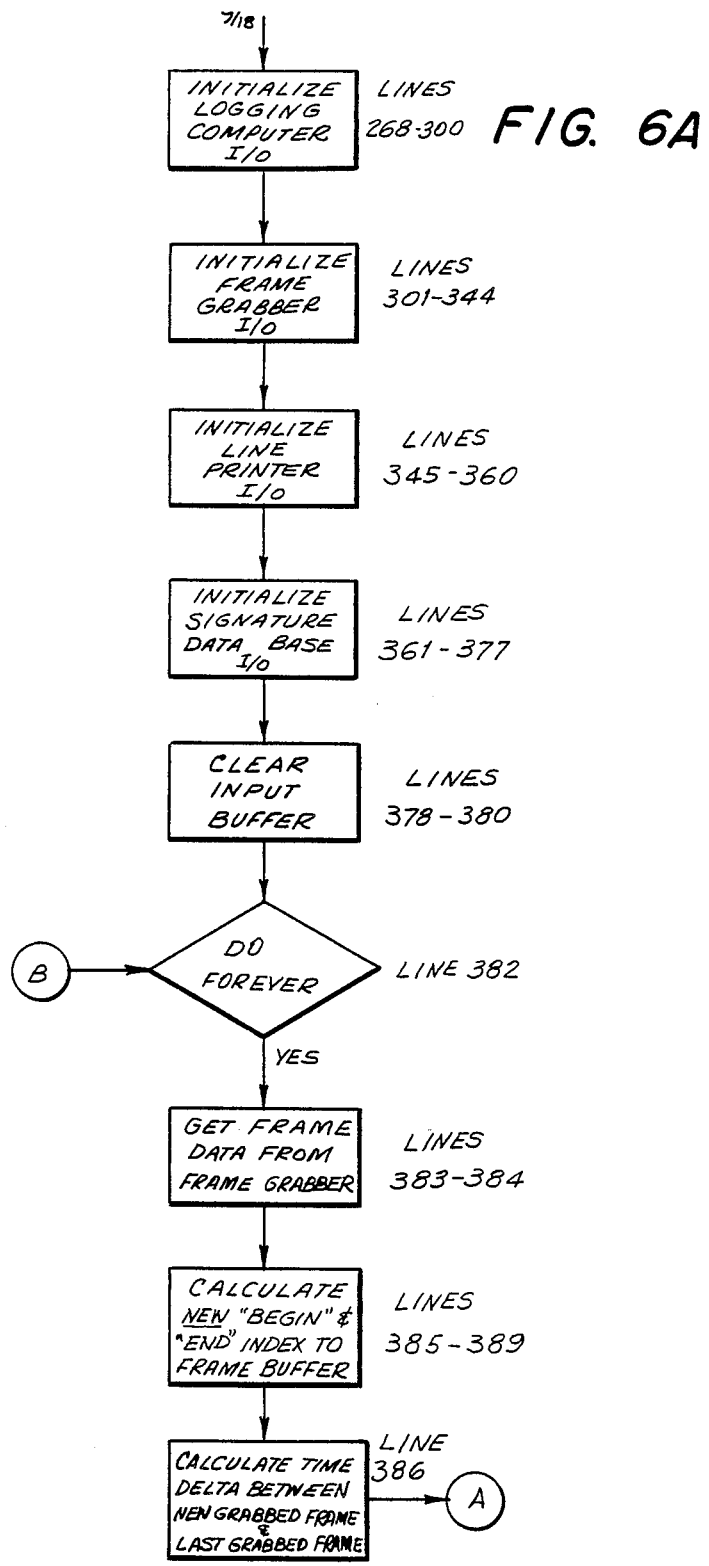

4,739,398

METHOD, APPARATUS AND SYSTEM FOR RECOGNIZING BROADCAST SEGMENTS

BACKGROUND OF THE INVENTION

This invention relates to the automatic recognition of broadcast segments, particularly commercial advertisements broadcast by television stations.

Commercial advertisers are interested in log data showing when various commercials are broadcast on radio or television. This interest stems both from a desire to confirm that broadcast time paid for was actually provided and from an interest in monitoring competitors' advertising strategies.

It would be advantageous to be able to provide an automated method and system for logging commercial broadcast data which does not rely for recognition on the insertion of special codes in the broadcast signal or on cues occurring in the signal.

It is also desirable to provide such a method and system which can identify large numbers of commercials in an economic and efficient manner in real time, without resorting to expensive parallel processing or to the most powerful computers.

SUMMARY OF THE INVENTION

It is an object of this invention to provide an automated method, apparatus and system for logging commercial broadcast data which does not rely for recognition on the insertion of special codes or on cues occurring in the signal.

It is another object of this invention to provide such a method, apparatus and system which can identify large numbers of commercials in an efficient and economic manner in real time, without resorting to expensive parallel processing or to the most powerful computers.

In accordance with the method and apparatus of this invention, real-time continuous pattern recognition of broadcast segments is accomplished by constructing a digital signature from a known specimen of a segment which is to be recognized. The signature is constructed by digitally parametizing the segment, selecting portions from among random frame locations throughout the segment in accordance with a set of predefined rules (i.e, different frames are selected for each segment, but the selection is always based on the same criteria) to form the signature, and associating with the signature the frame locations of the portions. The signature and associated frame locations are stored in a library of signatures. Each signature in the library is identified with a particular segment to be recognized. A broadcast signal is monitored and digitally parametized. For each frame of the parametized monitored signal, the library is searched for any signature that may be associated with that frame. Using the frame information stored with the signature, each of the potentially associated stored signatures is compared to the appropriate frames of the parametized signal. If a stored signature compares with the monitored data, a match is declared and the broadcast segment is identified using identification data associated with the signature.

In another embodiment of a method and apparatus according to the invention, a digital keyword derived from a designated frame in the parametized segment is identified as associated with the segment signature, but the association of that keyword with a particular segment signature is nonexclusive—i.e., the same keyword can be associated with more than one signature. A plurality of additional frames is selected from among random frame locations throughout the segment in accordance with a set of predefined rules and, in a library of signatures, the keyword representing the designated frame and the words representing the additional frames are stored together with the offsets of the additional frames relative to the designated frame. A broadcast signal is monitored and digitally parametized. For each monitored digital word of the parametized monitored signal, the library is searched for any signature associated with a keyword corresponding to that monitored word, and the additional words of any such signature are compared with those words of the parametized monitored signal which are separated from the monitored word by the stored offset amounts. If the stored signature compares with the monitored data, a match is declared and the broadcast segment is identified using identification data associated with the signature data.

A system according to the invention additionally has means for detecting the occurrence of artifacts within the monitored signal characteristic of potential unknown broadcast segments to be recognized, and means for classifying and identifying such potential unknown segments. One embodiment of such a system includes a plurality of local sites in different geographic regions for monitoring broadcasts in those regions, and a central site linked to the local sites by a communications network. Each local site maintains a library of segment signatures applicable to its geographic region, and each has at least means for performing the storing, monitoring, searching, comparing and detecting tasks described above. The central site maintains a global library containing all of the information in all of the local libraries. Classification and identification of potential unknown segments involves the generation at the local site of compressed audio and video information, a temporary digital signature, and parametized monitored signal information for a potential unknown segment not found in the library of the local site. At least the parametized monitored signal information and the temporary signature are transmitted to the central site over the communications network. At the central site, the temporary signatures, which are stored in a special portion of the global library, are searched, and the signatures stored in the main portion of the global library are also searched, and are compared with the transmitted parametized monitored signal information to determine if the potential unknown segment was previously received by another local site and is therefore already known to the system. If so, and if a global signature has already been generated, the temporary signature at the originating local site is replaced with the previously generated global signature. Like potential unknown segments not found in the main portion of the global library are grouped together. Compressed audio and video for at least one of the segments in the group is requested from the local site and an operator at the central site plays it back to classify and identify it. After the operator has identified the segment, the system automatically constructs a signature which is added to the global library and to the appropriate local libraries.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 4A and 4B are a flowchart of a software program used in the system of FIG. 3;

FIGS. 5A, 5B and 5C are a flowchart of a second software program used in the system of FIG. 3;

FIGS. 6A and 6B are a flowchart of a third software program used in the system of FIG. 3;

DETAILED DESCRIPTION OF THE INVENTION

I. Theory of Preferred Operation

Figure 1:
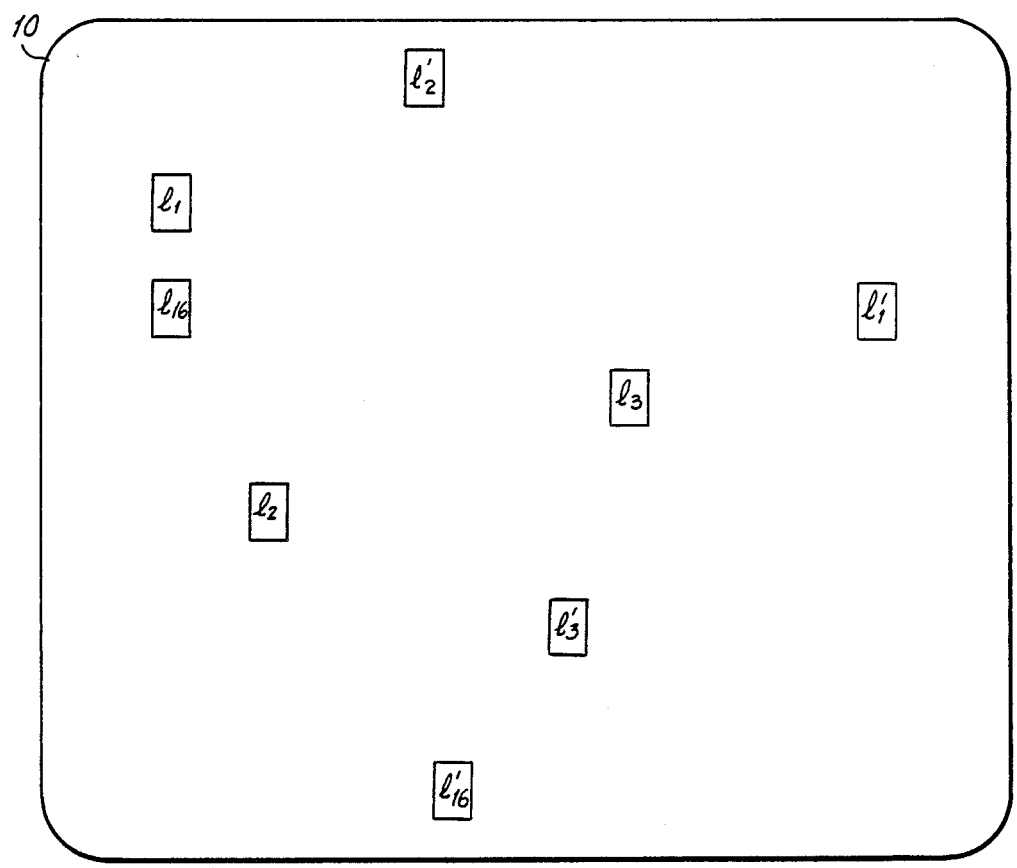
FIG. 1 is a diagrammatic representation of the areas of a video frame sampled to derive parametized signal data.

The present invention can identify a segment of a broadcast signal by pure continuous pattern recognition on a real-time basis. No codes need be inserted into the broadcast signal prior to transmission and no "cues" or "signalling events" (e.g., fades-to-black or scene changes) that occur in the broadcast need be used in the recognition process. The broadcast signal can be either a radio broadcast, for which audio information is obviously used for the recognition process, or a television broadcast, for which audio information, video information, or both, can be used, and can be an over-the-air signal, a cable television signal, or a videotape signal.

Whether audio or video information is used, the broadcast signal is parametized to yield a digital data stream composed, preferably, of one 16-bit digital word for every 1/30 of a second of signal. (In the case of audio information associated with video information, the audio data is synchronized with the video frame rate to form an "audio frame".) The information is then processed in the same way whether it originated as audio or video.

A digital signature is constructed for each segment to be recognized. The construction of the signature is discussed in more detail below. However, it preferably comprises 128 bits representing eight 16-bit words corresponding to eight frames of signal information selected from among random frame locations throughout the segment in accordance with a set of predefined rules.

The incoming audio or video signal is digitized and parametized to yield, preferably, a 16-bit digital word for each frame of data. This also is discussed in more detail below. As the incoming signal is received, it is read into a buffer which holds, e.g., two minutes of signal data. Each word of this data is assumed to be the first word of an eight-word signature. Associated with each word of the signature is offset information indicating the spacing (i.e., the number of frames) between each such word and the first signature word. As each received word reaches a predetermined observation point in the buffer, the library of signatures of known segments to be recognized is searched for signatures beginning with that word. Using the offset information stored with the signatures, subsequent received words, already in the buffer, are compared to the remaining signature words to determine whether or not they match those remaining words of the signature.

In order for the method to operate in real time, all library comparisons must be made in the time that a received word remains at the observation point. Because a television frame lasts 1/30 second, all comparisons for a given received word must take place within 1/30 second. If every segment signature in the library must be compared to the incoming frame signature data every 1/30 second, current computer speeds would allow comparison to only a few thousand library signatures. This would place an upper limit on the number of segments whose signatures can be stored in the library and the number of broadcast segments (e.g., commercials) which could be monitored without using expensive parallel processors or very powerful computers.

In the United States, however, as many as 500 different commercials may be playing within a market region at any given time. Assuming a market having 6 stations to be monitored, in the aggregate there may be as many as 4,000 or more occurrences of these commercials each day. Moreover, as many as 40,000 different commercials may be airing nationwide at any given time, and as many as 90,000 or more new commercials may be introduced nationwide each year. Accordingly, it is desirable that the system of the invention be capable of comparing, in real time, incoming frame signature data to many tens of thousands of segment signatures representative of as many different commercials.

The number of signatures that can be stored and searched within the real-time limitation of 1/30 second and, hence, the number of broadcast segments which can be monitored can be increased to several hundred thousand using a designated frame keyword lookup data reduction method. Using such a method, when a signature is constructed for a known segment, one frame from the segment is chosen, using criteria to be discussed below, as the key frame, its digital parametized equivalent becoming the keyword. The signature is still, preferably, eight 16-bit words, but the stored offset information now represents spacing from the keyword rather than from the first signature word. The keyword can be one of the signature data words, in which case the offset for that word is zero, or it can be a ninth word. The keyword also need not temporally precede all of the other signature words and often will not. If 16-bit words are used, there can be $2^{16}$, or 65,536, possible keywords. Signatures are thus stored in a lookup table with 65,536 keys. Each received word that reaches the observation point in the buffer is assumed to be a keyword. Using the lookup table, a small number of possible signatures associated with that keyword are identified. As discussed below, one of the selection criteria for keywords is that on average four signatures have the same keyword. Typically, then, four signature comparisons would be the maximum that would have to be made within the 1/30 second time limit, assuming no data errors in the received signal. Four signatures multiplied by 65,536 keys yields 262,144 possible signatures for the system, meaning that the system has the capability of identifying in real time any of that number of broadcast segments.

Whether or not the designated frame keyword lookup technique is used, the present invention need not rely during the recognition process on any cues, signalling events or pre-established codes in the broadcast signal. It simply monitors the incoming signal and performs continuous pattern recognition.

Video information is parametized and digitized as described below. Although, in the description which follows, parametization is based upon signal luminance, it is to be understood that other or additional attributes of a video signal could be used for this purpose.

A number of areas, preferably 16 (although more or fewer areas may be used), of the video field or frame are selected. The size of each area is preferably eight-by-two pixels, although areas of other sizes could be used. The luminance of each area is averaged to produce an absolute gray scale value from, e.g., 0–255. This value is normalized to a bit value of 0 or 1 by comparing the value to one of the following:

1. The average luminance of the entire field or frame;
2. The average luminance of some other area of the field or frame;
3. The average luminance of the same area in some previous field or frame; or
4. The average luminance of some other area of some previous field or frame.

The goal in selecting which comparison to make is to maximize entropy—i.e., to minimize correlation between the areas. (Correlation refers to the degree to which the luminance value of one area is related to or follows that of another area.) For this reason, the fourth comparison, above, is preferred, with the previous frame being one to four frames behind the current frame. For the same reason, the distribution of the sixteen areas in the field or frame, as well as the sixteen areas in the previous field or frame, is preferably asymmetrical about the center of the field or frame, because it has been empirically determined that video frames are composed in such a way that there is too much correlation between symmetrically located areas.

A sample partial distribution of areas within a frame is shown in FIG. 1. Frame 10 is actually a video field of sampled pixels. (Hereinafter, "frame" will be used to mean either field or frame.) The luminance areas $l_n$ (n=1–16) (not all sixteen shown) are the areas used for determining the parametized digital word for the current frame. The luminance areas $l_n'$ (n=1–16) (not all sixteen shown) are areas whose values are held for use as the "previous frame" data for a later frame.

Whatever comparison is used, a bit value of 1 is returned if the luminance of the area in question exceeds the luminance of the comparison area. If the luminance of the area in question is less than or equal to the luminance of the comparison area, a bit value of 0 is returned. (It is to be understood that here, and in the discussion that follows, the assignments of ones and zeroes for data and mask values can be reversed.) By normalizing the data in this way, offset and gain differences between signals transmitted by different stations or at different times (caused, e.g., by different transmitter control settings), are minimized. The sixteen values thus derived create a parametized "frame signature".

A 16-bit mask word is created along with each 16-bit frame signature. The mask word represents the reliability of the frame signature. For each bit in the frame signature, if the absolute value of the luminance difference used to calculate that bit value is less than a threshold or "guard band" value, the luminance value is assumed to have been susceptible to error (because of noise in transmission), and so the mask bit for that bit is set to 0, indicating suspect data. If the absolute value of the luminance difference is greater than or equal to the guard band value, the luminance value is assumed to be much greater than the noise level and the corresponding mask bit is set to 1, indicating reliable data. As discussed below, the number of ones or zeroes in the mask word is used in generating segment signatures and setting comparison thresholds.

An audio "'frame' signature," if such a signature is used, can be constructed in the same format as a video frame signature so that it can be processed in the same way. Such an audio signature may be used to recognize broadcast radio segments, or may be used to confirm the identification of a video segment the data for which includes a high percentage of suspect data. However, the use of audio signatures is not necessary to the invention.

The parametized "frame signature" information is stored in a circular buffer large enough to hold, preferably, approximately twice as much signal information as the longest broadcast segment to be identified. When a segment signature is being compared to the frame signature data, for each frame that passes the observation point eight comparisons between the segment signature data and the frame signature data are made, one word at a time, using the offset data stored with the segment signature to choose the frame signatures for comparison. The frame signature and segment signature words are compared using a bit-by-bit exclusive-NOR operation, which returns a 1 when both bits are the same and a 0 when they are different. The number of ones resulting from the exculsive-NOR operation is accumulated over all eight word comparisons. It is not necessary actually to construct a "parameter signature", by in fact concatenating the offset parametized frame signature words, in order to make the comparison. If the number of ones accumulated by the exclusive-NOR operation exceeds a predetermined default threshold, modified as discussed below, a match is considered to have occurred for the frame at the observation point.

Signatures are assigned to segments as follows:

A plurality, preferably eight, words are selected from the parametized segment meeting the following criteria: stable data, noise-free data, Hamming distance, and entropy.

Stable data means the word selected must have some minimum duration in the broadcast segment—i.e., it is derived from a portion of the segment for which there are at least a minimum number of (e.g., 20 or more) frames of the same or similar data).

Noise-free data are data having an associated mask word with a maximum number of unmasked bits. (Maximization of duration or stability, and minimization of masked bits or noise, can be two competing criteria.)

Hamming distance refers to the dissimilarity of the digital data. It is desirable for more positive and reliable identification of broadcast segments that a signature for one broadcast segment differ from that for another broadcast segment by at least a minimum number of bits, known as the Hamming distance. In generating the second or any subsequent signature in the database, Hamming distance from existing signatures must be considered.

Entropy refers to the desirability, discussed above, of having the minimum possible correlation between different portions of the data. For this reason, given the preferred signature data length (8 words, 16 bits per word), preferably no two signature words should be taken from points closer together in the segment than one second. This sets a lower limit on the length of broadcast segments which can be be reliably recognized. If, e.g., eight words make up a signature, and they must be at least one second apart, the shortest segment that can be reliably recognized is a segment of approximately ten seconds in length.

Using these criteria, eight frame signatures are selected from the parametized segment and an eight-word segment signature made up of those eight frame signatures is generated and stored. The duration criterion and mask words are also stored with the segment signature for use in the recognition process. The duration parameter signifies that, because the frame data are stable for some time period, a certain number of successive matches on that data should be obtained during the recognition process. If significantly more or fewer matches are obtained, the matches are discarded as statistical anomalies. The mask data define a threshold parameter which is used during the recognition process to adjust the default number of matching bits required before a signature is considered to have matched the broadcast data. For example, a default threshold could be set for the system which, during an attempt to match a particular segment signature, is lowered by one-half the number of masked bits associated with that signature.

If the designated frame keyword lookup technique is to be used, a keyword is chosen from within the segment. Having a buffer at least twice as long as the longest segment to be identified assures that sufficient broadcast signal history to make a recognition remains in the buffer at the time the keyword reaches the observation point. The criteria used for choosing the keyword are similar to those for choosing the signature words—it should be of stable duration and relatively noise free, augmented by the need for a "level listing"—i.e., there should be no more than about four signatures having the same keyword so that the necessary computations can be made within the the 1/30 second real-time limit.

Although using the keyword technique requires that in general only four comparisons need be made (because there are up to four signatures assigned to each keyword), additional comparisons are made to allow for the possibility of error in the parametization of the broadcast signal (occurring, e.g., because of noise in the transmission of the signal). Such additional comparisons lessen the probability of inaccurately recognizing a broadcast segment. If an error rate of one bit per frame signature is assumed, then in addition to the nominal keyword, sixteen additional keywords (obtained by successively complementing each different bit of the nominal keyword) are also checked. If each of the seventeen keywords checked has four signatures associated with it, then sixty-eight comparisons must be made within each 1/30 second interval. If an error rate of two bits per frame signature is assumed, then the number of keywords increases to $$\sum_{i=0}^{16} () = 137.$$

requiring 548 comparisons. Given the current state of computer technology, this is still possible within the 1/30 second interval.

Before a signature can be constructed for a segment for addition to the segment signature data base, it must be determined that a broadcast segment is being received. In some cases, new segments may be played into the system manually—e.g., where an advertiser or advertising agency supplies a video tape of a new commercial or commercials. In such a case, the operator and the system know that this is a new segment, the signature for which is not yet stored in the segment signature library. However, it can happen that a new commercial is broadcast by a local broadcast station for which no videotape was earlier supplied and which, therefore, is not yet known to the system. Therefore, the present invention also can detect the presence in the incoming signal of potential segments to be recognized that are new and presently unknown. For this purpose only (i.e., to detect but not to recognize), the present invention relies on the presence in the broadcast signal of signal artifacts characteristic of such potential unknown segments. These artifacts can include fades-to-black, audio power changes including silence ("audio fade-to-black"), and the presence (but not the content) of pre-encoded identification data appearing, e.g., in the vertical intervals of video signals. These artifacts are not assumed to indicate the presence of a new, unknown segment to be recognized per se. Rather, they are used as part of a decision-making process. For example, if two artifacts occur 30, 60 or 120 seconds apart near the hour or the half-hour, and no known segment was identified during the time between their occurrence, there is a high probability that a new and unknown segment of interest was present. On the other hand, if the interval between signal artifacts is accounted for by identified segments, the artifacts are not used or otherwise relied upon by the system and the fact that the artifacts occurred is deleted from memory. Other possible indications of the presence of new and unknown segments of interest are the occurrence of two known segments separated by 30, 60 or 120 seconds, or some other interval during which no known segments were identified, or the occurrence of one signal artifact separated in time from a known segment by such an interval. Once it is determined that a new and unknown segment of interest may be present, the parametized information derived from the unknown segment is saved along with audio and video information corresponding to the unknown segment. The signal artifacts that marked the unknown segment are not retained, nor is any record kept of what they were.

The saved audio and video information is ultimately presented, in compressed form (as discussed below), to an operator for use in identifying the new and unknown segment and recording the identification in the segment signature library. The operator also records any special requirements needed to prepare a signature for the segment. For instance, some national commercials include two portions: a portion which is always the same irrespective of in which part of the country the commercial is to be broadcast (the "constant" portion), and a portion which differs depending on where the commercial is to be broadcast (the "variable" or "tag" portion). It is important to accurately identify different versions of such national commercials. If a commercial for a national product has a tag that is specific to one region, the commercial is considered different from the same commercial tagged for a different region. Therefore, the operator would note that the signature must include data from the tag portion of the segment, and that additional data must be taken from the tag. A signature is then generated automatically as described above.

The ability to differentiate between otherwise identical commercials having differing tags is one important feature of this invention. Two different approaches are used, depending on the type of tag associated with the commercial. One type of tag is known as a "live tag", which is a live-action audio/video portion of at least five seconds duration. Another type of tag is known as a "still tag" which is a still picture—e.g., of text—which has insufficient video content for generating a unique signature. Either type of tag can occur anywhere in the commercial.

When a live tag is involved, a separate signature is generated for the tag. The system logs both the commercial occurrences and the tag occurrences, and then merges that data with the help of pointers in the signature database. For a still tag, a flag or pointer associated with the commercial signature triggers a brute force video comparison of a frame of the tag with a frame of the reference tag or tags. This comparison is not necessarily done in real time.

A system constructed in accordance with the present invention is preferably composed of one or more local sites and one central site. Utilizing the recognition methods described above, a local site scans one or more broadcast video and audio television signals looking for known broadcast segments. If a known segment is detected, the local site records time and date information, the channel being monitored, the identification of the segment, and other information in its database. Relying on signal artifacts, the local site also notes and records signals that it senses are likely to be new segments of interest which are not yet known to the system.

On a periodic basis, the central site communicates, e.g., via telephone lines, with the local sites to determine what known broadcast segments have been detected and what potential but unknown segments have been seen and saved, and to disseminate to appropriate local sites segment signature and detection information corresponding to new broadcast segments not yet known to those local sites. It is anticipated that the ultimate identification of a new and unknown segment will require visual or aural interpretation by a human operator at the central site.

Figure 2:
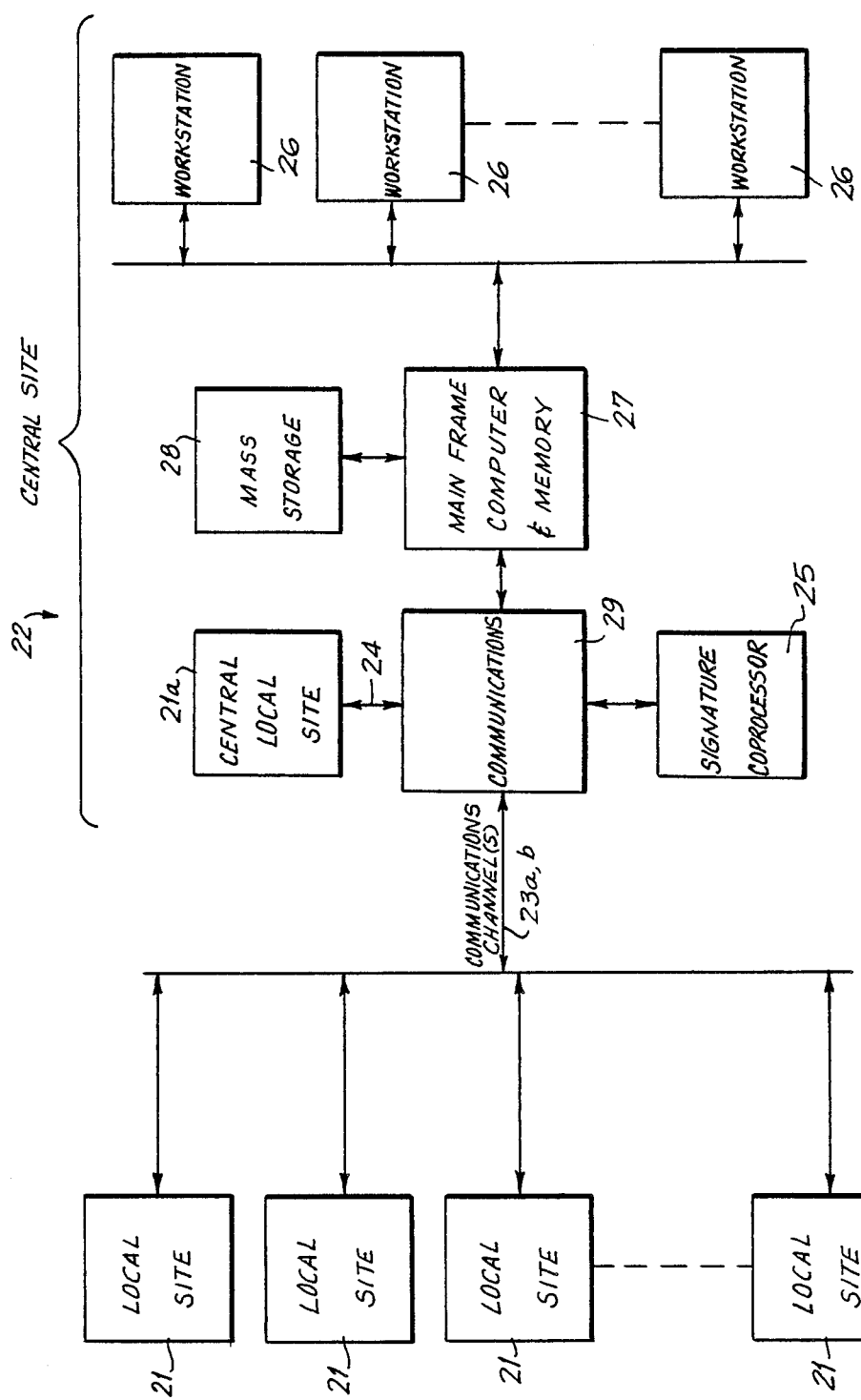
FIG. 2 is a block diagram of a system according to the invention.

FIG. 2 illustrates a block diagram of the system including a central site 22 and a plurality of linked local sites 21. Each local site 21 monitors broadcasting in its geographic region. Preferably, the local sites 21 are located at cable television head end stations to assure a clear input signal. The local site 21 is capable of recognizing and identifying known broadcast segments and logging occurrences of such segments by date, time, duration, channel, identification, and other desirable information. The local site is also capable of recognizing the occurrence of potentially and new unknown segments, and of generating temporary key signatures for such unknown segments so that it can maintain a log of all occurrences of each such segment pending the identification of the segment by the central site 22. Local site 21 sends to central site 22 via communications channels 23a, b all log information for recognized known segments, plus information relating to all potential new and unknown segments, and receives in return software updates, signature library updates, and requests for additional information. If a new signature transmitted to and received by one local site 21 originated as an unknown segment originally transmitted to the central site by that local site 21, the local site 21 merges the temporary log into other data awaiting transmission to central site 22, and then purges the temporary signature from its database.

One local site 21a is located at or near the central site 22 and is connected to the remainder of central site 22 by a high-speed direct data line 24. This "central-local" site is identical to the other local sites 21 and serves the same function as the other local sites 21 for the broadcast market in which it and central site 22 are located. However, because central-local site 21a is connected to central site 22 by direct high-speed data link 24, new segments monitored by central-local site 21a are quickly available to central site 22 for identification. The signatures for those new segments that are of national scope can then be quickly disseminated to the remote local sites 21 to minimize the number of times a local site 21 will classify a received segment as an unknown, and thereby to prevent communications channels 23a, b from being burdened unnecessarily with the transmission of signature and other data (compressed audio and video) corresponding to locally unknown national segments.

Because the audio and video information corresponding to new and unknown segments must be transmitted to the central site 22 via communications channels 23a, b to be reviewed by an operator during the identification process, the data is gathered by local site 21 in a compressed format to reduce communications overhead and expense.

Compression of the video data preferably is accomplished as follows. First, not every frame is captured. Preferably, only one frame every four seconds is captured to create a "slide show" effect, with an option at the request of an operator at central site 22 to capture frames more frequently. Second, as is well known, a television video frame consists of two interlaced fields occurring 1/60 second apart. In the "slide show", small motion between the fields causes a noticeable flicker. Therefore, only one field is captured, which still provides a recognizable image. Third, not all pixels are necessary for a sufficiently recognizable image. It has been found that 160×120 pixels is sufficient, with an option at the request of an operator at central site 22 to capture 320×240 pixels per field. Fourth, it is not necessary to capture color information.

Audio compression is more difficult to accomplish. Considerable information can be removed from video data while still maintaining a recognizable image. However, only a smaller amount of information can be removed from audio data without the remaining audio becoming difficult or impossible to understand, or unacceptably fatiguing for human operators. In view of this, the preferred method of audio compression is Adaptive Differential Pulse Code Modulation (ADPCM), which is used by the telephone industry and thus produces "telephone quality" audio. ADPCM techniques and circuitry are well known.

When local site 21 detects a potentially new and unknown broadcast segment, the frame signature data and the temporary segment or key signature generated for that unknown segment, and the compressed audio and video information for that segment, are stored. The local site 21 is polled periodically by central site 22 and at those times the stored frame signature data and the temporary signatures are transmitted to central site 22 for identification via communications channels 23a, b. As discussed below, the audio and video information are transmitted optionally, but these data are always stored by local site 21 until the identification and signature of the segment are returned by the central site 22.

When central site 22 receives the frame signature data and temporary key signature corresponding to an unknown segment from the local site 21, signature compressor 25 associated with central site 22 first checks the frame signature data against the global signature database, which contains all signatures from all local databases for all broadcast segments known to the system, to determine whether or not the "unknown" segment in fact previously had been identified and is already known to the system (perhaps because a different local site saw the broadcast segment before), but the signature for which had not yet been sent to all local sites 21 or had been identified as being of limited geographic scope and so sent to only some of local sites 21. If the unknown frame signature data match a signature in the global database, the global signature for that segment (which may differ somewhat from the temporary signature) is transmitted back to the originating local site, and the originating local site 21 is instructed to replace the temporary key signature generated locally with the global key signature. If the frame signature data are not matched to a signature in the global database, the corresponding temporary key signature is added to a separate portion of the global database used to store temporary signatures. This "temporary global data-base" allows coprocessor 25 to carry out the grouping of like unknowns, previously discussed, because if the same unknown comes in from another local site 21 it should be matched by the temporary signature stored in the global database, thereby indicating to coprocessor 25 that it is probably the same segment which has already been sent by another local site 21.

At the same time that the temporary signature for a new segment is stored by coprocessor 25 in the global database, coprocessor 25 causes host computer 27 to request the compressed audio and/or video data from local site 21 if those data have not already been transmitted. For economy in communications, audio and video data preferably are not initially transmitted from local sites 21 on the theory that the frame signature data may be identified as a known segment upon comparison to the global database. However, for some "hot" markets where new segments frequently originate (e.g., Chicago, Los Angeles and New York), the audio and/or video data may also have already been sent for another segment in the group. Further, audio and video need not both necessarily be transmitted. For some new and unknown segments, perhaps only the audio, or only the video, can enable the identification, while for other new and unknown segments both will be necessary. If no data for the audio or video had been sent, the operator will request one set of data. In this case, unknown segment data are stored until the missing audio or video data arrive, and then queued to an operator workstation 26. If the operator determines that the audio (if only video was sent) or video (if only audio was sent) data are also needed, the unknown data are again stored until the missing information arrives, when the data are requeued. Similarly, the operator may determine that higher resolution video (320×240 pixels or more frames per second) is needed and the unknown data again are stored. In a case where high resolution video is requested, if local site 21 always captures the high resolution video and simply does not transmit it for purposes of economy, it can be transmitted quickly on request. However, the system may be implemented in such a way that local site 21 does not routinely capture the high resolution video, in which case it is necessary to wait until the segment is broadcast again in that locality.

Once the operator has all of the necessary information, he or she then plays back the audio and/or video information to identify the unknown segment, specifying any special requirements for signature generation as discussed above. The operator may also determine that the information captured as a result of the signal artifacts is actually two segments (e.g., in a 30-second interval, two 15-second commercials occurred), or that two consecutive intervals were each half of a single segment (e.g., two 30-second segments represent one 60-second commercial). In such a case, the operator instructs the system to break up or concatenate the segments, recreate the frame signature and segment signature data, and restart the identification process for the resulting segment or segments.

After an operator has identified the segment, the frame signature data for each segment in the group must be aligned with the frame signature data for each other segment in the group before a global key signature can be constructed. Alignment is necessary because different segments in the group may have been captured by local sites 21 by the detection of different artifacts. Thus, the segments may not all have been captured identically—i.e., between the same points. For example, a set of segment data in a group for a broadcast segment nominally 60 seconds in length may in fact, as captured, be only 55 seconds in length because the segment was broadcast incompletely. Or, a member segment of the group may be too long or too short because it was captured as a consequence of the detection of a fade-to-black artifact or of an audio power change artifact.

Alignment is carried out by coprocessor 25. First, the frame signature data for the first segment in the group are placed in a buffer. Next, data for a second segment are clocked word-by-word into another buffer and an exclusive-NOR between all bits of the two segments is continually performed as the second segment is clocked in. When the aggregate number of ones returned by the exclusive-NOR is at a maximum (meaning that the compared bits are the same—either zeroes or ones), alignment has been achieved. The aligned data then are used as a baseline to align the remaining segments in the group. The alignment process is time-consuming. However, it is not necessary that alignment be done on a realtime basis. Preferably, alignment is performed at night, or at some other time when system activity is at a low point.

Once the parametized data for all segments within a group have been aligned, a best fit of both the frame signature data and the mask data is calculated by assigning to each bit position the value of that bit position in the majority of segments. The signature coprocessor 25 then generates a new global signature for the segment using the best fit parametized data.

After the new global signature has been generated, it is compared to the frame signature data for all of the unknown segments in the group to which it applies to make certain that the data for each segment matches the signature. If the new global signature does not match each set of frame signature data, this signifies either that an error was made in selecting the keyword or another of the data words, or that one or more sets of data in the group are really not representative of the same segment. In such a case, an operator may have to view additional segments in the group.

If the new global signature matches each grouped segment, the signature is transmitted back to each local site 21 or to an appropriate subset of local sites if the newly identified segment is not of national scope. The respective local sites 21 then merge the data they had been keeping based on the temporary signatures and send it to central site 22, replace the temporary signatures they had been retaining with the new global signature in their local databases, and purge the audio, video, and frame signature data for that segment.

PREFERRED EMBODIMENTS

Figure 3:
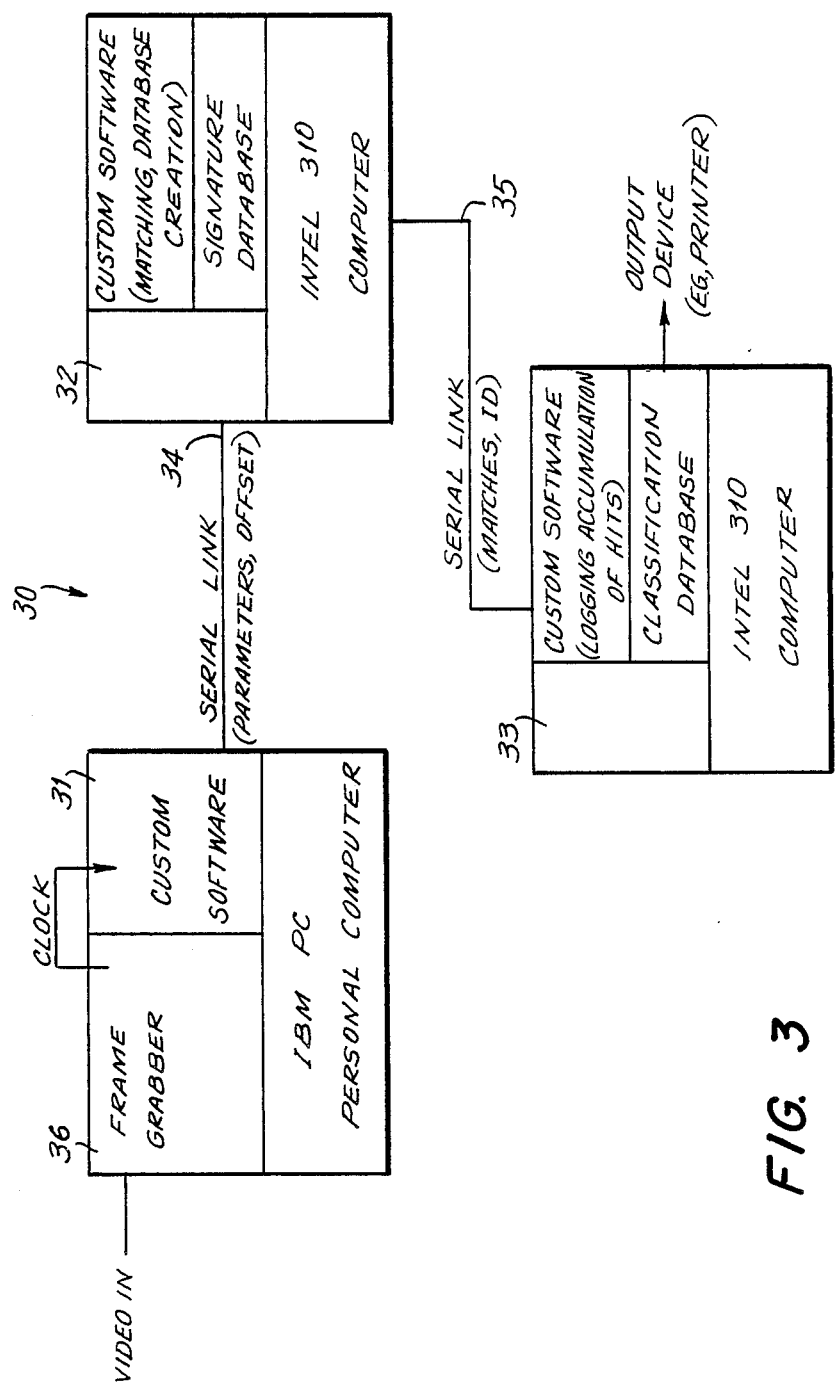
FIG. 3 is a block diagram of an experimental local site according to the invention.

A first preferred embodiment of a local site 30 is shown diagrammatically in FIG. 3, and includes an IBM PC personal computer 31 and two Intel 310 computers 32, 33, interconnected by conventional RS-232C serial links 34, 35. Personal computer 31 uses a circuit card 36 and a software program to extract video parameter data from incoming video signals. Computer 32 creates signatures for new and unknown segments and matches existing signatures maintained in a signature library against incoming frame signature data. Computer 33 logs the "hits" or matches made by personal computer 32.

Figure 4B:
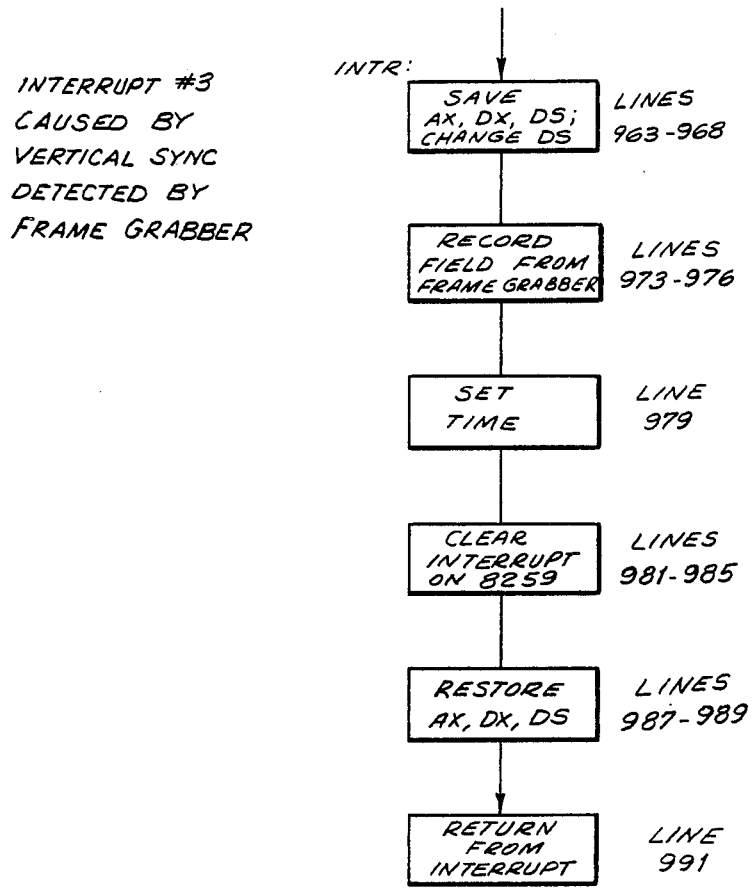

A frame grabber card 36, such as the PC Vision Frame Grabber by Imaging Technologies, in personal computer 31 generates 512×256 pixels for each frame of incoming video information. However, frame grabber 36 is utilized so that only one field per frame is sampled. Frame grabber 36 also provides a video field clock that is used by computer 31. Computer 31 processes the frame grabber output to produce a four-bit word representing each frame. A Microsoft MACRO Assembler listing of the program used in personal computer 31 is attached hereto as Appendix A and a flowchart, the blocks thereof keyed to the lines of the program listing, is shown in FIG. 4. The flowchart and program listing will be readily understood by those of ordinary skill in the art.

Figure 5B:
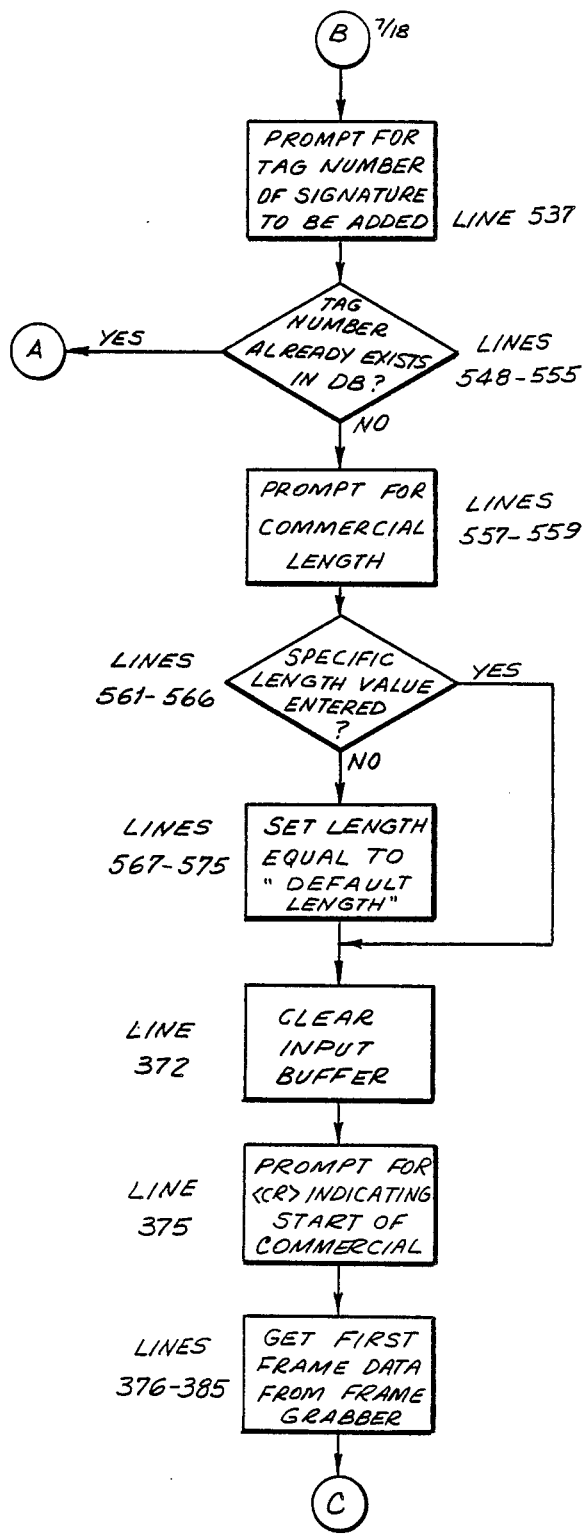
Figure 5C:
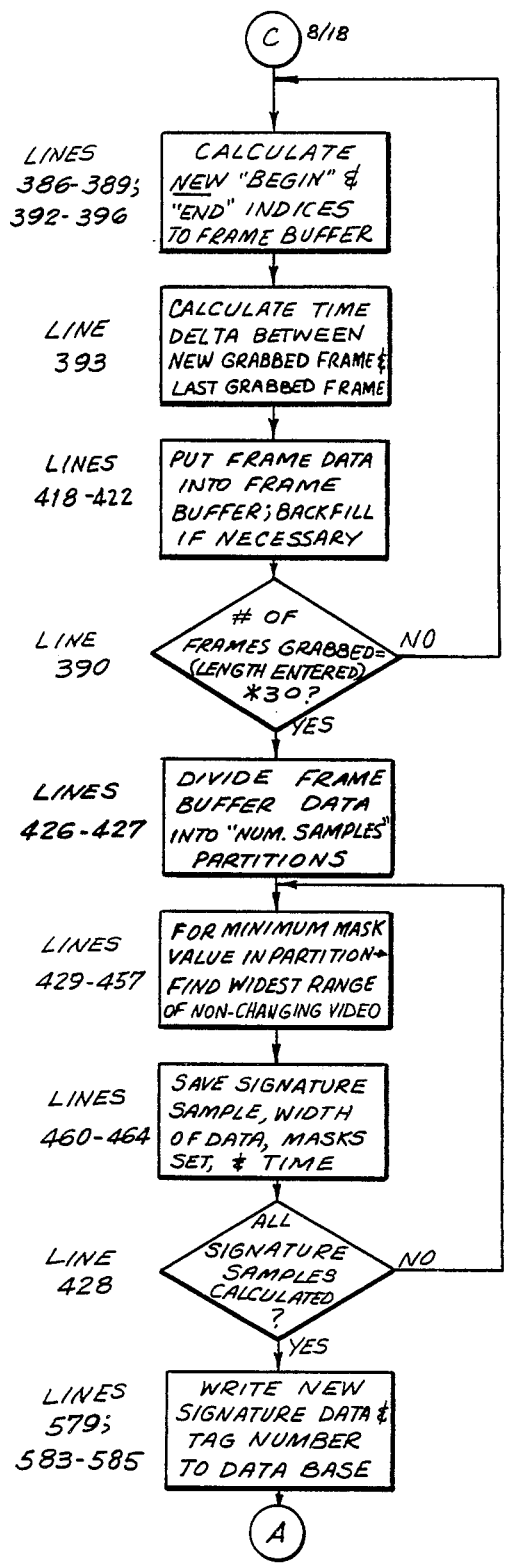
Figure 6B:
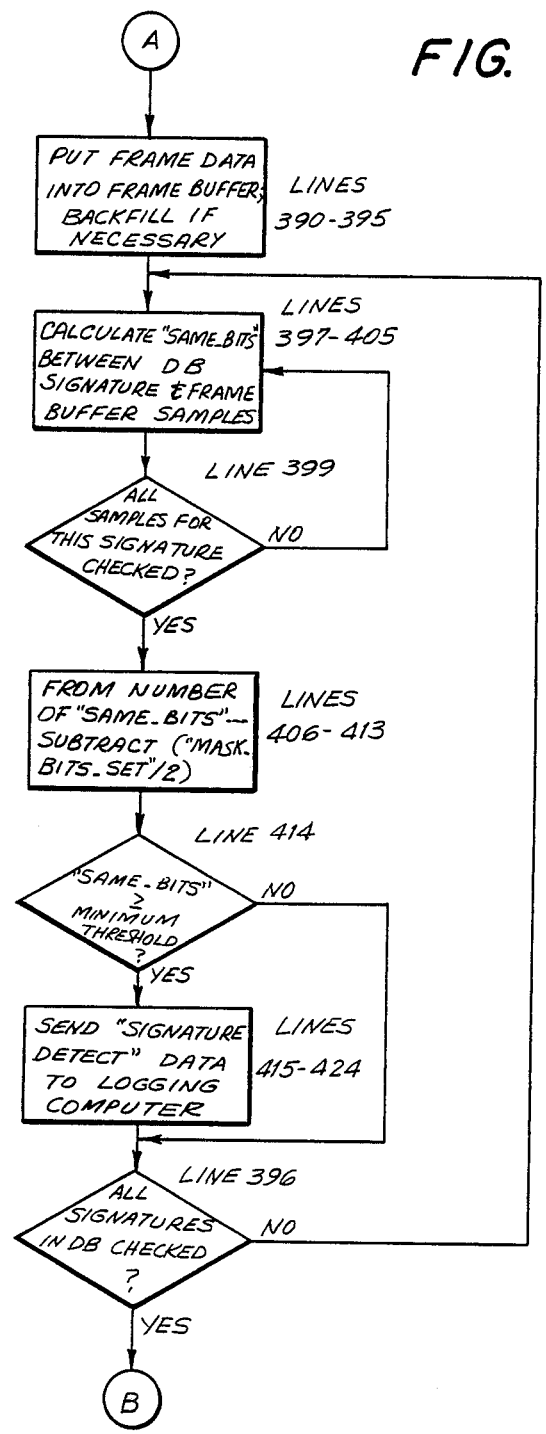

The parametized data from personal computer 31 are transmitted over serial link 34 to computer 32 where they are clocked into a section of RAM partitioned, using pointers, as a modulo-2048 circular buffer. The buffer holds 34 seconds of data. Frame grabber 36 and personal computer 31 are too slow to grab all of the frame data in real time (although in the second preferred embodiment, described below, this function is performed by hardware which does operate in real time). Resultantly, some data are lost. However, the data that are provided over serial link 34 are inserted into the buffer in their current real-time positions. Computer 32 "backfills" the buffer by filling in the empty positions with the next succeeding real time data. Computer 32 creates signatures and matches incoming frame signature data to a signature data-base as described above, without using the designated frame keyword lookup technique. A PL/M listing of the signature generation program is attached hereto as Appendix B and a flowchart, the blocks of which are keyed to the lines of the program listing, is shown in FIG. 5. A PL/M listing of the signature detection program is attached hereto as Appendix C and a flowchart, the blocks of which are keyed to the lines of the program listing, is shown in FIG. 6. The flowcharts and program listings will be readily understood by those of ordinary skill in the art.

Figure 7A:
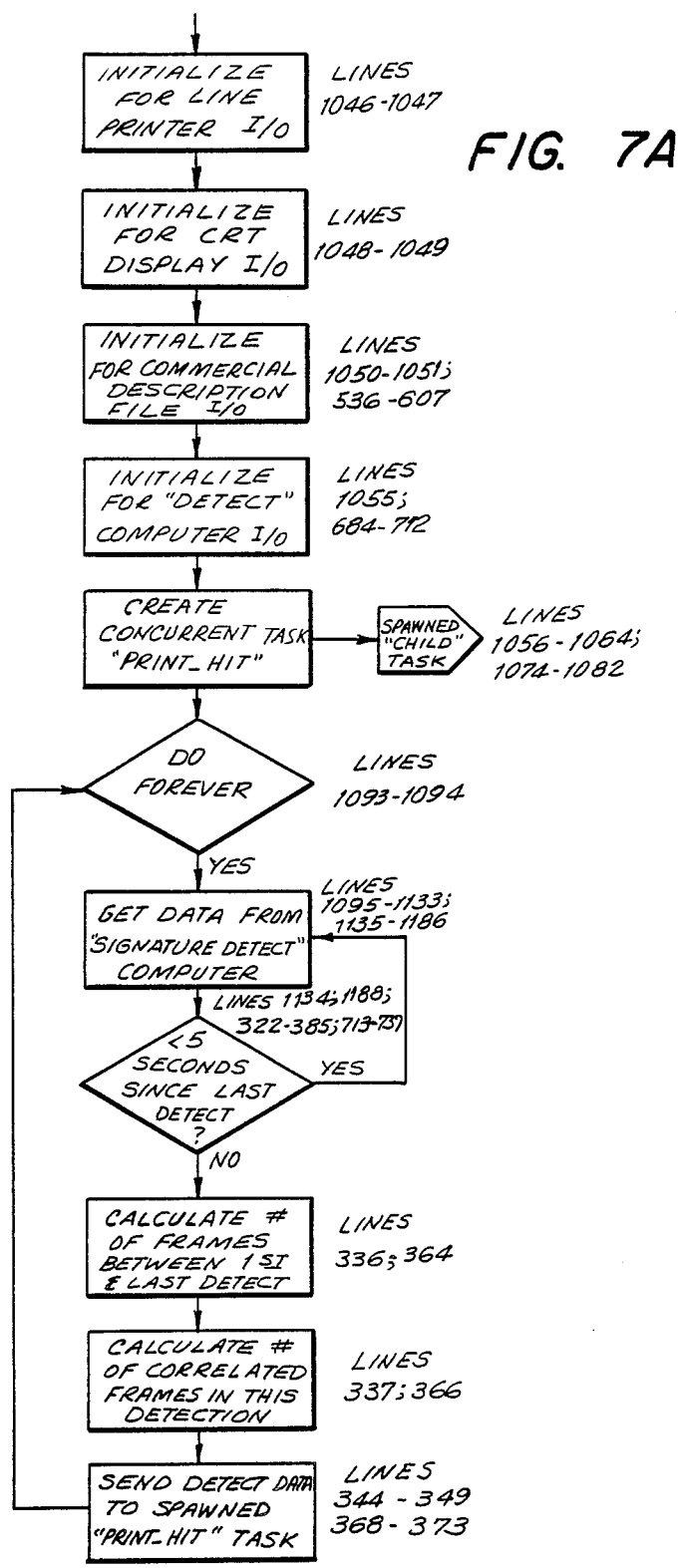
FIGS. 7A and 7B are a flowchart of a fourth software program used in the system of FIG. 3.
Figure 7B:
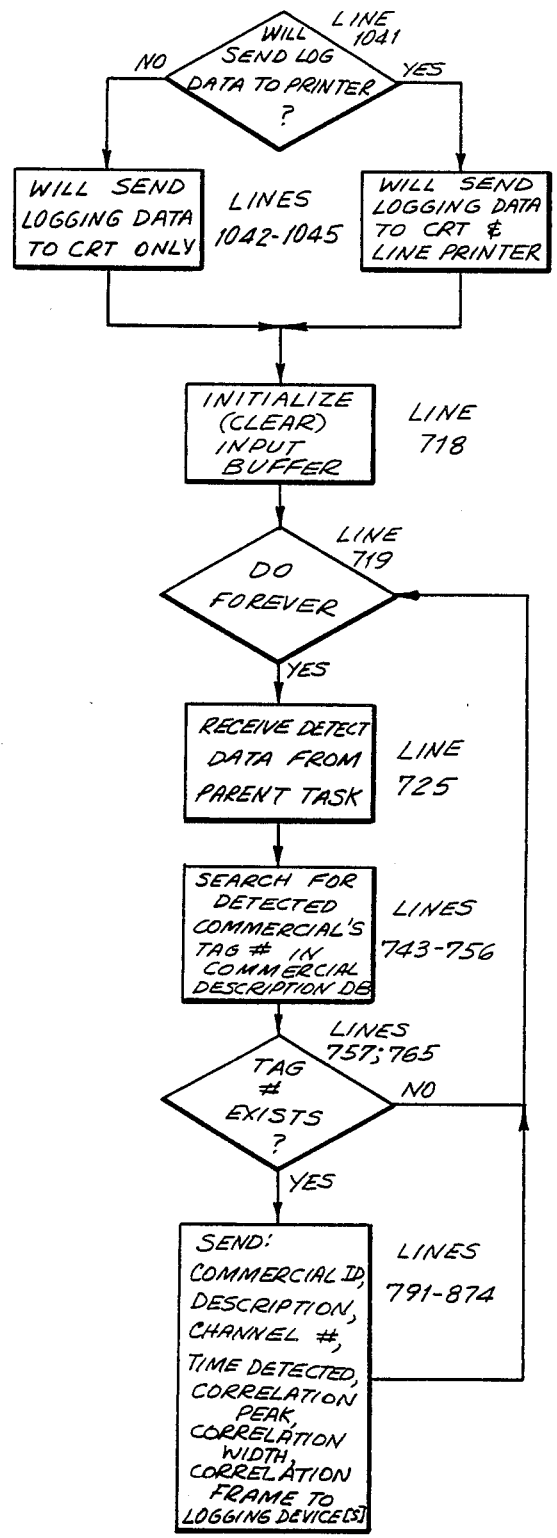

For the purposes of creating signatures in this embodiment, each segment is divided into nine sections—a half-section at the beginning, followed by eight full sections, and a half-section at the end. The two half-sections are discarded to account for possible truncation of the beginning or end of the segment when it is broadcast. A word is then selected, using the previously described criteria of stable data, noise-free data, Hamming distance, and entropy, from each of the eight sections. The signatures created are stored in the memory of computer 32 while the match data are transmitted over serial link 35 to computer 33 which keeps track of the matches. A listing of a PL/M program used in computer 33 is attached hereto as Appendix D and a flowchart, the blocks of which are keyed to the lines of the program listing, is shown in FIG. 7. The flowchart and program listing will be readily understood by those of ordinary skill in the art.

Signatures are generated in the system of FIG. 3 by the computer 32. However, the generation of signatures is not initiated as earlier described and as implemented in the second preferred embodiment (described below). Rather, in the system of FIG. 3, an operator must "prime" the system by specifying the segment length, playing a tape into the system and manually starting the buffer filling process. Computer 32 then builds a signature automatically. However, there is no threshold or guard-band computed here as was earlier described, and as implemented in the second preferred embodiment (described below). In the second preferred embodiment, a threshold associated with the signature is modified by subtracting from the default threshold one-half the number of masked bits in the signature, while in the system of FIG. 3 the default threshold is augmented at the time of comparison by one-half the number of masked bits in the data being compared.

A second preferred embodiment of the system of the invention is shown in FIGS. 8-12.

Figure 8:
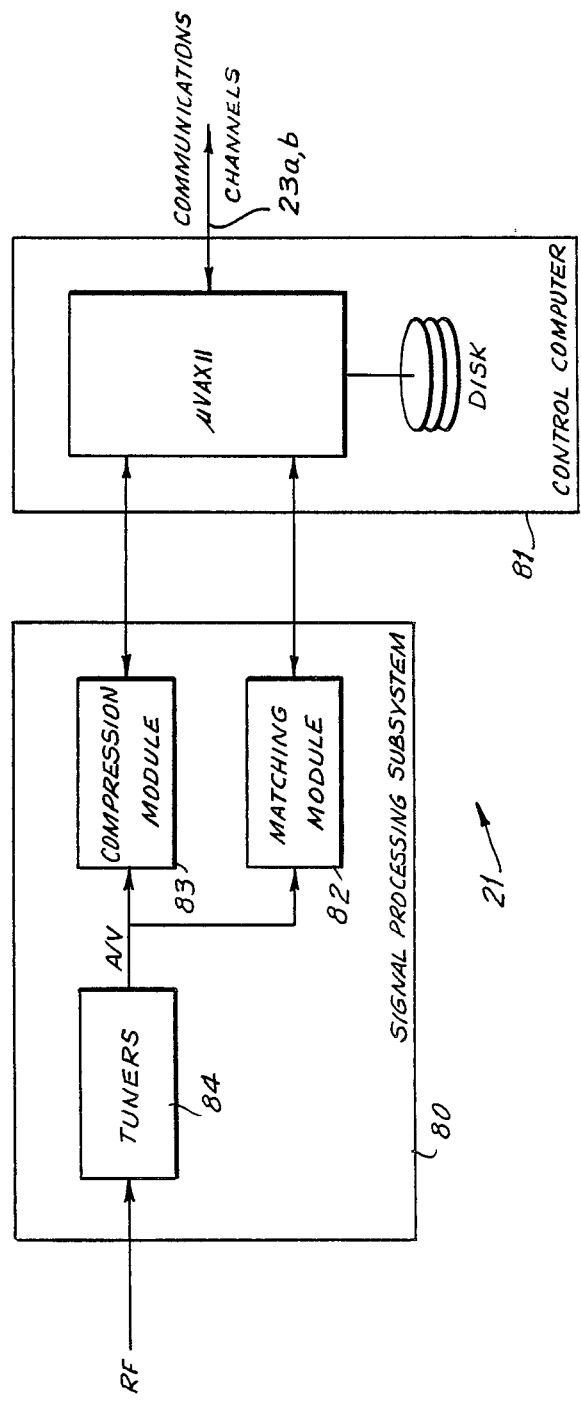
FIG. 8 is a block diagram of a local site according to the invention.

FIGS. 8-11B show the details of local sites 21. FIG. 8 is a block diagram of a local site 21. The local site 21 is comprised of two major subsystems: the signal processing subsystem 80 and the control computer 81.

Figure 9:
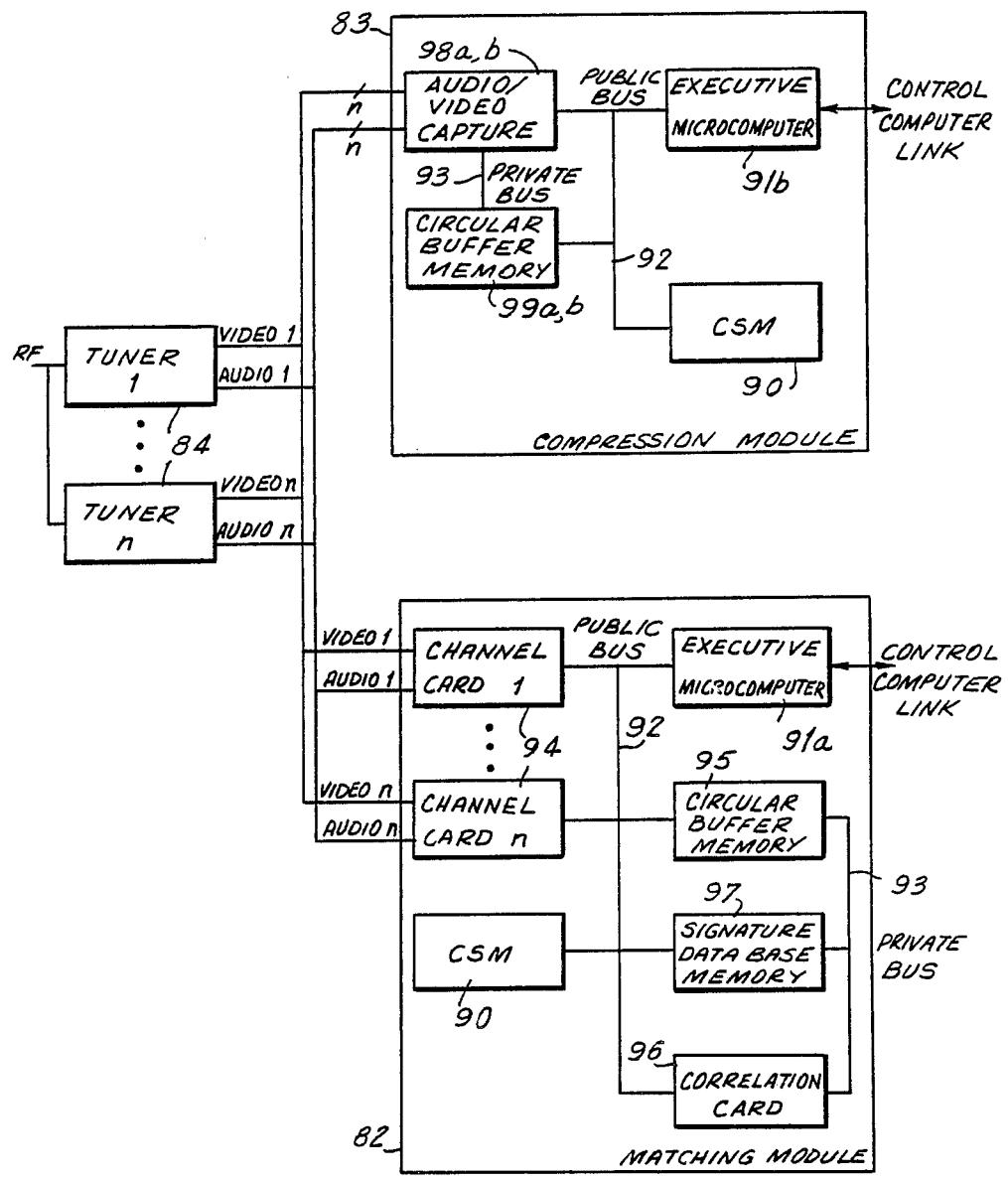
FIG. 9 is a block diagram of the signal processing subsystem of FIG. 8.

The signal processing subsystem 80, shown in more detail in FIG. 9, receives incoming RF broadcast signals and performs three distinct tasks:

1. It recognizes "known" broadcast segments by comparing received frame signature data to a local library of segment signatures;
2. It detects artifacts in the received broadcast signal for the purpose of delineating and capturing potential "unknown" broadcast segments whose frame signature data do not match any locally stored segment signature; and
3. It collects data (e.g., compressed video and audio, time of day, and so forth), to allow subsequent identification of "unknown" segments by an operator at the central site. Hardware performs much of these tasks to provide maximum speed of operation. In addition, software-driven microprocessors cooperate with the hardware to assist with the lower speed portions of these tasks and to allow programmability and flexibility.

The hardware of signal processing subsystem 80 includes matching matching module 82, compression module 83, and one or more tuners 84 (there is one tuner for each broadcast station to be monitored). Tuner 84 may be any conventional RF tuner, and in the preferred embodiment is Zenith model ST-3100. Matching module 82 and compression module 83 are built around the well-known Intel Corporation Multibus ® II Bus Structure. Multibus ® II is described in the Multibus ® II Bus Architecture Databook (Intel Order No. 230893) and the Multibus ® II Bus Architecture Specification Handbook (Intel Order No. 146077C), both of which are incorporated herein by reference. The first two tasks discussed above are performed in matching module 82. The third task is performed in compression module 83.

Each of the two modules 82, 83 includes a Central Services Module (CSM) 90 which is a standard off-the-shelf item (such as Intel Order No. SBC-CSM-001) required in all Multibus ® II systems. Each module also has an executive microcomputer board 91a, 91b which controls communications between the respective module and control computer 81. All components on each module are interconnected on public bus 92, while those components which require large amounts of high-speed data transfer between them are additionally interconnected by private bus 93.

Matching module 82 further includes one channel card 94 for each channel to be monitored—e.g., one for each commercial station in the local market. Channel cards 94 generate the 16 bits per frame of parametized signal data and the corresponding 16-bit mask for both audio and video in accordance with the methods earlier described. Channel cards 94 also signal the occurrence of signal artifacts which indicate, and are used to delineate and capture, potential unknown segments. Also contained within matching module 82 are two circular buffer memories 95. One buffer 95 is for audio and the other is for video. These buffers store on a temporary basis the incoming parametized frame signature data, as earlier described. In this preferred embodiment, the maximum length of broadcast segments to be recognized is assumed to be one minute. For longer segments, only a one-minute portion is used for recognition purposes. Accordingly, each buffer can hold 4,096 frames, which is 136.5 seconds, of video at a frame rate of thirty frames per second, or just over two minutes. 4,096 is $2^{12}$, so the offset data associated with each signature (as earlier described) is 12 bits long. Parametized signal information is moved from channel cards 94 to the circular buffers 95 when requested by executive microcomputer 91a.

Figure 10:
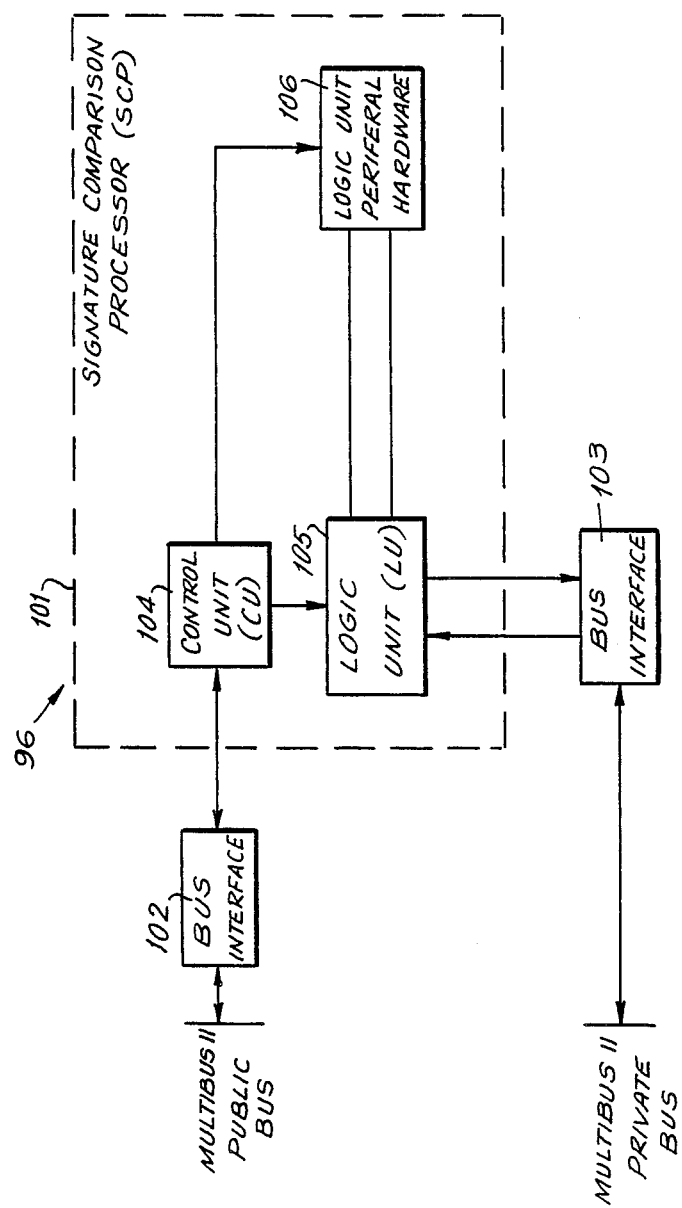
FIG. 10 is a block diagram of the correlator card of FIG. 9.

Matching module 82 also includes correlation card 96, shown in more detail in FIG. 10. Correlation card 96 performs the task of recognizing incoming broadcast segments. Correlation card 96 accomplishes this by comparing incoming video and audio frame signature data with the locally stored database of key signatures to find matches. The local signature database is stored in memory 97 (up to 13 megabytes of conventional random access memory). Since correlation card 96 in the preferred embodiment may operate on both audio and video data (although, e.g., only video can be used), correlation card 96 must have sufficient capacity to process an amount of data equivalent to twice the number of channels to be monitored.

Correlation card 96 performs all functions required to generate the raw data for the final correlation, or determination of a segment match. Executive microcomputer 91a accumulates the matches resulting from key signature comparisons done by correlation card 96, and then transmits the accumulated matches to control computer 81.

As shown in FIG. 10, correlation card 96 contains signature comparison processor (SCP) 101 and two independent interfaces 102, 103 to the Multibus ® II public and private buses. SCP 101 is a programmable element which operates under command of executive microcomputer 91a. SCP 101 is responsible for the following primary functions:

1. Generation of all addresses to data-base memory 97 for the purpose of accessing key signatures, current circular buffer data, and segment signatures (the latter when this card is used in the coprocessor as described below);
2. Performing the actual bit-by-bit comparison of frame signature data and stored segment signatures;
3. Execution of self-test diagnostic functions as requested by executive microcomputer 91a; and
4. Relaying results of each key signature comparison to the executive microcomputer 91a for final segment correlation.

Control unit 104 of SCP 101 directs the operation of SCP 101. Control unit 104 includes memory which contains all microprogram instructions defining SCP operation. It also contains sufficient functionality to allow for the efficient sequencing of the required microinstructions. Control unit operation is directed, at an upper level, by instructions generated by executive microcomputer 91a.

Logic unit 105 performs all address and data manipulations required to load both incoming and previously defined reference signatures into onboard buffers for comparison. Signature data is resident in external, off-board memory accessible by the private bus; logic unit 105 and control unit 104 together execute all private bus interface functions.

Logic unit 105 also generates messages to and interprets messages from executive microcomputer 91a. An example of a message interpreted by logic unit 105 is a request to compare selected key signatures in the key signature database to the current, incoming segment signature. An example of a message generated by logic unit 105 is that which is generated at the end of a comparison which defines how well the incoming signature matches the reference (how many total correct or incorrect bits after comparison).

The logic unit peripheral hardware module 106 is responsible for assisting logic unit 105 in performing signature comparisons. Specifically, the module contains logic which is intended to increase the processing capability of SCP 101. The features of module 106 are:

1. Programmable memories which contain constant data;
2. Word swap hardware which allows information in internal logic unit registers to be positionally exchanged at high speed; and
3. Hardware which counts the number of active bits in a preliminary signature comparison result, in preparation for testing against a predetermined threshold.

Executive microcomputer 91a is a standard commercial microcomputer card (e.g., Intel Order No. SBC- 286-100) based on an 80286 microprocessor. The function of this card is to:
1. Maintain the signature data base;
2. Transfer data from the channel cards to the circular buffers;
3. Maintain the keyword pointers;
4. Accumulate the correlation results (for use in applying the duration criterion);
5. Capture data for segment identification; and
6. Provide an interface path to the control computer 81. (All data to be transferred to central site 22 is requested by control computer 81. The key signature database is downloaded from control computer 81.)

Compression module 83 includes (in addition to central services module 90 and executive microcomputer 91b) audio capture card 98a, video capture card 98b, and associated circular buffer memories 99a, 99b. The audio and video capture cards are shown in more detail in FIGS. 11A and 11B, respectively.

Audio and video capture cards 98a, 98b each can monitor up to eight broadcast channels (monitoring more channels requires multiple cards). Video card 98b captures incoming video frames at a slide-show rate of one frame per second and digitizes and compresses the video data, while audio card 98a digitizes and captures audio continually, for each of the eight channels.

The audio and video from up to eight channels are brought to these cards (as well as to the channel cards) from channel tuners 84 by coaxial cables. On video capture card 98b, a conventional 1-of-8 multiplexer 110 (implemented in this embodiment as a T-switch circuit design using CMOS 4066 integrated circuits), selects one of the eight channels for capture.

Figure 11A:
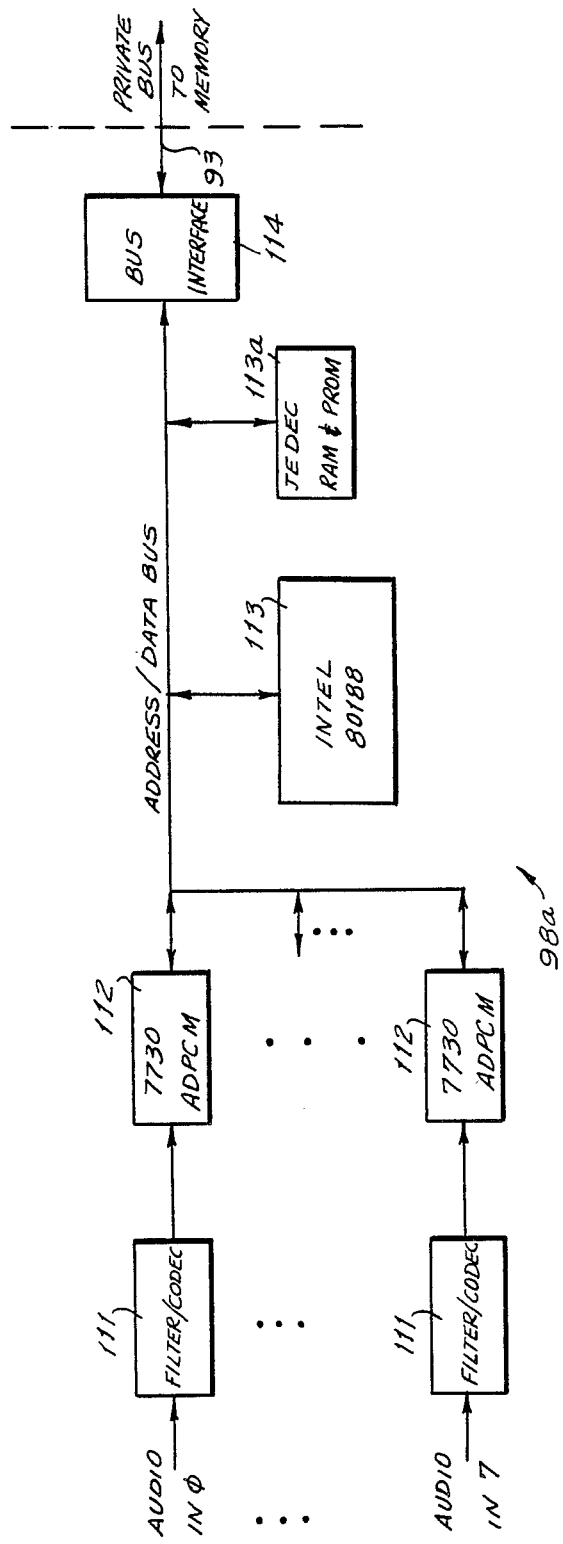
FIG. 11A is a block diagram of the audio capture card of FIG. 9.

As shown in FIG. 11A, on audio card 98a, the audio from each channel is fed to one of up to eight combination filter/coder/decoder circuits 111, such as a National Semiconductor 3054 integrated circuit. In combination circuit 111, the audio signal is passed through a low-pass filter and then through a coder/decoder which performs a logarithmic analog-to-digital conversion resulting in a digital signal with a compressed amplitude (the audio signal is expanded again prior to being audited by an operator at central site 22). The compressed digital signal is then passed through an adaptive differential pulse code modulator (ADPCM) 112 similar to that used by the telephone industry—e.g., a NEC 7730 integrated circuit—for further compression. An Intel 80188 microprocessor 113 controls the movement of the compressed audio data from ADPCM 112 through bus interface 114 to private bus 93 of compression module 83, and thence to circular buffer memory 99a. A JEDEC-standard RAM/EPROM 113a contains programs and memory workspace used by microprocessor 113.

Figure 11B:
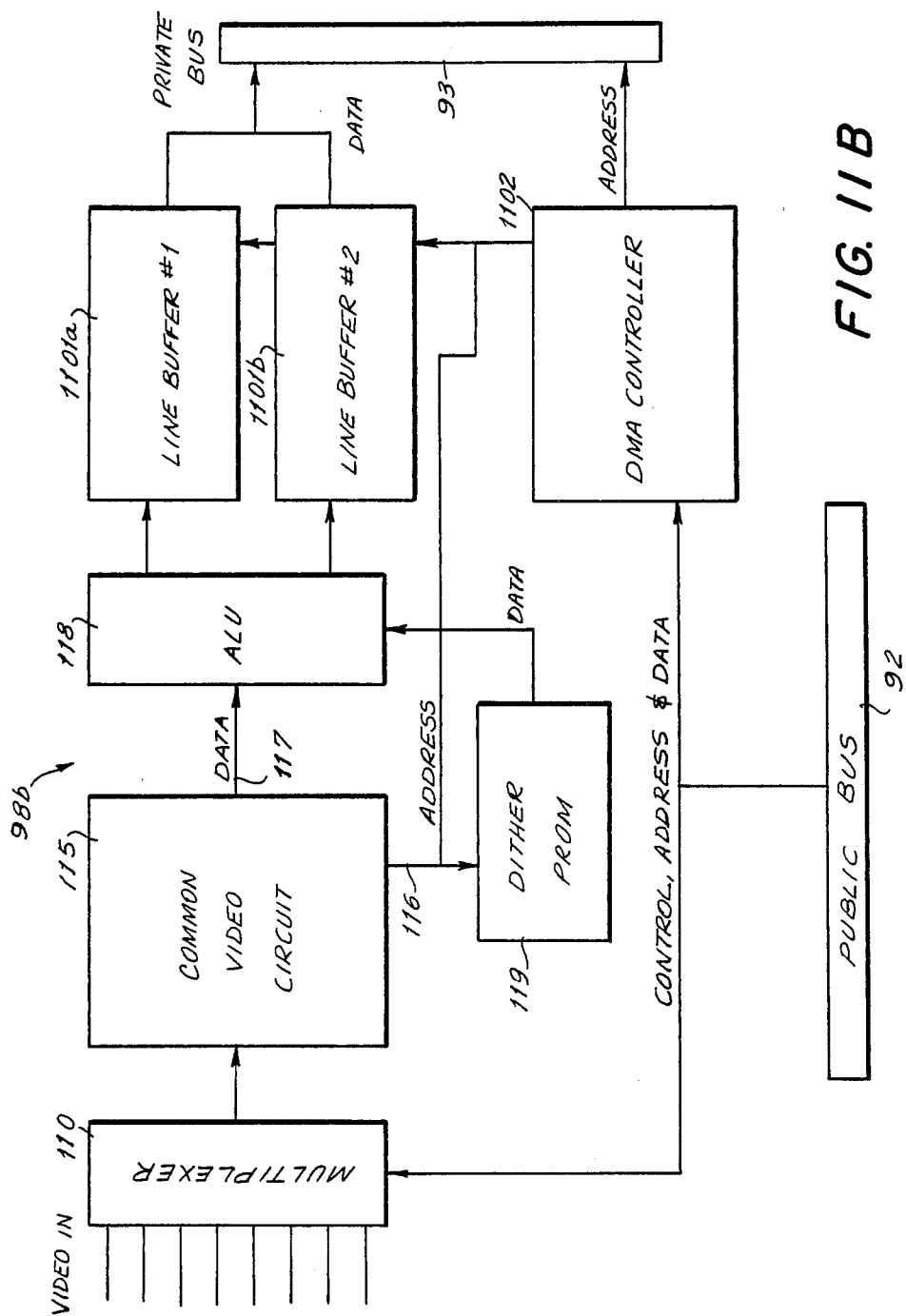
FIG. 11B is a block diagram of the video capture card of FIG. 9.

As shown in FIG. 11B, on video card 98b, common video circuit 115 uses the sync information contained in the received analog video signal to generate clock pulses and addresses for analog-to-digital conversion of the video signal. Circuit 115 outputs both address signals and digitized data signals representing the video at the rate of one field per second at 116 and 117, respectively. The data pass to arithmetic logic unit (ALU) 118 which further compresses the video data by reducing each video field or frame to 160 (horizontal) by 120 (vertical) pixels, each pixel averaging four-by-two pixel areas in size, using gray scale pixel averaging. The address data pass from common video circuit 115 to dither prom 119 which contains a table of pseudorandom numbers—one for each video address output by circuit 115. When an address is received by dither prom 119, the pseudorandom number associated with that address is passed to ALU 118 to be added to the compressed video data. This dithering technique, by which a low-information-content video signal can be visually improved, allows the video frame to be compressed to as few as 9600 bytes. The dithered compressed video data are then passed to one of two line buffers 1101a, b (one buffer is filled while the other is being read and emptied), from which they are passed under the control of direct memory access controller 1102 to private bus 93 of compression module 83, and thence to circular buffer memory 99b.

The audio and video data are placed in circular buffers 99a and 99b holding the most recent two minutes of data for that channel under the direction of control computer 81 and executive microcomputer 91b. Executive microcomputer 91b preferably is a standard commercial microcomputer card (e.g., Intel Order No. SBC-286-100) based on an 80286 microprocessor. This card provides an interface path to the control computer 81. All data to be transferred to the central site is requested by control computer 81.

The signal processing subsystem 80 can be referred to as the "front end" of local site 21. Control computer 81 can be referred to as the "back end".

Control computer 81 (FIG. 8) is preferably a commercially available MicroVAX II minicomputer manufactured by Digital Equipment Corporation (DEC), running the DEC VMS virtual memory operating system. Between one and nine megabytes of RAM memory are provided along with one DEC RA81 Winchester disk drive (with controller) having a capacity of 456 megabytes. A DPV11 synchronous interface connects the control computer 81 to communications channels 23a, b via a modem. A DRV11 direct memory access controller connects control computer 81 to signal processing subsystem 80.

A function of control computer 81 is to determine, using detected signal artifacts, when new and as yet unknown broadcast segments may have been received. Control computer 81 also keeps track of the temporary log for such segments until the segments have been identified by central site 22. Another function of control computer 81 is to determine, based on duration and other criteria, such as time of day, whether or not matches accumulated by executive microcomputer 91a actually indicate that a segment has been recognized. (For example, during "prime time" no commercials are normally broadcast at, e.g., 7 minutes after the hour.) In performing these functions, control computer 81 exercises its ability to control all segment processing subsystem 80 functions via executive microcomputers 91a, 91b.

Control computer 81 can instruct modules 82 and 83 to tune to a particular channel to capture audio/video data, to compare a pair of frame and key signatures, or to generate a local signature. These instructions can originate in control computer 81 itself or ultimately at central site 22. For example, in identifying a new segment, an operator may need higher resolution video information. In such a case, control computer 81 would act on instructions from central site 22 by requesting module 83 to capture the required data when the desired segment is next received. Control computer 81 also stores on disk a backup copy of the signature database stored in RAM memory 97.

Referring again to FIG. 2, central system 22 includes central-local site 21a, coprocessor 25, mainframe "host" computer and memory 27 with associated mass storage device 28, communications processor 29 and workstations 26.

Coprocessor 25 is used to assist with certain computationally intensive functions related to the signature processing requirements of the central site 22. The "front end" of coprocessor 25 is identical to matching module 82 of local site 21, earlier described, except for the omission from coprocessor 25 of channel cards 94. It is preferred, however, that the memory for the signature database within coprocessor 25 be expanded over that of the local site to ensure that all key signatures used at all local sites can be resident in coprocessor 25.

The "back end" of coprocessor 25 preferably uses the same MicroVAX computer used by local sites 21 (FIG. 8), although a different type of computer could be used. Another alternative is that the coprocessor front end may be attached to communications processor 29 at the central site. It is also preferred that the coprocessor hardware be duplicated at central site 22 so that a backup system is available in case of a failure of the primary coprocessor. The coprocessor's signature generating and comparing functions are performed in the front end, while its checking and grouping functions are controlled by its back end utilizing the comparison capabilites of the front end as described above.

Workstation 26 is the vehicle by which new and unknown segments are presented to, and classified by, human operators. A secondary function of workstation 26 is to act as a terminal in the maintenance of host resident databases. Workstation 26 is made up of the following:

1. A standard IBM 3270 AT computer capable of local processing and communicating with host computer 27;
2. A 30 MB hard disk drive, 1.2 MB floppy drive, color console monitor and keyboard all attached to the 3270 AT;
3. Two video monitors for viewing two segments simultaneously;
4. One audio output device (e.g., headphones) for listening to the audio portion of a segment;
5. A video card installed in the 3270 AT for controlling the video portions of segments; and
6. An audio card installed in the 3270 AT for controlling the audio portion of segments.

The heart of workstation 26 is the IBM 3270 AT computer. The 3270 AT is a blend of an IBM 3270 terminal and an IBM AT personal computer. By combining the power of these components, a very effective mainframe workstation is created. Workstation 26 allows easy communication with host 27 and has its own processing capability. Up to four sessions with host 27 can be started as well as a local process all viewed in separate windows on the console screen. A combination of host and local processes are used by the operator.

The video card contained in the 3270 AT can display two different segments. Each video card consists of a pair of "ping-pong" (A/B RAM) memories for holding compressed gray scale video data. The ping-pong memories can be used in one of two ways. First a segment can be pre-loaded into RAM A while RAM B is being displayed. Second, the ping-pong memories can be used to load the next frame of a segment while the other is being displayed. Gray scale data is returned to video format and smoothed before being passed through the video digital-to-analog converter.

An audio control card is also provided in the 3270 AT. ADPCM circuits (e.g., NEC 7730) on the audio control card expand the data and output a serial bit stream for conversion to analog information to be played on the operator's headphones.

Workstation 26 supports the identification process of new commercial segments and contains self-test routines to check the status of the machine and components. It is possible for workstation 26 to operate in a somewhat stand-alone mode requesting needed information from host 27 and passing results back. Alternatively, host 27 could control the application and send audio/video requests to workstation 26. The operator at workstation 26 controls the audio and video cards to cause the audio and/or video portions of selected segments to be displayed or output.

Host computer 27 is preferably an IBM mainframe of the 308X series, such as an IBM 3083. Host computer 27 maintains a copy of the global signature database and an archive of all parametized and compressed audio/video data from which the signature database was generated. The archive allows recreation of the signature database in the event, e.g., of an accidental catastrophic loss of data.

Host computer 27 uses the following commercially available software packages:
1. Operating system—IBM MVS/XA;
2. Communications software—IBM ACF/VTAM, NCP, NPAA;
3. Telecommunications monitor—IBM CICS; and
4. Database management system—Cullinet IDMS.

Host 27 also commands the workstation 26, coprocessor 25 and, ultimately, local site 21. For example, it may be determined that additional information is needed from a particular local site 21. Host 27 acts on that determination by instructing the appropriate local site control computer 81 to request that its signal processing subsystem 80 capture additional data, or upload some data previously captured, for example.

Host 27 also uses information transmitted by the various local sites 21 as to the occurrences of segments to compile a log of occurrences and one or more reports requested by the system users.

Figure 12:
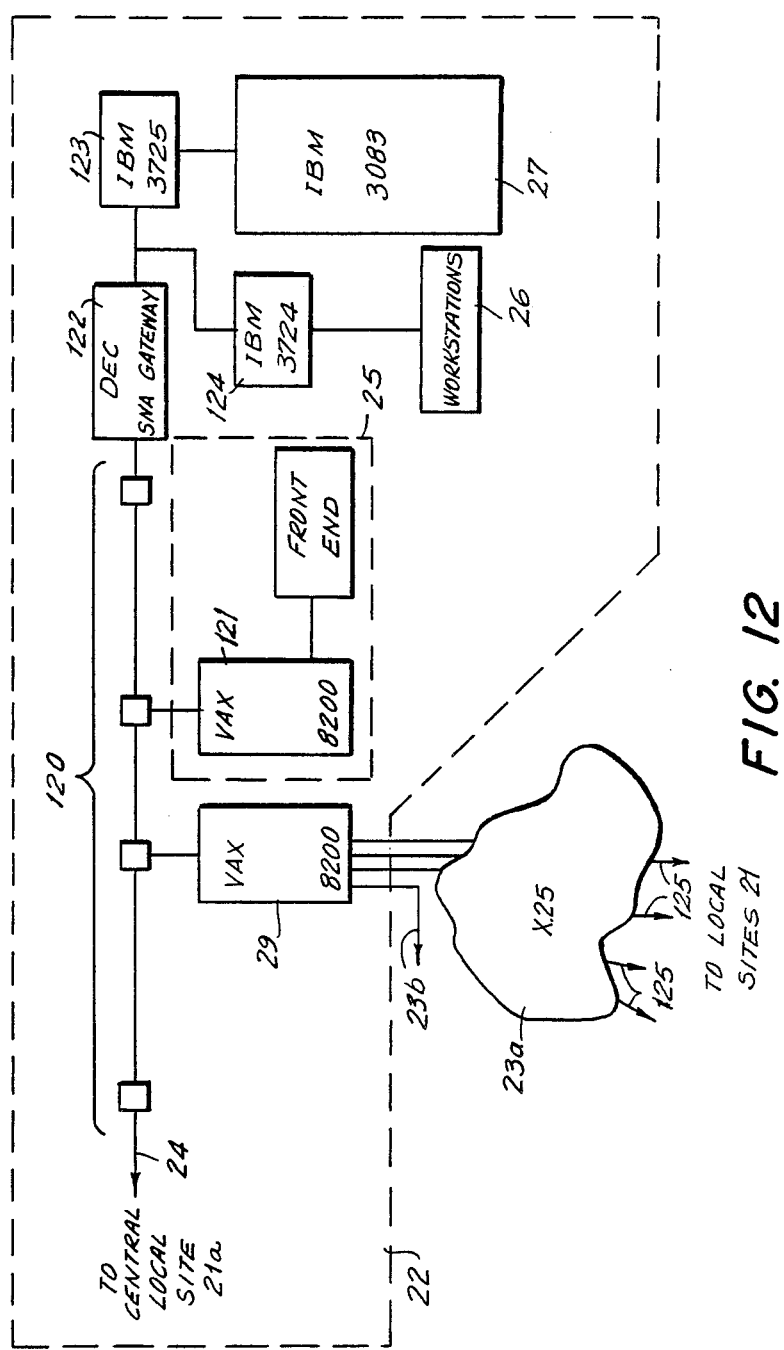
FIG. 12 is a block diagram of the central site and system communications of the invention.

Communications channels 23a, b and communications processor 29 are shown diagrammatically in more detail in FIG. 12. In the embodiment shown, coprocessor 25 has a separate control computer 121, although, as stated above, the functions of that computer could be handled by communications processor 29.

All communications within central site 22 and local sites 21 are coordinated by Digital Equipment Corporation (DEC) equipment. Therefore, communications throughout the system are based on DEC's DECNet protocol. Within central site 22, the DECNet protocol is run on a local area network 120. An SNA gateway 122 manufactured by DEC is connected to local area network 120 to translate between DECNet and IBM's Systems Network Architecture to allow communications between host 27 and the rest of the system. An IBM 3725 communications control device 123 interfaces between SNA gateway 122 and host 27. An IBM 3724 cluster controller 124 interfaces between device 123 and workstations 26, allowing workstations 26 to communicate with host 27. Central-local site 21a is connected to local area network 120 by high-speed link 24 as earlier discussed.

Communications control computer 29 is preferably a Digital Equipment Corporation VAX 8200. Coprocessor control computer 121 is the identical computer and in fact, as discussed above, its function can be performed by communications control computer 29 if desired.

Communications control computer 29 interfaces between local area network 120 and local sites 21. For local sites 21 with which high-speed or high-volume communications is necessary or desired—e.g., major "hot" markets such as New York, Chicago or Los Angeles—communication can be by high-speed leased line 23b. However, for most local sites 21, a lower speed packet switching data network 23a running the well-known X.25 protocol is used. The X.25 protocol is transparent to DECNet and is available on such commercial data communications networks as Telenet or Tymnet. Communications lines 125 between individual local sites 21 and network 23a can be provided either by leased line or over the telephone dial-up network.

Thus it is seen that a method, apparatus and system has been provided for accurately (with a less than 1% error rate), rapidly and reliably logging the occurrences of large numbers of broadcast segments without relying on cues or codes in the signal, and for identifying new segments with a minimum of human involvement.

Persons skilled in the art will appreciate that the present invention can be practiced by other than the embodiments described herein, which are presented for the purpose of illustration and not of limitation, and the present invention is limited only by the claims that follow.

Appendix A

Microsoft MACRO Assembler  Version 3.00
    04-24-86

```
;****************************************************************
;
;
;
;
;
;     © 1986 Selling Areas -
;     Marketing, Inc.
;     Unpublished work -
;     All rights reserved
;
;
;****************************************************************
;
; 4X2THIS PROGRAM SAMPLES 4X2 ECCENTRICALLY PLACED
;SQUARES. VALUES SENT TO THE INTEL ARE 0-255 FOR EACH
;OF THE FOUR SQUARES PLUS A 2 BYTE TIME VALUE. DATA IS
;SENT TO THE INTEL ON RECEIPT OF A CARRIAGE RETURN.
;
;****************************************************************
;
;EDIT LOG:
;
;    11/04/85 MJDINITIAL ENTRY, ERASE UNUSED SUBROUTINES
;    11/05/85   MJD    ASSEMBLES USING MICROSOFT 3.0 ASSEMBLER
;                      RATHER THAN OLD IBM-MICROSOFT 1.0 .
;                      DWORD BECOMES WORD.
;    11/06/85  MJDIMPLEMENT MACROS, GRAB FRAME AFTER LAST
;  DATA GATHERING RATHER THAN WAIT FOR
;  HANDSHAKE.
;    11/11/85MJDSEND ONE BYTE PER SQARE, ADD BOX OUTLINE
;  ON DISPLAY
;    11/21/85MJDADD CODE TO COMPUTE FRAME SIGNATURES AND
;  NERF BITS.
;
;;;;;;;;;;;;;;;;;;;;;;;;;;;;;;;;;;;;;;;;;;;;;;;;;;;;;;;;;;;;;
;VALUE EQUATES GO HERE
  PUBLICPCV,PCV1,TIMARK,TIMSAV,FLAG,START
;
;
;REGISTER BASE CONSTANTS
;
```

```
= FF00    REGBASE EQU0FF00H
= 6000    IMBASE EQU 6000H ;SEGMENT REG BASE
          ;
= 03F8             COMMBASEEQU03F8H ;COMM PORT BASE ADDR
= 03FD    COMMSTATEQUCOMMBASE.+ 05H
=         COMMDATAEQUCOMMBASE
          ;
= 0020    ICOMPRT EQU20H
= 0021    IMSKPRT EQU21H
          ;
          ;REGISTER OFFSETS
          ;
= FF00    CSR0EQUREGBASE + 00H
= FF01    CSR1EQUREGBASE+ 01H
= FF02    LUTAEQUREGBASE + 02H
= FF03    LUTDEQUREGBASE + 03H
= FF04    LUTMASKEQUREGBASE+ 04H
= FF05    FRMSEL  EQUREGBASE + 05H
= FF06    VBIINTREQUREGBASE + 06H
          ;
          ;*****************************
          ;INTERRUPT LOCATIONS
          ;
0000      ABSOSEGMENTAT0
002C      ORG11 * 4  ;HARDWARE INTR #3 IS MAPPED
               ;TO IBM INTR #11

002C      VSYNCLABELWORD ;INTR #4 DEFINED

002C      ABSOENDS
          ;;;;;;;;;;;;;;;;;;;;;;;;;;;;;;
          ; FLAG MACRO
          ;     CHECKS SEMAPHORE SET BY INTERRUPT ROUTINE
          ;     TO TELL WHICH FIELD HAS BEEN WRITEN
          ;
          FLAGS MACRO
            LOCALM1
          M1: MOVAX,FLAG
            ANDAL,0FFH
            JEM1
            MOVFLAG,0
            ENDM
          ;;;;;;;;;;;;;;;;;;;;;;;;;;;;;;;;
          ;CHECKS FOR CHARACTER FROM INTEL
          DATARDY MACRO

MOVDX,COMMSTAT ;INIT STATUS REG ADDR
          DATARDY1:     INAL,DX  ;GET STATUS
            ANDAL,00000001B ;MASK DATA RDY
            JZDATARDY1 ;JUMP IF NOT READY

MOVDX,COMMDATA
            INAL,DX
            ENDM
          ;
          ;
          ;;;;;;;;;;;;;;;;;;;;;;;;;;;;;;;;;;;;
          ;;
          ;MACRO XMITRDY
          ; CHECKS AND WAITS FOR XMIT BUFFER TO EMPTY
          ; EATS DX,AL
          ;
```

```
XMITRDY MACRO
  LOCAL X1
  MOV DX,COMMSTAT
X1: IN AL,DX
  AND AL,00100000B
  JZ X1
  ENDM
;;;;;;;;;;;;;;;;;;;;;;;;;;;;;;;;;;;;;;;;;;;;;
;
; MACRO SEND2
;
;      SENDS 1 WORD OF DATA IN TDATA
; EATS AX,DX
SEND2          MACRO TDATA
  LOCAL TDATA
  XMITRDY
  MOV AX,TDATA;TRANSMIT BUFFER EMPTY
  MOV DX,COMMDATA
  OUT DX,AL;FIRST BYTE TRANSMITTED

XMITRDY
  MOV AX,TDATA;TRANSMIT BUFFER EMPTY
  MOV AL,AH
  MOV DX,COMMDATA
  OUT DX,AL;SECOND BYTE TRANSMITTED
 ENDM
;;;;;;;;;;;;;;;;;;;;;;;;;;;;;;;;;;;;;;;;;;;;;
;
; MACRO SEND1
;
;      SENDS AL
; EATS AX,DX
SEND1          MACRO TDATA
  LOCAL TDATA
  XMITRDY
  MOV DX,COMMDATA
  MOV AX,TDATA
  OUT DX,AL
  ENDM
;*****************************
;MACRO    FUNCTION- PARAMETERS ARE:
;  P1 QUADRANT NUMBER
; P2X START ADDRESS 0-255
; P3Y START ADDRESS 0-255
; P4RESULT DESTINATION  1 WORD IN LENGTH
;
;THIS ROUTINE ACCESSES EVERY OTHER PIXEL OF EVERY OTHER LINE
;FOR 2 LINES AND 4 PIXELS HORIZONTALLY; THERE ARE THEREFORE
;4X2=8 PIXELS SAMPLED.  THE SAMPLE VALUES ARE FROM 0-255 AND
;SUMMED IN BP THEN TRANSFERRED TO P4.  P4 MUST BE 1 WORD
;      (2 BYTES) IN LENGTH
;
FUNCTION       MACRO  P1,P2,P3,P4
  LOCAL  FUNC4,L1
;SELECT QUADRANT   00 IS FIRST QUAD      UPPER LEFT
;    01 IS SECOND UPPER RIGHT
;    11 IS THIRD LOWER RIGHT
;    10 IS FOURTH LOWER LEFT
  MOV DX,FRMSEL
  IN AL,DX
  AND AL,11111100B
  OR AL,P1
  OUT DX,AL
```

```
;
;GATHER PIXELS AND SUM THEM
;
                MOV    BP,0000H ;ZERO ACCUMULATION REG
                MOV AH,00H ;ZERO AH
    MOV DX,4 ;SET LINE LOOP TO 4 TIMES
        ;(2 ACTIVE)
;
    MOV BX,P3 ;SET Y COORDINATE
L1: MOV    SI,P2 ;SET X COORDINATE
    MOV CX,8 ;SET PIX LOOP TO 8 TIMES
        ;(4 ACTIVE)

FUNC4: MOV AL,ES:[SI+BX] ;GET PIXEL DATA

ADD BP,AX ;SUM TO ACCUM REG

INC SI
    INC SI ;INCREMENT PIX ADDR TWICE
    DEC CX ;DECREMENT CX ONCE
    LOOP FUNC4 ;LOOP THROUGH 16 PIXELS (8
        ;ACTIVE)

INC BH
    INC BH ;INCREMENT LINE ADDR TWICE
    DEC DX
    DEC DX ;DECREMENT LINE LOOP COUNTER TWICE

JNZ L1 ;LOOP BACK IF NOT DONE
    MOV P4,BP
    MOV CL,3
    SHR P4,CL
    ENDM           ;BACK TO CALLER
;;;;;;;;;;;;;;;;;;;;;;;;;;;;;;;;;;;;;;;;;;;;;;;;;;;
;DRAW MACRO THIS MACRO DISPLAYS THE LOCATION OF THE
;  SAMPLING AREAS AS BOXES ON THE SCREEN
;
DRAW            MACRO    K1,K2,K3
    LOCAL    E1,E2,E3,E4
; K1 IS QUADRANT
; K2 IS X
; K3 IS Y
;
;SELECT QUADRANT   00 IS FIRST QUAD UPPER LEFT
;     01 IS SECOND UPPER RIGHT
;     11 IS THIRD LOWER RIGHT
;     10 IS FOURTH LOWER LEFT
    MOV DX,FRMSEL
    IN AL,DX
    AND AL,11111100B
    OR AL,K1
    OUT DX,AL
;
;OUTPUT FIRST HORIZONTAL LINE
;
                MOV AL,0FFH ;SET DATA
;
    MOV BX,K3 ;SET Y COORDINATE
    MOV    SI,K2 ;SET X COORDINATE
    MOV CX,8 ;SET PIX LOOP TO 8 TIMES

E1: MOV    ES:[SI+BX],AL ;WRITE LINE
    INC SI
    LOOP E1 ;LOOP THROUGH 8 PIXELS
```

```
;
; WRITE SECOND HORIZONAL LINE
  MOV    SI,K2 ;SET X COORDINATE
  MOVCX,8 ;SET PIX LOOP TO 8 TIMES
  ADDBX,0400H

E2: MOV   ES:[SI+BX],AL;WRITE LINE
   INCSI
   LOOPE2 ;LOOP THROUGH 8 PIXELS
;
; WRITE FIRST VERTICAL LINE
;
   MOVBX,K3 ;SET Y COORDINATE
   MOV    SI,K2 ;SET X COORDINATE
   MOVCX,4 ;SET PIX LOOP TO 4 TIMES

E3: MOV   ES:[SI+BX],AL;WRITE LINE
   INCBH
   LOOPE3 ;LOOP THROUGH 4 PIXELS

;
; WRITE SECOND VERTICAL LINE
;
   MOVBX,K3 ;SET Y COORDINATE
   MOVCX,4 ;SET PIX LOOP TO 4 TIMES
   ADD  SI,8

E4: MOV   ES:[SI+BX],AL;WRITE LINE
   INCBH
   LOOPE4 ;LOOP THROUGH 4 PIXELS

ENDM           ;BACK TO CALLER
;********************************************
;GRAB   MACRO
;TELL FRAME GRABBER TO CAPTURE A FRAME
;
GRAB           MACRO

MOVDX,CSR0
   INAL,DX ;READ CSR0 PORT
   ORAL,00100000B;SET ACQMODE1 BIT
   ANDAL,11101111B;CLEAR ACQMODE0 BIT
   OUTDX,AL ;OUTPUT SINGLE FRAME CAP. COMM.
   ENDM
;*************************************************************
;ASSEMBLER OVERHEAD
;
  PGROUP GROUPCSEG ;CODE GROUP IS PGROUP
  DGROUP GROUPDAREA,STACK

0000   STACK SEGMENTSTACK
0000   0400 [   DB0400H DUP(?);ALLOCATE 1024 BYTE STACK
              ??
                   ]

0400   STACK ENDS

0000   DAREA SEGMENT WORD PUBLIC
   ;
   ;
   ;***********************************************************
   ;DATA, MESSAGES, BUFFERS GO HERE
   ;
```

```
;
0000    01 [    TIMARK DW01H DUP(?);DEFINE TIME MARK LOCATION IN MEMR
                ????
                    ]
0002    01 [    TIMSAV DW01H DUP(?);DEFINE SAVE MARK LOCATION IN MEMR
                ????
                    ]

0004    01 [    FLAG DW01H DUP(?);SEMAPHORE BETWEEN INTERRUPT ROUTINE
                ????
                    ]

;       AND BASE PROGRAM
0006    01 [    LOC1 DW01H DUP(?)
                ????
                    ]

0008    01 [    LOC2 DW01H DUP(?)
                ????
                    ]

000A    01 [    LOC3 DW01H DUP(?)
                ????
                    ]

000C    01 [    LOC4 DW01H DUP(?)
                ????
                    ]

000E    01 [    TEMP DW01H DUP(?)
                ????
                    ]

;
0010    DAREA ENDS

0000    CSEG SEGMENT WORD PUBLIC;CSEG WORD ALIGNED
        ;AND PUBLIC FOR OTHER MODULES
    ;
    ;
    ;**************************************************************
    ;CODE STARTS HERE (DOS RELATED)
    ;
0000    START PROCFAR ;SETS UP FOR RETURN LATER

ASSUME CS:PGROUP, SS:STACK, DS:DGROUP, ES:NOTHING

0000 BC 0400    MOVSP,0400H;LOAD STACK POINTER
0003 B8 ---- R  MOVAX,STACK
0006 8E D0      MOVSS,AX ;LOAD STACK SEGMENT
0008 1E         PUSHDS ;SAVE DATA SEGMENT ON STACK
0009 33 C0      XORAX,AX ;ZERO AX
000B 50         PUSHAX ;PUSH ZERO ON STACK
            ;DOS RETURN ADDRESS ON STACK

000C B8 ---- R  MOVAX,DGROUP
000F 8E D8      MOVDS,AX ;LOADS DGROUP INTO DS
    ;
    ;
    ;**************************************************************
    ;**************************************************************
    ;APPLICATION CODE STARTS HERE
    ;
0011    PCV:
```

```
0011  B9 0000      MOV   CX,0000H
0014  8E C1        MOV   ES,CX    ;ES SEG LOADED WITH ABSO 0

0016  8C C9        MOV   CX,CS    ;CX LOADED WITH CODE SEG
0018  26: 89 0E 002E R    MOV ES:VSYNC+2,CX;LOAD INTR SEG REG 001D  26: C7 06 002C R 047F R  MOV ES:VSYNC,OFFSET INTR;LOAD INTR #3 VECTOR
                        ;ADDRESS

0024  B9 6000      MOV   CX,IMBASE;IMAGE BASE ADDR INTO CX
0027  8E C1        MOV   ES,CX    ;IMAGE BASE ADDR INTO ES

0029  C7 06 0000 R 0000  MOV TIMARK,0000H;INIT TIME MARK MEMR LOC TO 0

002F  E8 042B R    CALL  INIT
0032  E8 0410 R    CALL  CLEAR

0035  E4 21        IN    AL,IMSKPRT;GET INTR MASK
0037  24 F7        AND   AL,11110111B;SET INTR #3 MASK ON (=0)
0039  E6 21        OUT   IMSKPRT,AL;OUTPUT MASK

003B  B0 20        MOV   AL,20H
003D  E6 20        OUT   ICOMPRT,AL;OUTPUT END OF INTR TO 8259

003F  BA FF01      MOV   DX,CSR1
0042  EC           IN    AL,DX
0043  0C 80        OR    AL,10000000B;ENABLE PCVISION INTR OP
0045  EE           OUT   DX,AL ;OUTPUT CSR1 PORT

;
      ; INITIALIZE LOOK UP TABLE FOR RAMP WITH
      ; LSB EQUAL TO FULL WHITE
      ;
0046  E8 0436 R    CALL  ILUT
      ;;;;;;;;;;;;;;;;;;;;;;;;;;;;;;;;;;;;;;;;;;;;;;;;;;
      ;SET UP VALUES USED FOR SAMPLING REGIONS
      ;THEY ARE USED BY THE FUNCTION AND DRAW
      ;MACROS
      ;
= 0080       X_SQ1 EQU 80H
= 4000       Y_SQ1 EQU 04000H

= 0040       X_SQ2 EQU 40H
= 8000       Y_SQ2 EQU 8000H

= 0020       X_SQ3 EQU 20H
= 2000       Y_SQ3 EQU 2000H

= 0040       X_SQ4 EQU 40H
= 8000       Y_SQ4 EQU 08000H

DRAW   00000000B,X_SQ1,Y_SQ1 ;UPPER LEFT
0049  BA FF05            +  MOV DX,FRMSEL
004C  EC                 +  IN  AL,DX
004D  24 FC              +  AND AL,11111100B
004F  0C 00              +  OR  AL,00000000B
0051  EE                 +  OUT DX,AL
0052  B0 FF              +       MOV AL,0FFH ;SET DATA
0054  BB 4000            +  MOV BX,Y_SQ1 ;SET Y COORDINATE
0057  BE 0080            +  MOV SI,X_SQ1 ;SET X COORDINATE
005A  B9 0008            +  MOV CX,8 ;SET PIX LOOP TO 8 TIMES
005D  26: 88 00          +??0000: MOV ES:[SI+BX],AL;WRITE LINE
0060  46                 +  INC SI
```

```
0061 E2 FA              + LOOP??0000 ;LOOP THROUGH 8 PIXELS
0063 BE 0080            + MOV    SI,X_SQ1 ;SET X COORDINATE
0066 B9 0008            + MOVCX,8 ;SET PIX LOOP TO 8 TIMES
0069 81 C3 0400         + ADDBX,0400H
006D 26: 88 00          +??0001: MOV    ES:[SI+BX],AL;WRITE LINE
0070 46                 + INCSI
0071 E2 FA              + LOOP??0001 ;LOOP THROUGH 8 PIXELS
0073 BB 4000            + MOVBX,Y_SQ1 ;SET Y COORDINATE
0076 BE 0080            + MOV    SI,X_SQ1 ;SET X COORDINATE
0079 B9 0004            + MOVCX,4 ;SET PIX LOOP TO 4 TIMES
007C 26: 88 00          +??0002: MOV    ES:[SI+BX],AL;WRITE LINE
007F FE C7              + INCBH
0081 E2 F9              + LOOP??0002 ;LOOP THROUGH 4 PIXELS
0083 BB 4000            + MOVBX,Y_SQ1 ;SET Y COORDINATE
0086 B9 0004            + MOVCX,4 ;SET PIX LOOP TO 4 TIMES
0089 83 C6 08           + ADD SI,8
008C 26: 88 00          +??0003: MOV    ES:[SI+BX],AL;WRITE LINE
008F FE C7              + INCBH
0091 E2 F9              + LOOP??0003 ;LOOP THROUGH 4 PIXELS
     DRAW     00000001B,X_SQ2,Y_SQ2 ;UPPER RIGHT
0093 BA FF05            + MOVDX,FRMSEL
0096 EC                 + INAL,DX
0097 24 FC              + AND AL,11111100B
0099 0C 01              + OR AL,00000001B
009B EE                 + OUTDX,AL
009C B0 FF              +            MOVAL,0FFH ;SET DATA
009E BB 8000            + MOVBX,Y_SQ2 ;SET Y COORDINATE
00A1 BE 0040            + MOV    SI,X_SQ2 ;SET X COORDINATE
00A4 B9 0008            + MOVCX,8 ;SET PIX LOOP TO 8 TIMES
00A7 26: 88 00          +??0004: MOV    ES:[SI+BX],AL;WRITE LINE
00AA 46                 + INCSI
00AB E2 FA              + LOOP??0004 ;LOOP THROUGH 8 PIXELS
00AD BE 0040            + MOV    SI,X_SQ2 ;SET X COORDINATE
00B0 B9 0008            + MOVCX,8 ;SET PIX LOOP TO 8 TIMES
00B3 81 C3 0400         + ADDBX,0400H
00B7 26: 88 00          +??0005: MOV    ES:[SI+BX],AL;WRITE LINE
00BA 46                 + INCSI
00BB E2 FA              + LOOP??0005 ;LOOP THROUGH 8 PIXELS
00BD BB 8000            + MOVBX,Y_SQ2 ;SET Y COORDINATE
00C0 BE 0040            + MOV    SI,X_SQ2 ;SET X COORDINATE
00C3 B9 0004            + MOVCX,4 ;SET PIX LOOP TO 4 TIMES
00C6 26: 88 00          +??0006: MOV    ES:[SI+BX],AL;WRITE LINE
00C9 FE C7              + INCBH
00CB E2 F9              + LOOP??0006 ;LOOP THROUGH 4 PIXELS
00CD BB 8000            + MOVBX,Y_SQ2 ;SET Y COORDINATE
00D0 B9 0004            + MOVCX,4 ;SET PIX LOOP TO 4 TIMES
00D3 83 C6 08           + ADD SI,8
00D6 26: 88 00          +??0007: MOV    ES:[SI+BX],AL;WRITE LINE
00D9 FE C7              + INCBH
00DB E2 F9              + LOOP??0007 ;LOOP THROUGH 4 PIXELS
     DRAW     00000011B,X_SQ3,Y_SQ3 ;LOWER RIGHT
00DD BA FF05            + MOVDX,FRMSEL
00E0 EC                 + INAL,DX
00E1 24 FC              + AND AL,11111100B
00E3 0C 03              + OR AL,00000011B
00E5 EE                 + OUTDX,AL
00E6 B0 FF              +            MOVAL,0FFH ;SET DATA
00E8 BB 2000            + MOVBX,Y_SQ3 ;SET Y COORDINATE
00EB BE 0020            + MOV    SI,X_SQ3 ;SET X COORDINATE
00EE B9 0008            + MOVCX,8 ;SET PIX LOOP TO 8 TIMES
00F1 26: 88 00          +??0008: MOV    ES:[SI+BX],AL;WRITE LINE
00F4 46                 + INCSI
00F5 E2 FA              + LOOP??0008 ;LOOP THROUGH 8 PIXELS
00F7 BE 0020            + MOV    SI,X_SQ3 ;SET X COORDINATE
```

```
00FA  B9 0008              +       MOVCX,8 ;SET PIX LOOP TO 8 TIMES
00FD  81 C3 0400           +       ADDBX,0400H
0101  26: 88 00            +??0009: MOV      ES:[SI+BX],AL;WRITE LINE
0104  46                   +       INCSI
0105  E2 FA                +       LOOP??0009 ;LOOP THROUGH 8 PIXELS
0107  BB 2000              +       MOVBX,Y_SQ3 ;SET Y COORDINATE
010A  BE 0020              +       MOV     SI,X_SQ3 ;SET X COORDINATE
010D  B9 0004              +       MOVCX,4 ;SET PIX LOOP TO 4 TIMES
0110  26: 88 00            +??000A: MOV      ES:[SI+BX],AL;WRITE LINE
0113  FE C7                +       INCBH
0115  E2 F9                +       LOOP??000A ;LOOP THROUGH 4 PIXELS
0117  BB 2000              +       MOVBX,Y_SQ3 ;SET Y COORDINATE
011A  B9 0004              +       MOVCX,4 ;SET PIX LOOP TO 4 TIMES
011D  83 C6 08             +       ADD SI,8
0120  26: 88 00            +??000B: MOV      ES:[SI+BX],AL;WRITE LINE
0123  FE C7                +       INCBH
0125  E2 F9                +       LOOP??000B ;LOOP THROUGH 4 PIXELS
      DRAW    00000010B,X_SQ4,Y_SQ4 ;LOWER LEFT
0127  BA FF05              +       MOVDX,FRMSEL
012A  EC                   +       INAL,DX
012B  24 FC                +       AND AL,11111100B
012D  0C 02                +       OR AL,00000010B
012F  EE                   +       OUTDX,AL
0130  B0 FF                +              MOVAL,0FFH ;SET DATA
0132  BB 8000              +       MOVBX,Y_SQ4 ;SET Y COORDINATE
0135  BE 0040              +       MOV     SI,X_SQ4 ;SET X COORDINATE
0138  B9 0008              +       MOVCX,8 ;SET PIX LOOP TO 8 TIMES
013B  26: 88 00            +??000C: MOV      ES:[SI+BX],AL;WRITE LINE
013E  46                   +       INCSI
013F  E2 FA                +       LOOP??000C ;LOOP THROUGH 8 PIXELS
0141  BE 0040              +       MOV     SI,X_SQ4 ;SET X COORDINATE
0144  B9 0008              +       MOVCX,8 ;SET PIX LOOP TO 8 TIMES
0147  81 C3 0400           +       ADDBX,0400H
014B  26: 88 00            +??000D: MOV      ES:[SI+BX],AL;WRITE LINE
014E  46                   +       INCSI
014F  E2 FA                +       LOOP??000D ;LOOP THROUGH 8 PIXELS
0151  BB 8000              +       MOVBX,Y_SQ4 ;SET Y COORDINATE
0154  BE 0040              +       MOV     SI,X_SQ4 ;SET X COORDINATE
0157  B9 0004              +       MOVCX,4 ;SET PIX LOOP TO 4 TIMES
015A  26: 88 00            +??000E: MOV      ES:[SI+BX],AL;WRITE LINE
015D  FE C7                +       INCBH
015F  E2 F9                +       LOOP??000E ;LOOP THROUGH 4 PIXELS
0161  BB 8000              +       MOVBX,Y_SQ4 ;SET Y COORDINATE
0164  B9 0004              +       MOVCX,4 ;SET PIX LOOP TO 4 TIMES
0167  83 C6 08             +       ADD SI,8
016A  26: 88 00            +??000F: MOV      ES:[SI+BX],AL;WRITE LINE
016D  FE C7                +       INCBH
016F  E2 F9                +       LOOP??000F ;LOOP THROUGH 4 PIXELS

DRAW    00000000B,X_SQ1+1,Y_SQ1+100H
0171  BA FF05              +       MOVDX,FRMSEL
0174  EC                   +       INAL,DX
0175  24 FC                +       AND AL,11111100B
0177  0C 00                +       OR AL,00000000B
0179  EE                   +       OUTDX,AL
017A  B0 FF                +              MOVAL,0FFH ;SET DATA
017C  BB 4100              +       MOVBX,Y_SQ1+100H ;SET Y COORDINATE
017F  BE 0081              +       MOV     SI,X_SQ1+1 ;SET X COORDINATE
0182  B9 0008              +       MOVCX,8 ;SET PIX LOOP TO 8 TIMES
0185  26: 88 00            +??0010: MOV      ES:[SI+BX],AL;WRITE LINE
0188  46                   +       INCSI
0189  E2 FA                +       LOOP??0010 ;LOOP THROUGH 8 PIXELS
018B  BE 0081              +       MOV     SI,X_SQ1+1 ;SET X COORDINATE
018E  B9 0008              +       MOVCX,8 ;SET PIX LOOP TO 8 TIMES
```

```
0191  81 C3 0400              + ADDBX,0400H
0195  26: 88 00               +??0011: MOV     ES:[SI+BX],AL;WRITE LINE
0198  46                      + INCSI
0199  E2 FA                   + LOOP??0011 ;LOOP THROUGH 8 PIXELS
019B  BB 4100                 + MOVBX,Y_SQ1+100H ;SET Y COORDINATE
019E  BE 0081                 + MOV     SI,X_SQ1+1 ;SET X COORDINATE
01A1  B9 0004                 + MOVCX,4 ;SET PIX LOOP TO 4 TIMES
01A4  26: 88 00               +??0012: MOV     ES:[SI+BX],AL;WRITE LINE
01A7  FE C7                   + INCBH
01A9  E2 F9                   + LOOP??0012 ;LOOP THROUGH 4 PIXELS
01AB  BB 4100                 + MOVBX,Y_SQ1+100H ;SET Y COORDINATE
01AE  B9 0004                 + MOVCX,4 ;SET PIX LOOP TO 4 TIMES
01B1  83 C6 08                + ADD SI,8
01B4  26: 88 00               +??0013: MOV     ES:[SI+BX],AL;WRITE LINE
01B7  FE C7                   + INCBH
01B9  E2 F9                   + LOOP??0013 ;LOOP THROUGH 4 PIXELS
      DRAW    00000001B,X_SQ2+1,Y_SQ2+100H
01BB  BA FF05                 + MOVDX,FRMSEL
01BE  EC                      + INAL,DX
01BF  24 FC                   + AND AL,11111100B
01C1  0C 01                   + OR AL,00000001B
01C3  EE                      + OUTDX,AL
01C4  B0 FF                   +          MOVAL,0FFH ;SET DATA
01C6  BB 8100                 + MOVBX,Y_SQ2+100H ;SET Y COORDINATE
01C9  BE 0041                 + MOV     SI,X_SQ2+1 ;SET X COORDINATE
01CC  B9 0008                 + MOVCX,8 ;SET PIX LOOP TO 8 TIMES
01CF  26: 88 00               +??0014: MOV     ES:[SI+BX],AL;WRITE LINE
01D2  46                      + INCSI
01D3  E2 FA                   + LOOP??0014 ;LOOP THROUGH 8 PIXELS
01D5  BE 0041                 + MOV     SI,X_SQ2+1 ;SET X COORDINATE
01D8  B9 0008                 + MOVCX,8 ;SET PIX LOOP TO 8 TIMES
01DB  81 C3 0400              + ADDBX,0400H
01DF  26: 88 00               +??0015: MOV     ES:[SI+BX],AL;WRITE LINE
01E2  46                      + INCSI
01E3  E2 FA                   + LOOP??0015 ;LOOP THROUGH 8 PIXELS
01E5  BB 8100                 + MOVBX,Y_SQ2+100H ;SET Y COORDINATE
01E8  BE 0041                 + MOV     SI,X_SQ2+1 ;SET X COORDINATE
01EB  B9 0004                 + MOVCX,4 ;SET PIX LOOP TO 4 TIMES
01EE  26: 88 00               +??0016: MOV     ES:[SI+BX],AL;WRITE LINE
01F1  FE C7                   + INCBH
01F3  E2 F9                   + LOOP??0016 ;LOOP THROUGH 4 PIXELS
01F5  BB 8100                 + MOVBX,Y_SQ2+100H ;SET Y COORDINATE
01F8  B9 0004                 + MOVCX,4 ;SET PIX LOOP TO 4 TIMES
01FB  83 C6 08                + ADD SI,8
01FE  26: 88 00               +??0017: MOV     ES:[SI+BX],AL;WRITE LINE
0201  FE C7                   + INCBH
0203  E2 F9                   + LOOP??0017 ;LOOP THROUGH 4 PIXELS
      DRAW    00000011B,X_SQ3+1,Y_SQ3+100H
0205  BA FF05                 + MOVDX,FRMSEL
0208  EC                      + INAL,DX
0209  24 FC                   + AND AL,11111100B
020B  0C 03                   + OR AL,00000011B
020D  EE                      + OUTDX,AL
020E  B0 FF                   +          MOVAL,0FFH ;SET DATA
0210  BB 2100                 + MOVBX,Y_SQ3+100H ;SET Y COORDINATE
0213  BE 0021                 + MOV     SI,X_SQ3+1 ;SET X COORDINATE
0216  B9 0008                 + MOVCX,8 ;SET PIX LOOP TO 8 TIMES
0219  26: 88 00               +??0018: MOV     ES:[SI+BX],AL;WRITE LINE
021C  46                      + INCSI
021D  E2 FA                   + LOOP??0018 ;LOOP THROUGH 8 PIXELS
021F  BE 0021                 + MOV     SI,X_SQ3+1 ;SET X COORDINATE
0222  B9 0008                 + MOVCX,8 ;SET PIX LOOP TO 8 TIMES
0225  81 C3 0400              + ADDBX,0400H
0229  26: 88 00               +??0019: MOV     ES:[SI+BX],AL;WRITE LINE
```

```
022C  46                    +        INCSI
022D  E2 FA                 +        LOOP??0019 ;LOOP THROUGH 8 PIXELS
022F  BB 2100               +        MOVBX,Y_SQ3+100H ;SET Y COORDINATE
0232  BE 0021               +        MOV    SI,X_SQ3+1 ;SET X COORDINATE
0235  B9 0004               +        MOVCX,4 ;SET PIX LOOP TO 4 TIMES
0238  26: 88 00             +??001A: MOV    ES:[SI+BX],AL;WRITE LINE
023B  FE C7                 +        INCBH
023D  E2 F9                 +        LOOP??001A ;LOOP THROUGH 4 PIXELS
023F  BB 2100               +        MOVBX,Y_SQ3+100H ;SET Y COORDINATE
0242  B9 0004               +        MOVCX,4 ;SET PIX LOOP TO 4 TIMES
0245  83 C6 08              +        ADD SI,8
0248  26: 88 00             +??001B: MOV    ES:[SI+BX],AL;WRITE LINE
024B  FE C7                 +        INCBH
024D  E2 F9                 +        LOOP??001B ;LOOP THROUGH 4 PIXELS
      DRAW    00000010B,X_SQ4+1,Y_SQ4+100H
024F  BA FF05               +        MOVDX,FRMSEL
0252  EC                    +        INAL,DX
0253  24 FC                 +        AND AL,11111100B
0255  0C 02                 +        OR AL,00000010B
0257  EE                    +        OUTDX,AL
0258  B0 FF                 +                MOVAL,0FFH ;SET DATA
025A  BB 8100               +        MOVBX,Y_SQ4+100H ;SET Y COORDINATE
025D  BE 0041               +        MOV    SI,X_SQ4+1 ;SET X COORDINATE
0260  B9 0008               +        MOVCX,8 ;SET PIX LOOP TO 8 TIMES
0263  26: 88 00             +??001C: MOV    ES:[SI+BX],AL;WRITE LINE
0266  46                    +        INCSI
0267  E2 FA                 +        LOOP??001C ;LOOP THROUGH 8 PIXELS
0269  BE 0041               +        MOV    SI,X_SQ4+1 ;SET X COORDINATE
026C  B9 0008               +        MOVCX,8 ;SET PIX LOOP TO 8 TIMES
026F  81 C3 0400            +        ADDBX,0400H
0273  26: 88 00             +??001D: MOV    ES:[SI+BX],AL;WRITE LINE
0276  46                    +        INCSI
0277  E2 FA                 +        LOOP??001D ;LOOP THROUGH 8 PIXELS
0279  BB 8100               +        MOVBX,Y_SQ4+100H ;SET Y COORDINATE
027C  BE 0041               +        MOV    SI,X_SQ4+1 ;SET X COORDINATE
027F  B9 0004               +        MOVCX,4 ;SET PIX LOOP TO 4 TIMES
0282  26: 88 00             +??001E: MOV    ES:[SI+BX],AL;WRITE LINE
0285  FE C7                 +        INCBH
0287  E2 F9                 +        LOOP??001E ;LOOP THROUGH 4 PIXELS
0289  BB 8100               +        MOVBX,Y_SQ4+100H ;SET Y COORDINATE
028C  B9 0004               +        MOVCX,4 ;SET PIX LOOP TO 4 TIMES
028F  83 C6 08              +        ADD SI,8
0292  26: 88 00             +??001F: MOV    ES:[SI+BX],AL;WRITE LINE
0295  FE C7                 +        INCBH
0297  E2 F9                 +        LOOP??001F ;LOOP THROUGH 4 PIXELS

GRAB
0299  BA FF00               +        MOVDX,CSR0
029C  EC                    +        INAL,DX ;READ CSR0 PORT
029D  0C 20                 +        ORAL,00100000B;SET ACQMODE1 BIT
029F  24 EF                 +        ANDAL,11101111B;CLEAR ACQMODE0 BIT
02A1  EE                    +        OUTDX,AL ;OUTPUT SINGLE FRAME CAP. COMM.
      FLAGS
02A2  A1 0004 R             +??0020: MOVAX,FLAG
02A5  24 FF                 +        ANDAL,0FFH
02A7  74 F9                 +        JE??0020
02A9  C7 06 0004 R 0000     +        MOVFLAG,0

02AF  8B 1E 0000 R  PCV1:   MOVBX,TIMARK;SAVE TIME MARK IN TIMSAV
02B3  89 1E 0002 R    MOV   TIMSAV,BX

;GET DATA FROM FIRST SAMPLING REGION AND SEND
      ;TO THE INTEL, THEN REPEAT FOR OTHER REGIONS
      ;
```

```
        FUNCTION 00000000B,X_SQ1,Y_SQ1,LOC1
02B7  BA FF05              +       MOV DX,FRMSEL
02BA  EC                   +       IN AL,DX
02BB  24 FC                +       AND AL,11111100B
02BD  0C 00                +       OR AL,00000000B
02BF  EE                   +       OUT DX,AL
02C0  BD 0000              +               MOV     BP,0000H;ZERO ACCUMULATION REG
02C3  B4 00                +               MOV AH,00H ;ZERO AH
02C5  BA 0004              +       MOV DX,4 ;SET LINE LOOP TO 4 TIMES
02C8  BB 4000              +       MOV BX,Y_SQ1 ;SET Y COORDINATE
02CB  BE 0080              +??0022: MOV    SI,X_SQ1 ;SET X COORDINATE
02CE  B9 0008              +       MOV CX,8 ;SET PIX LOOP TO 8 TIMES
02D1  26: 8A 00            +??0021: MOV AL,ES:[SI+BX];GET PIXEL DATA
02D4  03 E8                +       ADD BP,AX ;SUM TO ACCUM REG
02D6  46                   +       INC SI
02D7  46                   +       INC SI ;INCREMENT PIX ADDR TWICE
02D8  49                   +       DEC CX ;DECREMENT CX ONCE
02D9  E2 F6                +       LOOP ??0021 ;LOOP THROUGH 16 PIXELS (8
02DB  FE C7                +       INC BH
02DD  FE C7                +       INC BH ;INCREMENT LINE ADDR TWICE
02DF  4A                   +       DEC DX
02E0  4A                   +       DEC DX ;DECREMENT LINE LOOP COUNTER TWICE
02E1  75 E8                +       JNZ ??0022 ;LOOP BACK IF NOT DONE
02E3  89 2E 0006 R         +       MOV LOC1,BP
02E7  B1 03                +       MOV CL,3
02E9  D3 2E 0006 R         +       SHR LOC1,CL
      SEND1LOC1
02ED  BA 03FD              +       MOV DX,COMMSTAT
02F0  EC                   +??0024: IN AL,DX
02F1  24 20                +       AND AL,00100000B
02F3  74 FB                +       JZ ??0024
02F5  BA 03F8              +       MOV DX,COMMDATA
02F8  A1 0006 R            +       MOV AX,LOC1
02FB  EE                   +       OUT DX,AL

FUNCTION 00000001B,X_SQ2,Y_SQ2,LOC2
02FC  BA FF05              +       MOV DX,FRMSEL
02FF  EC                   +       IN AL,DX
0300  24 FC                +       AND AL,11111100B
0302  0C 01                +       OR AL,00000001B
0304  EE                   +       OUT DX,AL
0305  BD 0000              +               MOV     BP,0000H;ZERO ACCUMULATION REG
0308  B4 00                +               MOV AH,00H ;ZERO AH
030A  BA 0004              +       MOV DX,4 ;SET LINE LOOP TO 4 TIMES
030D  BB 8000              +       MOV BX,Y_SQ2 ;SET Y COORDINATE
0310  BE 0040              +??0026: MOV    SI,X_SQ2 ;SET X COORDINATE
0313  B9 0008              +       MOV CX,8 ;SET PIX LOOP TO 8 TIMES
0316  26: 8A 00            +??0025: MOV AL,ES:[SI+BX];GET PIXEL DATA
0319  03 E8                +       ADD BP,AX ;SUM TO ACCUM REG
031B  46                   +       INC SI
031C  46                   +       INC SI ;INCREMENT PIX ADDR TWICE
031D  49                   +       DEC CX ;DECREMENT CX ONCE
031E  E2 F6                +       LOOP ??0025 ;LOOP THROUGH 16 PIXELS (8
0320  FE C7                +       INC BH
0322  FE C7                +       INC BH ;INCREMENT LINE ADDR TWICE
0324  4A                   +       DEC DX
0325  4A                   +       DEC DX ;DECREMENT LINE LOOP COUNTER TWICE
0326  75 E8                +       JNZ ??0026 ;LOOP BACK IF NOT DONE
0328  89 2E 0008 R         +       MOV LOC2,BP
032C  B1 03                +       MOV CL,3
032E  D3 2E 0008 R         +       SHR LOC2,CL
      SEND1LOC2
0332  BA 03FD              +       MOV DX,COMMSTAT
0335  EC                   +??0028: IN AL,DX
```

```
0336  24 20              +       AND   AL,00100000B
0338  74 FB              +       JZ??0028
033A  BA 03F8            +       MOV   DX,COMMDATA
033D  A1 0008 R          +       MOV   AX,LOC2
0340  EE                 +       OUT   DX,AL
      FUNCTION 00000011B,X_SQ3,Y_SQ3,LOC3
0341  BA FF05            +       MOV   DX,FRMSEL
0344  EC                 +       IN    AL,DX
0345  24 FC              +       AND   AL,11111100B
0347  0C 03              +       OR    AL,00000011B
0349  EE                 +       OUT   DX,AL
034A  BD 0000            +              MOV   BP,0000H;ZERO ACCUMULATION REG
034D  B4 00              +              MOV   AH,00H ;ZERO AH
034F  BA 0004            +       MOV   DX,4 ;SET LINE LOOP TO 4 TIMES
0352  BB 2000            +       MOV   BX,Y_SQ3 ;SET Y COORDINATE
0355  BE 0020            +??002A: MOV   SI,X_SQ3 ;SET X COORDINATE
0358  B9 0008            +       MOV   CX,8 ;SET PIX LOOP TO 8 TIMES
035B  26: 8A 00          +??0029: MOV   AL,ES:[SI+BX];GET PIXEL DATA
035E  03 E8              +       ADD   BP,AX ;SUM TO ACCUM REG
0360  46                 +       INC   SI
0361  46                 +       INC   SI ;INCREMENT PIX ADDR TWICE
0362  49                 +       DEC   CX ;DECREMENT CX ONCE
0363  E2 F6              +       LOOP??0029 ;LOOP THROUGH 16 PIXELS (8
0365  FE C7              +       INC   BH
0367  FE C7              +       INC   BH ;INCREMENT LINE ADDR TWICE
0369  4A                 +       DEC   DX
036A  4A                 +       DEC   DX ;DECREMENT LINE LOOP COUNTER TWICE
036B  75 E8              +       JNZ??002A ;LOOP BACK IF NOT DONE
036D  89 2E 000A R       +       MOV   LOC3,BP
0371  B1 03              +       MOV   CL,3
0373  D3 2E 000A R       +       SHR   LOC3,CL
      SEND1LOC3
0377  BA 03FD            +       MOV   DX,COMMSTAT
037A  EC                 +??002C: IN    AL,DX
037B  24 20              +       AND   AL,00100000B
037D  74 FB              +       JZ??002C
037F  BA 03F8            +       MOV   DX,COMMDATA
0382  A1 000A R          +       MOV   AX,LOC3
0385  EE                 +       OUT   DX,AL

FUNCTION 00000010B,X_SQ4,Y_SQ4,LOC4
0386  BA FF05            +       MOV   DX,FRMSEL
0389  EC                 +       IN    AL,DX
038A  24 FC              +       AND   AL,11111100B
038C  0C 02              +       OR    AL,00000010B
038E  EE                 +       OUT   DX,AL
038F  BD 0000            +              MOV   BP,0000H;ZERO ACCUMULATION REG
0392  B4 00              +              MOV   AH,00H ;ZERO AH
0394  BA 0004            +       MOV   DX,4 ;SET LINE LOOP TO 4 TIMES
0397  BB 8000            +       MOV   BX,Y_SQ4 ;SET Y COORDINATE
039A  BE 0040            +??002E: MOV   SI,X_SQ4 ;SET X COORDINATE
039D  B9 0008            +       MOV   CX,8 ;SET PIX LOOP TO 8 TIMES
03A0  26: 8A 00          +??002D: MOV   AL,ES:[SI+BX];GET PIXEL DATA
03A3  03 E8              +       ADD   BP,AX ;SUM TO ACCUM REG
03A5  46                 +       INC   SI
03A6  46                 +       INC   SI ;INCREMENT PIX ADDR TWICE
03A7  49                 +       DEC   CX ;DECREMENT CX ONCE
03A8  E2 F6              +       LOOP??002D ;LOOP THROUGH 16 PIXELS (8
03AA  FE C7              +       INC   BH
03AC  FE C7              +       INC   BH ;INCREMENT LINE ADDR TWICE
03AE  4A                 +       DEC   DX
03AF  4A                 +       DEC   DX ;DECREMENT LINE LOOP COUNTER TWICE
03B0  75 E8              +       JNZ??002E ;LOOP BACK IF NOT DONE
03B2  89 2E 000C R       +       MOV   LOC4,BP
```

```
03B6  B1 03              +    MOVCL,3
03B8  D3 2E 000C R       +    SHRLOC4,CL
      GRAB   ;GET NEXT FRAME
03BC  BA FF00            +    MOVDX,CSR0
03BF  EC                 +    INAL,DX ;READ CSR0 PORT
03C0  0C 20              +    ORAL,00100000B;SET ACQMODE1 BIT
03C2  24 EF              +    ANDAL,11101111B;CLEAR ACQMODE0 BIT
03C4  EE                 +    OUTDX,AL ;OUTPUT SINGLE FRAME CAP. COMM.
      SEND1LOC4
03C5  BA 03FD            +    MOVDX,COMMSTAT
03C8  EC                 +??0030: INAL,DX
03C9  24 20              +    AND AL,00100000B
03CB  74 FB              +    JZ??0030
03CD  BA 03F8            +    MOV DX,COMMDATA
03D0  A1 000C R          +    MOVAX,LOC4
03D3  EE                 +    OUTDX,AL

;SEND TIME DATA
      SEND2TIMSAV
03D4  BA 03FD            +    MOVDX,COMMSTAT
03D7  EC                 +??0032: INAL,DX
03D8  24 20              +    AND AL,00100000B
03DA  74 FB              +    JZ??0032
03DC  A1 0002 R          +    MOVAX,TIMSAV;TRANSMIT BUFFER EMPTY
03DF  BA 03F8            +    MOV DX,COMMDATA
03E2  EE                 +    OUTDX,AL;FIRST BYTE TRANSMITTED
03E3  BA 03FD            +    MOVDX,COMMSTAT
03E6  EC                 +??0033: INAL,DX
03E7  24 20              +    AND AL,00100000B
03E9  74 FB              +    JZ??0033
03EB  A1 0002 R          +    MOVAX,TIMSAV;TRANSMIT BUFFER EMPTY
03EE  8A C4              +    MOVAL,AH
03F0  BA 03F8            +    MOV DX,COMMDATA
03F3  EE                 +    OUTDX,AL;SECOND BYTE TRANSMITTED
      ;WAIT UNTIL NEXT FRAME
      FLAGS
03F4  A1 0004 R          +??0034: MOVAX,FLAG
03F7  24 FF              +    ANDAL,0FFH
03F9  74 F9              +    JE??0034
03FB  C7 06 0004 R 0000  +    MOVFLAG,0
      ;WAIT FOR INTEL TO REQUEST DATA
      DATARDY
0401  BA 03FD            +    MOVDX,COMMSTAT ;INIT STATUS REG ADDR
0404  EC                 +DATARDY1:    INAL,DX  ;GET STATUS
0405  24 01              +    ANDAL,00000001B ;MASK DATA RDY
0407  74 FB              +    JZDATARDY1 ;JUMP IF NOT READY
0409  BA 03F8            +    MOVDX,COMMDATA
040C  EC                 +    INAL,DX
      ;
040D  E9 02AF R    JMPPCV1;REPEAT LOOP AND GATHER DATA

;*************************************************************
;SUBROUTINES START HERE
;
0410    SUBS PROCNEAR
;;;;;;;;;;;;;;;;;;;;;;;;;;;;;;;;
; SUBROUTINE TO CLEAR IMAGE MEMORY TO 0
;
0410  BB 0000  CLEAR: MOVBX,0
0413  B8 0000         MOVAX,0
0416  BA FF04         MOVDX,LUTMASK
0419  EE       OUTDX,AL
041A  8B F0    MOVSI,AX
041C  26: 88 00   MOVES:[SI+BX],AL;SET ANY LOCATION IN MEMORY TO 0
```

```
                ;SET UP CSR0 TO CLEAR MEMORY
041F  BA FF00   MOVDX,CSR0
0422  80 1B     MOVAL,00011011B
0424  EE        OUT DX,AL
                ; CHECK FOR COMPLETION
0425  EC  AFG:  INAL,DX
0426  24 30     ANDAL,00110000B
0428  75 FB     JNEAFG
042A  C3        RET

;
        ;*****************************
          ;PCVISION BOARD INITIALIZE
        ;
042B  50   INIT: PUSHAX
042C  52         PUSHDX ;SAVE REGS

042D  BA FF01    MOVDX,CSR1
0430  80 00      MOVAL,00000000B;INIT LUT0
0432  EE         OUTDX,AL ;OUTPUT CSR1 PORT
0433  5A         POPDX
0434  58         POPAX ;RESTORE REGS

0435  C3    RET  ;BACK TO CALLER
      ;
      ;*****************************
        ;LUT0 INITIALIZE (1 TO 1 MAP) ON EVEN ADDRESSES, 255 ON ODD.
        ; ALLOWS WHITE SQUARES TO BE WRITTEN TO DISPLAY
        ; SAMPLING REGIONS.
        ;
0436  50   ILUT: PUSHAX
0437  51         PUSHCX
0438  52         PUSHDX ;SAVE REGS
        ;
0439  BA FF04    MOV DX,LUTMASK
043C  B8 0000    MOV    AX,00000000B
043F  EF         OUTDX,AX
        ;
        ;
0440  B9 0100    MOVCX,0100H;INIT LOOP COUNTER

0443  BA FF01    MOVDX,CSR1
0446  EC         INAL,DX ;INPUT CSR1 PORT
0447  24 9F      ANDAL,10011111B;MASK LUT0 ACTIVE
0449  EE         OUTDX,AL ;OUTPUT LUT0 ACTIVE 044A  80 00     MOVAL,00H ;INIT AL WITH ZERO

044C  BA FF02   ILUT1: MOVDX,LUTA ;INIT LUT ADDRESS PORT
044F  EE        OUTDX,AL ;OUTPUT LUT 0 ADDRESS

0450  BA FF03   MOVDX,LUTD ;INIT LUT DATA PORT
0453  EE        OUTDX,AL ;OUTPUT LUT0 DATA
0454  FE C0     INCAL
0456  E2 F4     LOOPILUT1
        ; IF MSB = 1 THEN MAKE EVERY THING WHITE
0458  B9 0080   MOVCX,80H
045B  B8 0000   MOVAX,0
045E  BA FF02   ILUT2: MOVDX,LUTA ;SET ADDRESS
0461  FE C0     INCAL
0463  EE        OUTDX,AL

0464  A3 000E R MOVTEMP,AX
0467  BA FF03   MOVDX,LUTD ;OUT DATA
```

```
046A  B0 FF     MOVAL,OFFH
046C  EE        OUTDX,AL
046D  A1 000E R MOVAX,TEMP

0470  FE C0     INCAL ;INCREMENT ADDR AND DATA VALUE
0472  E2 EA     LOOPILUT2 ;LOOP BACK 256 TIMES
      ;MASK LOWER BIT PLANE
0474  BA FF04   MOV DX,LUTMASK
0477  B8 0001   MOV   AX,00000001B
047A  EF        OUTDX,AX
047B  5A        POPDX
047C  59        POPCX
047D  58        POPAX ;RESTORE REGS

047E  C3        RET ;BACK TO CALLER
      ;
      ;
      ;
      ;******************************
      ;******************************
      ;VIDEO FIELD INTERRUPT HANDLER
      ;
047F  50   INTR: PUSHAX
0480  52        PUSHDX ;SAVE REGS
0481  1E        PUSHDS
      ;
      ;
0482  B8 ---- R MOVAX,DGROUP
0485  8E D8     MOVDS,AX ;LOAD OUR DS
      ;
      ; SET SEMAPHORE ACCORDING TO FIELD
      ;
0487  BA FF01   MOV DX,CSR1
048A  ED        INAX,DX
048B  24 01     AND AL,00000001B
048D  A3 0004 R MOVFLAG,AX
      ;

0490  FF 06 0000 R  INCTIMARK ;INCR TIME MARK COUNTER MEMR LOC

0494  BA FF06   MOVDX,VBIINTR
0497  EE        OUTDX,AL ;OUTPUT GARBAGE TO CLEAR PCV INTR

0498  B0 20     MOVAL,20H
049A  E6 20     OUTICOMPRT,AL;OUTPUT END OF INTR TO 8259

049C  1F        POPDS
049D  5A        POPDX
049E  58        POPAX ;RESTORE REGS

049F  CF        IRET ;BACK TO INTERRUPTED ROUTINE
      ;
      ;
      ;
      ;
04A0  SUBS ENDP ;ENDS NEAR CALL PROCEDURE
      ;
      ;
      ;***************************************************************
      ;***************************************************************
      ;APPLICATION CODE ENDS HERE
      ;
04A0  START ENDP ;ENDS FAR CALL PROCEDURE
```

```
04A0   CSEG ENDS  ;END CODE SEGMENT
       ;
       ;
       ;****************************************************************
       ;CODE ENDS HERE
       ;
          ENDSTART ;END EVERYTHING
```

Macros:

N a m e   Length

```
DATARDY. . . . . . . . . . . . .0006
DRAW . . . . . . . . . . . . . .0024
FLAGS. . . . . . . . . . . . . .0002
FUNCTION . . . . . . . . . . . .001C
GRAB . . . . . . . . . . . . . .0006
SEND1. . . . . . . . . . . . . .0002
SEND2. . . . . . . . . . . . . .0007
XMITRDY. . . . . . . . . . . . .0002
```

Segments and Groups:

N a m e   Size Align Combine Class

```
ABSO . . . . . . . . . . . . . .002C   AT      0000
DGROUP . . . . . . . . . . . . .GROUP
   DAREA . . . . . . . . . . . .0010   WORD    PUBLIC
   STACK . . . . . . . . . . . .0400   PARA    STACK
PGROUP . . . . . . . . . . . . .GROUP
   CSEG  . . . . . . . . . . . .04A0   WORD    PUBLIC
```

Symbols:

N a m e   Type Value Attr

```
AFG. . . . . . . . . . . . . . .L NEAR  0425  CSEG
CLEAR. . . . . . . . . . . . . .L NEAR  0410  CSEG
COMMBASE . . . . . . . . . . . .Number  03F8
COMMDATA . . . . . . . . . . . .Alias   COMMBASE
COMMSTAT . . . . . . . . . . . .Number  03FD
CSR0 . . . . . . . . . . . . . .Number  FF00
CSR1 . . . . . . . . . . . . . .Number  FF01
DATARDY1 . . . . . . . . . . . .L NEAR  0404  CSEG
FLAG . . . . . . . . . . . . . .L WORD  0004  DAREA  Global
FRMSEL . . . . . . . . . . . . .Number  FF05
ICOMPRT. . . . . . . . . . . . .Number  0020
ILUT . . . . . . . . . . . . . .L NEAR  0436  CSEG
ILUT1. . . . . . . . . . . . . .L NEAR  044C  CSEG
ILUT2. . . . . . . . . . . . . .L NEAR  045E  CSEG
IMBASE . . . . . . . . . . . . .Number  6000
IMSKPRT. . . . . . . . . . . . .Number  0021
INIT . . . . . . . . . . . . . .L NEAR  042B  CSEG
INTR . . . . . . . . . . . . . .L NEAR  047F  CSEG
LOC1 . . . . . . . . . . . . . .L WORD  0006  DAREA
LOC2 . . . . . . . . . . . . . .L WORD  0008  DAREA
LOC3 . . . . . . . . . . . . . .L WORD  000A  DAREA
LOC4 . . . . . . . . . . . . . .L WORD  000C  DAREA
LUTA . . . . . . . . . . . . . .Number  FF02
LUTD . . . . . . . . . . . . . .Number  FF03
LUTMASK. . . . . . . . . . . . .Number  FF04
PCV. . . . . . . . . . . . . . .L NEAR  0011  CSEG  Global
PCV1 . . . . . . . . . . . . . .L NEAR  02AF  CSEG  Global
```

```
REGBASE. . . . . . . . . . . . . .Number FF00
START . . . . . . . . . . . . . . .F PROC 0000 CSEG Global Length =04A0
SUBS . . . . . . . . . . . . . . .N PROC 0410 CSEG Length =0090
TEMP . . . . . . . . . . . . . . .L WORD 000E DAREA
TIMARK . . . . . . . . . . . . . .L WORD 0000 DAREA Global
TIMSAV . . . . . . . . . . . . . .L WORD 0002 DAREA Global
VBIINTR. . . . . . . . . . . . . .Number FF06
VSYNC. . . . . . . . . . . . . . .L WORD 002C ABSO
X_SQ1. . . . . . . . . . . . . . .Number 0080
X_SQ2. . . . . . . . . . . . . . .Number 0040
X_SQ3. . . . . . . . . . . . . . .Number 0020
X_SQ4. . . . . . . . . . . . . . .Number 0040
Y_SQ1. . . . . . . . . . . . . . .Number 4000
Y_SQ2. . . . . . . . . . . . . . .Number 8000
Y_SQ3. . . . . . . . . . . . . . .Number 2000
Y_SQ4. . . . . . . . . . . . . . .Number 8000
??0000 . . . . . . . . . . . . . .L NEAR 005D CSEG
??0001 . . . . . . . . . . . . . .L NEAR 006D CSEG
??0002 . . . . . . . . . . . . . .L NEAR 007C CSEG
??0003 . . . . . . . . . . . . . .L NEAR 008C CSEG
??0004 . . . . . . . . . . . . . .L NEAR 00A7 CSEG
??0005 . . . . . . . . . . . . . .L NEAR 00B7 CSEG
??0006 . . . . . . . . . . . . . .L NEAR 00C6 CSEG
??0007 . . . . . . . . . . . . . .L NEAR 00D6 CSEG
??0008 . . . . . . . . . . . . . .L NEAR 00F1 CSEG
??0009 . . . . . . . . . . . . . .L NEAR 0101 CSEG
??000A . . . . . . . . . . . . . .L NEAR 0110 CSEG
??000B . . . . . . . . . . . . . .L NEAR 0120 CSEG
??000C . . . . . . . . . . . . . .L NEAR 013B CSEG
??000D . . . . . . . . . . . . . .L NEAR 014B CSEG
??000E . . . . . . . . . . . . . .L NEAR 015A CSEG
??000F . . . . . . . . . . . . . .L NEAR 016A CSEG
??0010 . . . . . . . . . . . . . .L NEAR 0185 CSEG
??0011 . . . . . . . . . . . . . .L NEAR 0195 CSEG
??0012 . . . . . . . . . . . . . .L NEAR 01A4 CSEG
??0013 . . . . . . . . . . . . . .L NEAR 01B4 CSEG
??0014 . . . . . . . . . . . . . .L NEAR 01CF CSEG
??0015 . . . . . . . . . . . . . .L NEAR 01DF CSEG
??0016 . . . . . . . . . . . . . .L NEAR 01EE CSEG
??0017 . . . . . . . . . . . . . .L NEAR 01FE CSEG
??0018 . . . . . . . . . . . . . .L NEAR 0219 CSEG
??0019 . . . . . . . . . . . . . .L NEAR 0229 CSEG
??001A . . . . . . . . . . . . . .L NEAR 0238 CSEG
??001B . . . . . . . . . . . . . .L NEAR 0248 CSEG
??001C . . . . . . . . . . . . . .L NEAR 0263 CSEG
??001D . . . . . . . . . . . . . .L NEAR 0273 CSEG
??001E . . . . . . . . . . . . . .L NEAR 0282 CSEG
??001F . . . . . . . . . . . . . .L NEAR 0292 CSEG
??0020 . . . . . . . . . . . . . .L NEAR 02A2 CSEG
??0021 . . . . . . . . . . . . . .L NEAR 02D1 CSEG
??0022 . . . . . . . . . . . . . .L NEAR 02CB CSEG
??0024 . . . . . . . . . . . . . .L NEAR 02F0 CSEG
??0025 . . . . . . . . . . . . . .L NEAR 0316 CSEG
??0026 . . . . . . . . . . . . . .L NEAR 0310 CSEG
??0028 . . . . . . . . . . . . . .L NEAR 0335 CSEG
??0029 . . . . . . . . . . . . . .L NEAR 035B CSEG
??002A . . . . . . . . . . . . . .L NEAR 0355 CSEG
??002C . . . . . . . . . . . . . .L NEAR 037A CSEG
??002D . . . . . . . . . . . . . .L NEAR 03A0 CSEG
??002E . . . . . . . . . . . . . .L NEAR 039A CSEG
??0030 . . . . . . . . . . . . . .L NEAR 03C8 CSEG
??0032 . . . . . . . . . . . . . .L NEAR 03D7 CSEG
??0033 . . . . . . . . . . . . . .L NEAR 03E6 CSEG
??0034 . . . . . . . . . . . . . .L NEAR 03F4 CSEG
```

Appendix B

PL/M-86 COMPILER iRMX 86 PL/M-86 V2.3 COMPILATION OF MODULE GETSIG

© 1986 Selling Areas -
Marketing, Inc.
Unpublished work -
All rights reserved

```
1           getsig: DO;

2     1     DECLARE DCL LITERALLY 'DECLARE',
                    LIT LITERALLY 'LITERALLY',
                    PROC LIT 'PROCEDURE',
                    EXT LIT 'EXTERNAL',
                    FOREVER LIT 'WHILE 1',
                    TRUE LIT '1',
                    FALSE LIT '0';

/*********************************************************/

$NOLIST
            $INCLUDE(:HOME:bytesig.inc)
137   1  =  DCL
         =      delta_err              LIT '1',
         =      database_size          LIT '64',
         =      num_samples            LIT '8',
         =      num_elements           LIT '4',
         =      element_size           LIT '1',
         =      num_sample_elements    LIT '32',
         =      num_frames             LIT '2048';

138   1  =  DCL
         =      num_ads                     WORD,
         =      signature_tkn               TOKEN PUBLIC,
         =      signature (database_size)   STRUCTURE (
         =        sample(num_samples)         BYTE,
         =        count(num_samples)          BYTE,
         =        range(num_samples)          BYTE,
         =        time(num_samples)           WORD,
         =        tag                         DWORD ),
         =      frame_1_buff(num_frames)    BYTE PUBLIC,
         =      frame_2_buff(num_frames)    BYTE PUBLIC,
         =      get_frame_1_buff            STRUCTURE (
         =        sample(num_elements)        BYTE,
         =        time                        WORD ) PUBLIC,
         =      zero_frame_1_index          WORD,
         =      old_frame_1_index           WORD,
         =      delta_frame_1_index         WORD,
         =      end_frame_1_index           WORD,
         =      frame_1_mask(num_frames)    BYTE PUBLIC,
         =      frame_2_mask(num_frames)    BYTE PUBLIC,
         =      get_frame_2_buff            STRUCTURE (
         =        sample(num_elements)        BYTE,
         =        time                        WORD ) PUBLIC,
         =      zero_frame_2_index          WORD,
         =      old_frame_2_index           WORD,
         =      delta_frame_2_index         WORD,
         =      end_frame_2_index           WORD;
```

```
139  1  =   DCL
        =       old_x_handler               STRUCTURE (
        =           x_offset                    WORD,
        =           x_base                      WORD,
        =           x_mode                      BYTE),
        =       new_x_handler               STRUCTURE (
        =           x_offset                    WORD,
        =           x_base                      WORD,
        =           x_mode                      BYTE);

140  1  =   DCL
        =       terminal_param              STRUCTURE (
        =           number_param                WORD,
        =           number_used                 WORD,
        =           connection_flags            WORD,
        =           terminal_flags              WORD,
        =           in_baud_rate                WORD,
        =           out_baud_rate               WORD,
        =           scroll_lines                WORD) ;

141  1  =   DCL
        =       num_elements_mask(8)        BYTE DATA
        =       (01H,03H,07H,0FH,1FH,3FH,7FH,0FFH);

142  1  =   DCL
        =       num_bits_set(256)           BYTE DATA (
        =   /* 00, 01, 02, 03, 04, 05, 06, 07, 08, 09, 0A, 0B, 0C, 0D, 0E, 0F, */
        =       0,  1,  1,  2,  1,  2,  2,  3,  1,  2,  2,  3,  2,  3,  3,  4,
        =   /* 10, 11, 12, 13, 14, 15, 16, 17, 18, 19, 1A, 1B, 1C, 1D, 1E, 1F, */
        =       1,  2,  2,  3,  2,  3,  3,  4,  2,  3,  3,  4,  3,  4,  4,  5,
        =   /* 20, 21, 22, 23, 24, 25, 26, 27, 28, 29, 2A, 2B, 2C, 2D, 2E, 2F, */
        =       1,  2,  2,  3,  2,  3,  3,  4,  2,  3,  3,  4,  3,  4,  4,  5,
        =   /* 30, 31, 32, 33, 34, 35, 36, 37, 38, 39, 3A, 3B, 3C, 3D, 3E, 3F, */
        =       2,  3,  3,  4,  3,  4,  4,  5,  3,  4,  4,  5,  4,  5,  5,  6,
        =   /* 40, 41, 42, 43, 44, 45, 46, 47, 48, 49, 4A, 4B, 4C, 4D, 4E, 4F, */
        =       1,  2,  2,  3,  2,  3,  3,  4,  2,  3,  3,  4,  3,  4,  4,  5,
        =   /* 50, 51, 52, 53, 54, 55, 56, 57, 58, 59, 5A, 5B, 5C, 5D, 5E, 5F, */
        =       2,  3,  3,  4,  3,  4,  4,  5,  3,  4,  4,  5,  4,  5,  5,  6,
        =   /* 60, 61, 62, 63, 64, 65, 66, 67, 68, 69, 6A, 6B, 6C, 6D, 6E, 6F, */
        =       2,  3,  3,  4,  3,  4,  4,  5,  3,  4,  4,  5,  4,  5,  5,  6,
        =   /* 70, 71, 72, 73, 74, 75, 76, 77, 78, 79, 7A, 7B, 7C, 7D, 7E, 7F, */
        =       3,  4,  4,  5,  4,  5,  5,  6,  4,  5,  5,  6,  5,  6,  6,  7,
        =   /* 80, 81, 82, 83, 84, 85, 86, 87, 88, 89, 8A, 8B, 8C, 8D, 8E, 8F, */
        =       1,  2,  2,  3,  2,  3,  3,  4,  2,  3,  3,  4,  3,  4,  4,  5,
        =   /* 90, 91, 92, 93, 94, 95, 96, 97, 98, 99, 9A, 9B, 9C, 9D, 9E, 9F, */
        =       2,  3,  3,  4,  3,  4,  4,  5,  3,  4,  4,  5,  4,  5,  5,  6,
        =   /* A0, A1, A2, A3, A4, A5, A6, A7, A8, A9, AA, AB, AC, AD, AE, AF, */
        =       2,  3,  3,  4,  3,  4,  4,  5,  3,  4,  4,  5,  4,  5,  5,  6,
        =   /* B0, B1, B2, B3, B4, B5, B6, B7, B8, B9, BA, BB, BC, BD, BE, BF, */
        =       3,  4,  4,  5,  4,  5,  5,  6,  4,  5,  5,  6,  5,  6,  6,  7,
        =   /* C0, C1, C2, C3, C4, C5, C6, C7, C8, C9, CA, CB, CC, CD, CE, CF, */
        =       2,  3,  3,  4,  3,  4,  4,  5,  3,  4,  4,  5,  4,  5,  5,  6,
        =   /* D0, D1, D2, D3, D4, D5, D6, D7, D8, D9, DA, DB, DC, DD, DE, DF, */
        =       3,  4,  4,  5,  4,  5,  5,  6,  4,  5,  5,  6,  5,  6,  6,  7,
        =   /* E0, E1, E2, E3, E4, E5, E6, E7, E8, E9, EA, EB, EC, ED, EE, EF, */
        =       3,  4,  4,  5,  4,  5,  5,  6,  4,  5,  5,  6,  5,  6,  6,  7,
        =   /* F0, F1, F2, F3, F4, F5, F6, F7, F8, F9, FA, FB, FC, FD, FE, FF, */
        =       4,  5,  5,  6,  5,  6,  6,  7,  5,  6,  6,  7,  6,  7,  7,  8 );

143  1  =   DCL
        =       random_signature (16)       STRUCTURE (
        =           sample(num_samples)         BYTE,
        =           count(num_samples)          BYTE,
```

```
=        time(num_samples)    WORD,
=        tag                  DWORD ) DATA (
=   /*              1    2    3    4    5    6    7    8  */
=   /*  1 */     0DH, 0CH, 03H, 04H, 08H, 03H, 0EH, 09H, /* SAMPLES */
=                  0,   0,   0,   0,   0,   0,   0,   0, /* MASK COUNTS */
=              0399,1104,0193,1161,0894,0608,1246,1384, /* TIME */
=              1001,                                     /* TAG */
=   /*  2 */     03H, 09H, 01H, 08H, 07H, 01H, 08H, 0FH, /* SAMPLES */
=                  0,   0,   0,   0,   0,   0,   0,   0, /* MASK COUNTS */
=              0095,0235,0861,0191,0138,1559,0554,1288, /* TIME */
=              1002,                                     /* TAG */
=   /*  3 */     03H, 01H, 01H, 09H, 0FH, 06H, 08H, 0BH, /* SAMPLES */
=                  0,   0,   0,   0,   0,   0,   0,   0, /* MASK COUNTS */
=              0597,0008,1556,0860,0973,1477,0271,0992, /* TIME */
=              1003,                                     /* TAG */
=   /*  4 */     09H, 0AH, 08H, 0DH, 0BH, 00H, 08H, 0BH, /* SAMPLES */
=                  0,   0,   0,   0,   0,   0,   0,   0, /* MASK COUNTS */
=              1855,1754,0737,0492,0524,0215,1512,1292, /* TIME */
=              1004,                                     /* TAG */
=   /*  5 */     05H, 0DH, 0DH, 0EH, 08H, 09H, 05H, 0AH, /* SAMPLES */
=                  0,   0,   0,   0,   0,   0,   0,   0, /* MASK COUNTS */
=              0159,0760,1936,0795,0589,0932,0435,0861, /* TIME */
=              1005,                                     /* TAG */
=   /*  6 */     03H, 08H, 0DH, 05H, 09H, 09H, 0EH, 05H, /* SAMPLES */
=                  0,   0,   0,   0,   0,   0,   0,   0, /* MASK COUNTS */
=              1581,1068,1100,0119,0936,1635,1937,1980, /* TIME */
=              1006,                                     /* TAG */
=   /*  7 */     07H, 0DH, 0AH, 07H, 0DH, 00H, 01H, 0FH, /* SAMPLES */
=                  0,   0,   0,   0,   0,   0,   0,   0, /* MASK COUNTS */
=              0630,0514,0957,0287,1739,1103,1905,1406, /* TIME */
=              1007,                                     /* TAG */
=   /*  8 */     08H, 01H, 0FH, 02H, 01H, 03H, 03H, 0BH, /* SAMPLES */
=                  0,   0,   0,   0,   0,   0,   0,   0, /* MASK COUNTS */
=              0406,1929,1496,1633,1646,0780,0412,0665, /* TIME */
=              1008,                                     /* TAG */
=   /*  9 */     0DH, 07H, 09H, 0BH, 0AH, 07H, 01H, 03H, /* SAMPLES */
=                  0,   0,   0,   0,   0,   0,   0,   0, /* MASK COUNTS */
=              1127,0990,0494,1484,1466,1261,1587,1100, /* TIME */
=              1009,                                     /* TAG */
=   /* 10 */     09H, 05H, 0BH, 07H, 0CH, 0AH, 0DH, 0EH, /* SAMPLES */
=                  0,   0,   0,   0,   0,   0,   0,   0, /* MASK COUNTS */
=              1089,0757,1461,1963,0231,1296,0617,1341, /* TIME */
=              1010,                                     /* TAG */
=   /* 11 */     0BH, 08H, 08H, 0DH, 0CH, 07H, 02H, 04H, /* SAMPLES */
=                  0,   0,   0,   0,   0,   0,   0,   0, /* MASK COUNTS */
=              0183,1553,0217,0677,0943,1803,0702,0730, /* TIME */
=              1011,                                     /* TAG */
=   /* 12 */     00H, 0BH, 08H, 09H, 09H, 0EH, 09H, 09H, /* SAMPLES */
=                  0,   0,   0,   0,   0,   0,   0,   0, /* MASK COUNTS */
=              1889,1599,1586,1207,1774,0165,1166,1520, /* TIME */
=              1012,                                     /* TAG */
=   /* 13 */     0EH, 02H, 00H, 0EH, 07H, 03H, 09H, 03H, /* SAMPLES */
=                  0,   0,   0,   0,   0,   0,   0,   0, /* MASK COUNTS */
=              0083,1374,0753,1088,0348,0286,1379,0578, /* TIME */
=              1013,                                     /* TAG */
=   /* 14 */     08H, 03H, 03H, 0CH, 07H, 0CH, 0FH, 02H, /* SAMPLES */
=                  0,   0,   0,   0,   0,   0,   0,   0, /* MASK COUNTS */
=              1476,1953,1526,1433,1566,0529,1216,0186, /* TIME */
=              1014,                                     /* TAG */
=   /* 15 */     01H, 01H, 04H, 05H, 0CH, 06H, 0BH, 0FH, /* SAMPLES */
=                  0,   0,   0,   0,   0,   0,   0,   0, /* MASK COUNTS */
=              0311,0036,1946,1335,0753,0949,0261,0292, /* TIME */
=              1015,                                     /* TAG */
=   /* 16 */     0BH, 08H, 0BH, 01H, 0FH, 05H, 0BH, 09H, /* SAMPLES */
```

```
                =        0,    0,    0,    0,    0,    0,    0,    0,  /* MASK COUNTS */
                =     1297, 0191, 0283, 1698, 1537, 1231, 0379, 1424,  /* TIME */
                =     1016);                                            /* TAG */

144   1    DCL
               prep_list(*)           BYTE DATA(1,
                 4,'WITH' );

145   1    DCL
               comnd_list(*)          BYTE DATA (7,
                 3,'ADD',
                 3,'DEL',
                 5,'PRINT',
                 4,'LIST',
                 4,'HELP',
                 4,'QUIT',
                 6,'CREATE');

146   1    DCL
               comnd_help(*)          BYTE DATA (8,
                 28,'--- AVAILABLE COMMANDS ---',0DH,0AH,
                 5,'ADD',0DH,0AH,
                 5,'DEL',0DH,0AH,
                 7,'PRINT',0DH,0AH,
                 6,'LIST',0DH,0AH,
                 8,'CREATE',0DH,0AH,
                 6,'HELP',0DH,0AH,
                 6,'QUIT',0DH,0AH );

147   1    DCL
               errmsg(*)              BYTE DATA(17,'ILLEGAL COMMAND',0DH,0AH),
               errmsg1(*)             BYTE DATA(20,'TAG ALREADY EXISTS',0DH,0AH),
               errmsg2(*)             BYTE DATA(20,'TAG DOES NOT EXIST',0DH,0AH),
               errmsg3(*)             BYTE DATA(15,'ILLEGAL VALUE',0DH,0AH);

148   1    DCL
               command_cases(8)   BYTE DATA (0,1,2,3,4,5,6,7);

149   1    DCL
               prompt(80)             BYTE,
               response(80)           BYTE,
               command (80)           BYTE,
               param_list(20)         BYTE,
               prep_index             BYTE,
               more                   BYTE,
               old_offset             WORD,
               new_tag                DWORD,
               old_tag                DWORD;
150   1    DCL
               index                  BYTE,
               bit_test               BYTE,
               even_spare             BYTE,
               found                  BYTE,
               i_dex                  BYTE,
               j_dex                  BYTE,
               x_dex                  WORD,
               y_dex                  WORD,
               z_dex                  WORD,
               time_found             DWORD,
               null_ptr               POINTER,
               null                   WORD,
               exit_status            WORD,
               tkn_type               WORD,
               time_out_1             WORD,
```

```
                t1_i_resp_mbx           TOKEN,
                t1_o_resp_mbx           TOKEN,
                t1_dev_connection       TOKEN,
                t1_connection           TOKEN,
                lp_connection           TOKEN,
                t2_connection           TOKEN,
                signature_conn          TOKEN,
                bytes_written           WORD,
                bytes_read              WORD,
                next_ad                 WORD,
                next_sample             WORD,
                next_element            WORD,
                sig_index               WORD,
                time_index              WORD,
                time_skew               WORD,
                end_frame_1_time        WORD,
                seg_time                WORD,
                rq_err                  WORD;

/**********************************************************************/
        /*                                                                    */
        /*              ASCII TO BINARY BYTE                                  */
        /*                                                                    */
        /**********************************************************************/
151  1  ascii_binary1: PROC(string_ptr,ierr_ptr) BYTE EXT;

152  2  DCL
            string_ptr      POINTER,
            ierr_ptr        POINTER;

153  2  END ascii_binary1;

/**********************************************************************/
        /*                                                                    */
        /*              ASCII TO BINARY WORD                                  */
        /*                                                                    */
        /**********************************************************************/
154  1  ascii_binary2: PROC(string_ptr,ierr_ptr) WORD EXT;

155  2  DCL
            string_ptr      POINTER,
            ierr_ptr        POINTER;

156  2  END ascii_binary2;

/**********************************************************************/
        /*                                                                    */
        /*              ASCII TO BINARY DWORD                                 */
        /*                                                                    */
        /**********************************************************************/
157  1  ascii_binary4: PROC(string_ptr,ierr_ptr) DWORD EXT;

158  2  DCL
            string_ptr      POINTER,
            ierr_ptr        POINTER;

159  2  END ascii_binary4;

/**********************************************************************/
        /*                                                                    */
```

```
                /*                                                    */
                /*              BINARY TO ASCII BYTE                  */
                /*                                                    */
                /******************************************************/
160     1       binary1_ascii: PROC(value,string_ptr,ierr_ptr) EXT;

161     2       DCL
                    string_ptr      POINTER,
                    ierr_ptr        POINTER,
                    value           BYTE;

162     2       END binary1_ascii;

/******************************************************/
                /*                                                    */
                /*              BINARY TO ASCII WORD                  */
                /*                                                    */
                /******************************************************/
163     1       binary2_ascii: PROC(value,string_ptr,ierr_ptr) EXT;

164     2       DCL
                    string_ptr      POINTER,
                    ierr_ptr        POINTER,
                    value           WORD;

165     2       END binary2_ascii;

/******************************************************/
                /*                                                    */
                /*              BINARY TO ASCII DWORD                 */
                /*                                                    */
                /******************************************************/
166     1       binary4_ascii: PROC(value,string_ptr,ierr_ptr) EXT;

167     2       DCL
                    string_ptr      POINTER,
                    ierr_ptr        POINTER,
                    value           DWORD;

168     2       END binary4_ascii;

/******************************************************/
                /*                                                    */
                /*                  PARSE BUFFER                      */
                /*                                                    */
                /******************************************************/
169     1       set_parse_buffer: PROC(buffer_ptr,buffer_size) EXT;

170     2       DCL
                    buffer_ptr      POINTER,
                    buffer_size     BYTE;

171     2       END set_parse_buffer;

/******************************************************/
172     1       get_parameter: PROC(buffer_ptr,buffer_size,ierr_ptr) BYTE EXT;

173     2       DCL
                    buffer_ptr      POINTER,
                    ierr_ptr        POINTER,
                    buffer_size     BYTE;

174     2       END get_parameter;

/******************************************************/
```

```
                /*                                                              */
                /*                      FIND PARAMETER                          */
                /*                                                              */
                /**************************************************************/
175   1         find_parameter: PROC(string_ptr,list_ptr) BYTE EXT;

176   2         DCL
                   string_ptr        POINTER,
                   list_ptr          POINTER;

177   2         END find_parameter;

$eject
                /*--------------------------------------------------------------*/
                /*                                                              */
                /*                    CLEAR INPUT BUFFER                        */
                /*                                                              */
                /*--------------------------------------------------------------*/
178   1         clear_buff: PROC PUBLIC;

/* set to transparent mode */
179   2         terminal_param.number_param = 5;
180   2         terminal_param.number_used = 4;
181   2         terminal_param.connection_flags = 0FFH;
182   2         terminal_param.terminal_flags = 110H;
183   2         terminal_param.in_baud_rate = 9600;
184   2         terminal_param.out_baud_rate = 1;
185   2         terminal_param.scroll_lines = 24;
186   2         CALL rqaspecial(t1_connection,5,@terminal_param,0,@rq_err);

/* CLEAR INPUT BUFFER */
187   2         CALL rqaread(t1_connection,@frame_1_buff,1,t1_i_resp_mbx,@rq_err);
188   2         bytes_read = rqwaitio(t1_connection,t1_i_resp_mbx,0FFFFH,@rq_err);
189   2         DO WHILE bytes_read <> 0;
190   3          CALL rqaread(t1_connection,@frame_1_buff,1,t1_i_resp_mbx,@rq_err);
191   3          bytes_read = rqwaitio(t1_connection,t1_i_resp_mbx,0FFFFH,@rq_err);
192   3         END;

/* reset to flush mode */
193   2         terminal_param.number_param = 5;
194   2         terminal_param.number_used = 4;
195   2         terminal_param.connection_flags = 0FDH;
196   2         terminal_param.terminal_flags = 110H;
197   2         terminal_param.in_baud_rate = 9600;
198   2         terminal_param.out_baud_rate = 1;
199   2         terminal_param.scroll_lines = 24;
200   2         CALL rqaspecial(t1_connection,5,@terminal_param,0,@rq_err);

201   2         END clear_buff;

$SUBTITLE('PRINT SIGNATURE')
                /*--------------------------------------------------------------*/
                /*                                                              */
                /*                  PRINT SIGNATURE DATABASE                    */
                /*                                                              */
                /*--------------------------------------------------------------*/
202   1           print_sig: PROC(sig_num) PUBLIC;

203   2            DCL
                      x_dex              WORD,
                      y_dex              WORD,
                      z_dex              WORD,
                      sig_num            WORD,
                      start_sig          WORD,
```

```
              end_sig                    WORD;

/*   CALL rqsopen(lp_connection,2,0,@rq_err);*/

204   2      IF sig_num = 0FFFFH
205   2      THEN DO;
206   3       start_sig = 0;
207   3       end_sig = num_ads - 1;
208   3      END;
209   2      ELSE DO;
210   3       start_sig = sig_num;
211   3       end_sig = sig_num;
212   3      END;

213   2      null_ptr = 0;
214   2      bytes_written = rqswritemove(lp_connection,@(0CH),1,@rq_err);
215   2      IF num_ads = 0
216   2      THEN DO;
217   3       bytes_written =
              rqswritemove(lp_connection,@('NO SIGNATURES DEFINED',0DH,0AH),23,@rq_err);
218   3      END;
219   2      ELSE DO;
220   3       DO x_dex = start_sig TO end_sig;

221   4        CALL list_sig(x_dex);

222   4        prompt(0) = 8;
223   4        CALL binary4_ascii(signature(x_dex).tag,@prompt,@rq_err);
224   4        bytes_written = rqswritemove(lp_connection,@('ID NUMBER : '),12,@rq_err);
225   4        bytes_written = rqswritemove(lp_connection,@prompt(1),8,@rq_err);
226   4        bytes_written = rqswritemove(lp_connection,@(0DH,0AH),2,@rq_err);

227   4        bytes_written = rqswritemove(lp_connection,@('   VALUES : '),12,@rq_err);
228   4        DO z_dex = 0 TO num_samples - 1;
229   5         prompt(0) = num_elements;
230   5         bit_test = 1;
231   5         DO y_dex = 0 TO num_elements - 1;
232   6          IF (signature(x_dex).sample(z_dex) AND bit_test) = bit_test
233   6          THEN DO;
234   7           prompt(y_dex + 1) = 31H;
235   7          END;
236   6          ELSE DO;
237   7           prompt(y_dex + 1) = 30H;
238   7          END;
239   6          bit_test = SHL(bit_test,1);
240   6         END;
241   5         bytes_written = rqswritemove(lp_connection,@('    '),4,@rq_err);
242   5         bytes_written = rqswritemove(lp_connection,@prompt(1),prompt(0),@rq_err);
243   5        END;
244   4        bytes_written = rqswritemove(lp_connection,@(0DH,0AH),2,@rq_err);

245   4        bytes_written = rqswritemove(lp_connection,@('MASKS SET : '),12,@rq_err);
246   4        DO z_dex = 0 TO num_samples - 1;
247   5         prompt(0) = 4 + num_elements;
248   5         CALL binary1_ascii(signature(x_dex).count(z_dex),@prompt,@rq_err);
249   5         bytes_written = rqswritemove(lp_connection,@prompt(1),prompt(0),@rq_err);
250   5        END;
251   4        bytes_written = rqswritemove(lp_connection,@(0DH,0AH),2,@rq_err);

252   4        bytes_written = rqswritemove(lp_connection,@('    RANGE : '),12,@rq_err);
253   4        DO z_dex = 0 TO num_samples - 1;
254   5         prompt(0) = 4 + num_elements;
255   5         CALL binary2_ascii(signature(x_dex).range(z_dex),@prompt,@rq_err);
```

```
256  5            bytes_written = rqswritemove(lp_connection,@prompt(1),prompt(0),@rq_err);
257  5          END;
258  4          bytes_written = rqswritemove(lp_connection,@(0DH,0AH),2,@rq_err);

259  4          bytes_written = rqswritemove(lp_connection,@('    TIME : '),12,@rq_err);
260  4          DO z_dex = 0 TO num_samples - 1;
261  5           prompt(0) = 4 + num_elements;
262  5           CALL binary2_ascii(signature(x_dex).time(z_dex),@prompt,@rq_err);
263  5           bytes_written = rqswritemove(lp_connection,@prompt(1),prompt(0),@rq_err);
264  5          END;
265  4          bytes_written = rqswritemove(lp_connection,@(0DH,0AH),2,@rq_err);

266. 4          IF (x_dex MOD 8) = 7
267  4          THEN DO;
268  5           bytes_written = rqswritemove(lp_connection,@(0DH,0AH),2,@rq_err);
269  5           bytes_written = rqswritemove(lp_connection,@(0CH),1,@rq_err);
270  5          END;
271  4          ELSE DO;
272  5           bytes_written = rqswritemove(lp_connection,@(0DH,0AH),2,@rq_err);
273  5           bytes_written = rqswritemove(lp_connection,@(0DH,0AH),2,@rq_err);
274  5          END;
275  4         END;
276  3        END;
              /* CALL rqsclose(lp_connection,@rq_err);*/
277  2        END print_sig;

$SUBTITLE('LIST SIGNATURE')
              /*............................................................*/
              /*                                                            */
              /*              LIST SIGNATURE DATABASE                       */
              /*                                                            */
              /*............................................................*/
278  1       list_sig: PROC(sig_num) PUBLIC;

279  2         DCL
                 x_dex           WORD,
                 y_dex           WORD,
                 z_dex           WORD,
                 sig_num         WORD,
                 start_sig       WORD,
                 end_sig         WORD;

280  2         IF sig_num = 0FFFFH
281  2         THEN DO;
282  3          start_sig = 0;
283  3          end_sig = num_ads - 1;
284  3         END;
285  2         ELSE DO;
286  3          start_sig = sig_num;
287  3          end_sig = sig_num;
288  3         END;

289  2         null_ptr = 0;
290  2         IF num_ads = 0
291  2         THEN DO;
292  3          CALL rqcsendcoresponse(null_ptr,0,@(23,'NO SIGNATURES DEFINED',0DH,0AH),
                        @rq_err);
293  3         END;
294  2         ELSE DO;
295  3          DO x_dex = start_sig TO end_sig;
296  4           prompt(0) = 8;
```

```
297  4         CALL binary4_ascii(signature(x_dex).tag,@prompt,@rq_err);
298  4         CALL rqcsendcoresponse(null_ptr,0,@(12,'ID NUMBER : '),@rq_err);
299  4         CALL rqcsendcoresponse(null_ptr,0,@prompt,@rq_err);
300  4         CALL rqcsendcoresponse(null_ptr,0,@(2,0DH,0AH),@rq_err);

301  4         CALL rqcsendcoresponse(null_ptr,0,@(12,'   VALUES : '),@rq_err);
302  4         DO z_dex = 0 TO num_samples - 1;
303  5          prompt(0) = num_elements;
304  5          bit_test = 1;
305  5          DO y_dex = 0 TO num_elements - 1;
306  6           IF (signature(x_dex).sample(z_dex) AND bit_test) = bit_test
307  6           THEN DO;
308  7            prompt(y_dex + 1) = 31H;
309  7           END;
310  6           ELSE DO;
311  7            prompt(y_dex + 1) = 30H;
312  7           END;
313  6           bit_test = SHL(bit_test,1);
314  6          END;
315  5          CALL rqcsendcoresponse(null_ptr,0,@(4,'    '),@rq_err);
316  5          CALL rqcsendcoresponse(null_ptr,0,@prompt,@rq_err);
317  5         END;
318  4         CALL rqcsendcoresponse(null_ptr,0,@(2,0DH,0AH),@rq_err);

319  4         CALL rqcsendcoresponse(null_ptr,0,@(12,'MASKS SET : '),@rq_err);
320  4         DO z_dex = 0 TO num_samples - 1;
321  5          prompt(0) = 4 + num_elements;
322  5          CALL binary1_ascii(signature(x_dex).count(z_dex),@prompt,@rq_err);
323  5          CALL rqcsendcoresponse(null_ptr,0,@prompt,@rq_err);
324  5         END;
325  4         CALL rqcsendcoresponse(null_ptr,0,@(2,0DH,0AH),@rq_err);

326  4         CALL rqcsendcoresponse(null_ptr,0,@(12,'    RANGE : '),@rq_err);
327  4         DO z_dex = 0 TO num_samples - 1;
328  5          prompt(0) = 4 + num_elements;
329  5          CALL binary2_ascii(signature(x_dex).range(z_dex),@prompt,@rq_err);
330  5          CALL rqcsendcoresponse(null_ptr,0,@prompt,@rq_err);
331  5         END;
332  4         CALL rqcsendcoresponse(null_ptr,0,@(2,0DH,0AH),@rq_err);

333  4         CALL rqcsendcoresponse(null_ptr,0,@(12,'     TIME : '),@rq_err);
334  4         DO z_dex = 0 TO num_samples - 1;
335  5          prompt(0) = 4 + num_elements;
336  5          CALL binary2_ascii(signature(x_dex).time(z_dex),@prompt,@rq_err);
337  5          CALL rqcsendcoresponse(null_ptr,0,@prompt,@rq_err);
338  5         END;
339  4         CALL rqcsendcoresponse(null_ptr,0,@(2,0DH,0AH),@rq_err);

340  4         CALL rqcsendcoresponse(null_ptr,0,@(2,0DH,0AH),@rq_err);
341  4        END;
342  3       END;

343  2      END list_sig;

$SUBTITLE('GET DATA FROM FRAME GRABBER')
           /*..............................................................*/
           /*                                                              */
           /*                 GET DATA FROM FRAME GRAB                     */
           /*                                                              */
           /*..............................................................*/
344  1      get_frame: PROC(signature_sample_ptr) PUBLIC;

345  2       DCL
              signature_sample_ptr         POINTER,
```

```
                    signature_sample         BASED signature_sample_ptr (1) BYTE,
                    next                     WORD,
                    left                     WORD;

/*..............................................................*/

346    2        bytes_written = rqwaitio(t1_connection,t1_o_resp_mbx,0FFFFH,@rq_err);
347    2        IF time_out_1 = false
348    2        THEN DO;
349    3         left = (num_elements * element_size) + 2;
350    3         CALL rqaread(t1_connection,@signature_sample(0),left,t1_i_resp_mbx,@rq_err);
351    3        END;
352    2        bytes_read = rqwaitio(t1_connection,t1_i_resp_mbx,15,@rq_err);
353    2        IF rq_err = e$time
354    2        THEN DO;
355    3         time_out_1 = true;
356    3         CALL rq$c$send$co$response(null_ptr,0,@(10,'TIMEOUT 1 '),@rq_err);
357    3        END;
358    2        ELSE IF time_out_1 = true
359    2        THEN DO;
360    3         CALL clear_buff;
361    3         time_out_1 = false;
362    3        END;
363    2        ELSE IF bytes_read <> (num_elements * element_size) + 2
364    2        THEN DO;
365    3         CALL rq$c$send$co$response(null_ptr,0,@(8,'ERROR 1 '),@rq_err);
366    3        END;

367    2        END get_frame;

$SUBTITLE('GET NEW SIGNATURE')
                /*..............................................................*/
                /*                                                              */
                /*                   GET NEW SIGNATURE                          */
                /*                                                              */
                /*..............................................................*/
368    1        get_signature: PROC(sig_index,seg_time) PUBLIC;

369    2        DCL
                    sig_index                WORD,
                    seg_time                 WORD;

370    2        DCL
                    spare                    BYTE,
                    mask_bits                BYTE,
                    frame_bits               BYTE,
                    set_bit                  BYTE,
                    diff                     INTEGER,
                    frame_average            WORD,
                    time_base                WORD,
                    fill_count               WORD,
                    range_count              WORD,
                    range_index              WORD,
                    start_count              WORD,
                    partition_count          WORD,
                    min_mask                 STRUCTURE (
                      count                  WORD,
                      sample                 WORD,
                      index                  WORD,
                      range                  WORD),
                    k_dex                    WORD,
                    l_dex                    WORD,
                    m_dex                    WORD;
```

```
                    /* CLEAR INPUT BUFFER */
371    2            time_out_1 = false;
372    2            CALL clear_buff;
373    2            null_ptr = 0;
374    2            CALL rq$c$send$co$response(null_ptr,0,a(2,0DH,0AH),arq_err);

/* wait for <cret> indicating ad start */
375    2            CALL rq$c$send$co$response(aresponse,SIZE(response),a(12,'START <CRET>'),
                        arq_err);

/*...................................................................*/
                    /*                                                                    */
                    /*                     fill frame buffer                              */
                    /*                                                                    */
                    /*...................................................................*/
376    2            CALL rq$c$send$co$response(null_ptr,0,a(14,'FILLING BUFFER'),arq_err);

377    2            IF (seg_time * 60) < num_frames
378    2            THEN DO;
379    3             fill_count = seg_time * 60;
380    3            END;
381    2            ELSE DO;
382    3             fill_count = num_frames;
383    3            END;

/* get first frame data */
384    2            CALL rqawrite(t1_connection,a(0DH),1,t1_o_resp_mbx,arq_err);
385    2            CALL get_frame(aget_frame_1_buff);

386    2            time_base = get_frame_1_buff.time;
387    2            end_frame_1_time = get_frame_1_buff.time;
388    2            end_frame_1_index = fill_count - 1;
389    2            zero_frame_1_index = 0;
390    2            DO WHILE (get_frame_1_buff.time - time_base) < fill_count;

/* request next frame data */
391    3             CALL rqawrite(t1_connection,a(0DH),1,t1_o_resp_mbx,arq_err);

/* modulo subtract field count from a base count and convert to frame count */
392    3             old_frame_1_index = end_frame_1_index;
393    3             delta_frame_1_index = get_frame_1_buff.time - end_frame_1_time;
394    3             zero_frame_1_index = (zero_frame_1_index + delta_frame_1_index) MOD fill_count;
395    3             end_frame_1_index = (old_frame_1_index + delta_frame_1_index) MOD fill_count;
396    3             end_frame_1_time = get_frame_1_buff.time;

/* calculate average luminance */
397    3             frame_average = 0;
398    3             DO next_element = 0 TO num_elements - 1;
399    4              frame_average = frame_average + DOUBLE(get_frame_1_buff.sample(next_element));
400    4             END;
401    3             frame_average = frame_average / num_elements;

/* convert luminances to binary 1 >= average, 0 < average */
402    3             frame_bits = 0;
403    3             mask_bits = 0;
404    3             set_bit = 1;
405    3             DO next_element = 0 TO num_elements - 1;
406    4              diff = INT(frame_average) - INT(DOUBLE(get_frame_1_buff.sample(next_element)));
407    4              IF diff <= 0
408    4              THEN DO;
409    5               frame_bits = frame_bits OR set_bit;
```

```
410  5            END;
                  /* set mask bit for OK sample */
411  4            IF IABS(diff) > delta_err
412  4            THEN DO;
413  5             mask_bits = mask_bits OR set_bit;
414  5            END;
415  4            set_bit = SHL(set_bit,1);
416  4           END;

/* fill frame from last aquired frame with new frame data */
417  3          next_sample = old_frame_1_index;
418  3          DO WHILE next_sample <> end_frame_1_index;
419  4           next_sample = (next_sample + 1) MOD fill_count;
420  4           frame_1_buff(next_sample) = frame_bits;
421  4           frame_1_mask(next_sample) = mask_bits;
422  4          END;

/* get next frame data */
423  3          CALL get_frame(@get_frame_1_buff);
424  3         END;

425  2         CALL rq$c$send$co$response(null_ptr,0,@(2,0DH,0AH),@rq_err);
               /*..................................................*/
               /*                                                  */
               /*      generate best fit signature from frame buffer  */
               /*                                                  */
               /*..................................................*/

426  2         partition_count = fill_count / (num_samples + 1);
427  2         start_count = partition_count / 2;
428  2         DO next_sample = 0 to num_samples - 1;
429  3          min_mask.count = 0;
430  3          min_mask.sample = 0;
431  3          min_mask.index = start_count;
432  3          min_mask.range = 0;
433  3          time_index = start_count;

434  3          DO WHILE (time_index < (start_count + partition_count));

435  4           range_count = 1;
436  4           DO WHILE (time_index < (start_count + partition_count))
                 AND (frame_1_buff(time_index) = frame_1_buff(time_index + 1));
437  5            time_index = time_index + 1;
438  5            range_count = range_count + 1;
439  5           END;
440  4           IF range_count = 1
441  4           THEN DO;
442  5            time_index = time_index + 1;
443  5           END;

/*** LINE BELOW CHANGED FROM + TO - .... 2-25-86, SRN ***/
                /*** MOVE INDEX BACK TO MIDDLE OF RANGE              ***/
444  4           range_index = time_index - (range_count / 2);

445  4           IF num_bits_set(frame_1_mask(range_index)) > min_mask.count
446  4           THEN DO;
447  5            min_mask.count = num_bits_set(frame_1_mask(range_index));
448  5            min_mask.sample = frame_1_buff(range_index);
449  5            min_mask.index = range_index;
450  5            min_mask.range = range_count;
451  5           END;
452  4           ELSE IF (num_bits_set(frame_1_mask(range_index)) = min_mask.count)
                 AND (range_count > min_mask.range)
453  4           THEN DO;
```

```
454  5         min_mask.count = num_bits_set(frame_1_mask(range_index));
455  5         min_mask.sample = frame_1_buff(range_index);
456  5         min_mask.index = range_index;
457  5         min_mask.range = range_count;
458  5        END;

459  4       END;

460  3       signature(sig_index).sample(next_sample) = min_mask.sample;
461  3       signature(sig_index).count(next_sample) = num_elements - min_mask.count;
462  3       signature(sig_index).range(next_sample) = min_mask.range;
463  3       signature(sig_index).time(next_sample) = min_mask.index;
464  3       start_count = start_count + partition_count;
465  3      END;

466  2      CALL rq$c$send$co$response(null_ptr,0,a(2,0DH,0AH),arq_err);
467  2      CALL rq$c$send$co$response(null_ptr,0,a(14,'SIGNATURE DONE'),arq_err);
468  2      CALL rq$c$send$co$response(null_ptr,0,a(2,0DH,0AH),arq_err);

469  2     END get_signature;

$SUBTITLE('SET UP I/O FOR FRAME GRABBER')
           /******************************************************************/
           /*                                                                */
           /*            * * * * * M A I N   M O D U L E * * * *             */
           /*                                                                */
           /******************************************************************/

/*................................................................*/
           /*                                                                */
           /*             SET UP I/O FOR FRAME GRABBER                       */
           /*                                                                */
           /*................................................................*/

/*CALL rqlogicalattachdevice(a(4,':T1:'),a(2,'T1'),1,arq_err);*/
470  1     t1_dev_connection = rq$lookupconnection(a(4,':T1:'),arq_err);
471  1     t1_o_resp_mbx = rqcreatemailbox(0,arq_err);
472  1     t1_i_resp_mbx = rqcreatemailbox(0,arq_err);
473  1     null_ptr = 0;
474  1     CALL rqaattachfile(0,t1_dev_connection,null_ptr,t1_i_resp_mbx,arq_err);
475  1     t1_connection = rqreceivemessage(t1_i_resp_mbx,0FFFFH,null_ptr,arq_err);
476  1     tkn_type = rqgettype(t1_connection,arq_err);
477  1     IF tkn_type = 6
478  1     THEN DO;
479  2      CALL rqdeletesegment(t1_connection,arq_err);
480  2      null = 0;
481  2      CALL RQ$EXIT$IO$JOB(rq_err,anull,aexit_status);
482  2     END;
483  1     CALL rqaopen(t1_connection,3,3,0,arq_err);

484  1     terminal_param.number_param = 5;
485  1     terminal_param.number_used = 4;
486  1     terminal_param.connection_flags = 0FDH;
487  1     terminal_param.terminal_flags = 110H;
488  1     terminal_param.in_baud_rate = 9600;
489  1     terminal_param.out_baud_rate = 1;
490  1     terminal_param.scroll_lines = 24;
491  1     CALL rqaspecial(t1_connection,5,aterminal_param,0,arq_err);

/*................................................................*/
           /*                                                                */
           /*             SET UP I/O FOR LINE PRINTER                        */
           /*                                                                */
           /*................................................................*/
```

```
        /*CALL rqlogicalattachdevice(@(4,':LP:'),@(2,'LP'),1,@rq_err);*/
492  1  lp_connection = rqsattachfile(@(4,':LP:'),@rq_err);
493  1  CALL rqsopen(lp_connection,2,0,@rq_err);

/*..................................................................*/
        /*                                                                  */
        /*           SET UP I/O FOR SIGNATURE DATA BASE                     */
        /*                                                                  */
        /*..................................................................*/

/* turn off exception handler to check for file */
494  1  new_x_handler.x_offset = 0;
495  1  new_x_handler.x_base = 0;
496  1  new_x_handler.x_mode = 0;
497  1  CALL rqgetexceptionhandler(@old_x_handler,@rq_err);
498  1  CALL rqsetexceptionhandler(@new_x_handler,@rq_err);
499  1  signature_conn = rqsattachfile(@(23,'/user/world/exp1sig.dat'),@rq_err);
500  1  IF rq_err <> 0
501  1  THEN DO;
502  2   signature_conn = rqscreatefile(@(23,'/user/world/exp1sig.dat'),@rq_err);
503  2  END;
504  1  CALL rqsetexceptionhandler(@old_x_handler,@rq_err);

505  1  CALL rqsopen(signature_conn,3,2,@rq_err);
506  1  CALL rqsseek(signature_conn,2,0,@rq_err);

507  1  signature_tkn = rqcreatesegment(SIZE(signature),@rq_err);
508  1  bytes_read = rqsreadmove(signature_conn,@num_ads,2,@rq_err);
509  1  bytes_read = rqsreadmove(signature_conn,@signature,SIZE(signature),
                    @rq_err);

/* turn off exception handler for timeout in get_frame */
510  1  new_x_handler.x_offset = 0;
511  1  new_x_handler.x_base = 0;
512  1  new_x_handler.x_mode = 0;
513  1  CALL rqgetexceptionhandler(@old_x_handler,@rq_err);
514  1  CALL rqsetexceptionhandler(@new_x_handler,@rq_err);

/********************************************************************/

515  1  prompt(0) = 1;
516  1  prompt(1) = '#';

$SUBTITLE('MAIN MODULE DO FOREVER')
517  1  DO FOREVER;

/* GET COMMAND AND PARAMETERS */
518  2  CALL rq$c$send$co$response(@response,SIZE(response),@prompt,@rq_err);
519  2  CALL set_parse_buffer(@response(1),response(0));
520  2  more = get_parameter(@command,SIZE(command),@rq_err);

521  2  IF more = 0
522  2  THEN DO;
523  3   null_ptr = 0;
524  3   CALL rq$c$send$co$response(null_ptr,0,@(10,'NO ENTRY',0DH,0AH),@rq_err);
525  3  END;
526  2  index = find_parameter(@command,@comnd_list);
527  2  IF index > comnd_list(0)
528  2  THEN DO;
529  3   index = 0;
530  3  END;
```

```
531   2     DO CASE command_cases(index);

/*..............................................................*/
            /*                                                              */
            /*                    NULL ERROR                                */
            /*                                                              */
            /*..............................................................*/
532   3       null_case:
              DO;
533   4        null_ptr = 0;
534   4        CALL rq$c$send$co$response(null_ptr,0,@errmsg,@rq_err);
535   4       END null_case;

/*..............................................................*/
            /*                                                              */
            /*                    ADD NEW SIGNATURE                         */
            /*                                                              */
            /*..............................................................*/
536   3       add_case:
              DO;

537   4        more = get_parameter(@param_list,SIZE(param_list),@rq_err);
538   4        new_tag = ascii_binary4(@param_list,@rq_err);
539   4        IF rq_err <> 0
540   4        THEN DO;
541   5         null_ptr = 0;
542   5         CALL rq$c$send$co$response(null_ptr,0,@errmsg3,@rq_err);
543   5        END;
544   4        ELSE DO;
545   5         found = false;
546   5         IF num_ads > 0
547   5         THEN DO;
                 /* CHECK IF TAG EXISTS */
548   6          DO x_dex = 0 TO num_ads - 1;
549   7           IF (signature(x_dex).tag = new_tag)
550   7           THEN DO;
551   8            found = true;
552   8            null_ptr = 0;
553   8            CALL rq$c$send$co$response(null_ptr,0,@errmsg1,@rq_err);
554   8           END;
555   7          END;
556   6         END;

/* ask for segment length */
557   5         CALL rq$c$send$co$response(@response,SIZE(response),@(9,'LENGTH = '),
                    @rq_err);
558   5         CALL set_parse_buffer(@response(1),response(0));
559   5         more = get_parameter(@param_list,SIZE(param_list),@rq_err);
560   5         seg_time = ascii_binary2(@param_list,@rq_err);
561   5         IF (seg_time > num_frames / 60)
562   5         THEN DO;
563   6          null_ptr = 0;
564   6          CALL rq$c$send$co$response(null_ptr,0,@errmsg3,@rq_err);
565   6          found = true;
566   6         END;
567   5         ELSE IF (seg_time = 0)
568   5         THEN DO;
569   6          seg_time = 28;
570   6          CALL rq$c$send$co$response(null_ptr,0,@(17,'DEFAULT LENGTH = '),@rq_err);
571   6          prompt(0) = 8;
572   6          CALL binary2_ascii(seg_time,@prompt,@rq_err);
573   6          CALL rqcsendcoresponse(null_ptr,0,@prompt,@rq_err);
574   6          CALL rqcsendcoresponse(null_ptr,0,@(2,0DH,0AH),@rq_err);
```

```
575   6            END;

/* CREATE NEW DATA BASE ENTRY */
576   5            IF (num_ads < database_size) AND (found = false)
577   5            THEN DO;

578   6              CALL get_signature(num_ads,seg_time);
579   6              signature(num_ads).tag = new_tag;
580   6              num_ads = num_ads + 1;
581   6              CALL list_sig(num_ads - 1);
582   6            END;

/* ADD NEW SIGNATURE TO DATA BASE */
583   5            CALL rqsseek(signature_conn,2,0,@rq_err);
584   5            bytes_written = rqswritemove(signature_conn,@num_ads,2,@rq_err);
585   5            bytes_written = rqswritemove(signature_conn,@signature,SIZE(signature),
                                @rq_err);

586   5          END; /* else */
587   4        END add_case;

/*............................................................*/
              /*                                                            */
              /*                    DELETE OLD SIGNATURE                    */
              /*                                                            */
              /*............................................................*/
588   3        del_case:
               DO;

589   4          more = get_parameter(@param_list,SIZE(param_list),@rq_err);
590   4          old_tag = ascii_binary4(@param_list,@rq_err);
591   4          IF rq_err <> 0
592   4          THEN  DO;
593   5           null_ptr = 0;
594   5           CALL rq$c$send$co$response(null_ptr,0,@errmsg3,@rq_err);
595   5          END;
596   4          ELSE IF num_ads = 0
597   4          THEN DO;
598   5           null_ptr = 0;
599   5           CALL rq$c$send$co$response(null_ptr,0,@errmsg2,@rq_err);
600   5          END;
601   4          ELSE IF old_tag = 0
602   4          THEN DO;
603   5           found = true;
604   5          END;
605   4          ELSE DO;
                   /* CHECK IF TAG EXISTS */
606   5           found = false;
607   5           x_dex = 0;
608   5           DO WHILE (found = false) AND (x_dex < num_ads);
609   6            IF (signature(x_dex).tag = old_tag)
610   6            THEN DO;
611   7             found = true;
612   7            END;
613   6            ELSE DO;
614   7             x_dex = x_dex + 1;
615   7            END;
616   6           END;

617   5           IF x_dex = num_ads
618   5           THEN DO;
619   6            null_ptr = 0;
620   6            CALL rq$c$send$co$response(null_ptr,0,@errmsg2,@rq_err);
621   6           END;
```

```
                /* DELETE OLD SIGNATURE FROM DATA BASE */
622   5         ELSE DO;
623   6          IF num_ads > 1
624   6          THEN DO;
625   7           DO WHILE x_dex < num_ads - 1;
626   8            DO j_dex = 0 TO num_samples - 1;
627   9             signature(x_dex).sample(j_dex) = signature(x_dex+1).sample(j_dex);
628   9             signature(x_dex).count(j_dex) = signature(x_dex+1).count(j_dex);
629   9             signature(x_dex).range(j_dex) = signature(x_dex+1).range(j_dex);
630   9             signature(x_dex).time(j_dex) = signature(x_dex+1).time(j_dex);
631   9            END;
632   8            signature(x_dex).tag = signature(x_dex+1).tag;
633   8            x_dex = x_dex + 1;
634   8           END;
635   7          END;

/* DUMMY LAST SIGNATURE */
636   6          DO j_dex = 0 TO num_samples - 1;
637   7           signature(x_dex).sample(j_dex) = 0;
638   7           signature(x_dex).count(j_dex) = 0;
639   7           signature(x_dex).range(j_dex) = 0;
640   7           signature(x_dex).time(j_dex) = 0;
641   7          END;
642   6          signature(x_dex).tag = 0;
643   6          num_ads = num_ads - 1;
644   6          CALL rqsseek(signature_conn,2,0,@rq_err);
645   6          bytes_written = rqswritemove(signature_conn,@num_ads,2,@rq_err);
646   6          bytes_written = rqswritemove(signature_conn,@signature,SIZE(signature),
                              @rq_err);
647   6         END;

648   5        END; /* else */

649   4       END del_case;

/*................................................................*/
            /*                                                                */
            /*              PRINT ID TAGS IN DATABASE                         */
            /*                                                                */
            /*................................................................*/
650   3      print_case:
             DO;

651   4       more = get_parameter(@param_list,SIZE(param_list),@rq_err);
652   4       old_tag = ascii_binary4(@param_list,@rq_err);
653   4       IF rq_err <> 0
654   4       THEN DO;
655   5        null_ptr = 0;
656   5        CALL rq$c$send$co$response(null_ptr,0,@errmsg3,@rq_err);
657   5       END;
658   4       ELSE IF num_ads = 0
659   4       THEN DO;
660   5        null_ptr = 0;
661   5        CALL rq$c$send$co$response(null_ptr,0,@errmsg2,@rq_err);
662   5       END;
663   4       ELSE IF old_tag = 0
664   4       THEN DO;
665   5        x_dex = 0FFFFH;
666   5        found = true;
667   5        CALL print_sig(x_dex);
668   5       END;
669   4       ELSE DO;
                /* CHECK IF TAG EXISTS */
670   5        found = false;
```

```
671  5        x_dex = 0;
672  5        DO WHILE (found = false) AND (x_dex < num_ads);
673  6         IF (signature(x_dex).tag = old_tag)
674  6         THEN DO;
675  7          found = true;
676  7         END;
677  6         ELSE DO;
678  7          x_dex = x_dex + 1;
679  7         END;
680  6        END;

681  5        IF found = true
682  5        THEN DO;
683  6         CALL print_sig(x_dex);
684  6        END;
685  5        ELSE DO;
686  6         null_ptr = 0;
687  6         CALL rq$c$send$co$response(null_ptr,0,@errmsg2,@rq_err);
688  6        END;
689  5       END;

690  4     END print_case;

/*................................................................*/
           /*                                                                */
           /*             LIST ID TAGS IN DATABASE                           */
           /*                                                                */
           /*................................................................*/
691  3     list_case:
           DO;

692  4       more = get_parameter(@param_list,SIZE(param_list),@rq_err);
693  4       old_tag = ascii_binary4(@param_list,@rq_err);
694  4       IF rq_err <> 0
695  4       THEN DO;
696  5        null_ptr = 0;
697  5        CALL rq$c$send$co$response(null_ptr,0,@errmsg3,@rq_err);
698  5       END;
699  4       ELSE IF num_ads = 0
700  4       THEN DO;
701  5        null_ptr = 0;
702  5        CALL rq$c$send$co$response(null_ptr,0,@errmsg2,@rq_err);
703  5       END;
704  4       ELSE IF old_tag = 0
705  4       THEN DO;
706  5        x_dex = 0FFFFH;
707  5        found = true;
708  5        CALL list_sig(x_dex);
709  5       END;
710  4       ELSE DO;
             /* CHECK IF TAG EXISTS */
711  5        found = false;
712  5        x_dex = 0;
713  5        DO WHILE (found = false) AND (x_dex < num_ads);
714  6         IF (signature(x_dex).tag = old_tag)
715  6         THEN DO;
716  7          found = true;
717  7         END;
718  6         ELSE DO;
719  7          x_dex = x_dex + 1;
720  7         END;
721  6        END;

722  5        IF found = true
```

```
723   5        THEN DO;
724   6         CALL list_sig(x_dex);
725   6         END;
726   5        ELSE DO;
727   6         null_ptr = 0;
728   6         CALL rq$c$send$co$response(null_ptr,0,@errmsg2,@rq_err);
729   6         END;
730   5       END;

731   4     END list_case;
```

/*....................................................................*/
/*                                                                    */
/*                    HELP DISPLAY OF COMMANDS                        */
/*                                                                    */
/*....................................................................*/

```
732   3     help_case:
            DO;

733   4      null_ptr = 0;
734   4      j_dex = 1;
735   4      DO i_dex = 0 TO (comnd_help(0) - 1);
736   5       CALL rqcsendcoresponse(null_ptr,0,@comnd_help(j_dex),@rq_err);
737   5       j_dex = j_dex + comnd_help(j_dex) + 1;
738   5      END;
739   4     END help_case;
```

/*....................................................................*/
/*                                                                    */
/*                       QUIT EXIT PROGRAM                            */
/*                                                                    */
/*....................................................................*/

```
740   3     quit_case:
            DO;

741   4       CALL rqdeletesegment(signature_tkn,@rq_err);
742   4       CALL rqsclose(signature_conn,@rq_err);
743   4       CALL rqsdeleteconnection(signature_conn,@rq_err);

744   4       null = 0;
745   4       CALL RQ$EXIT$IO$JOB(rq_err,@null,@exit_status);

746   4     END quit_case;
```

/*....................................................................*/
/*                                                                    */
/*                       CREATE NEW DATA BASE                         */
/*                                                                    */
/*....................................................................*/

```
747   3     create_case:
            DO;

748   4      num_ads = 0;
             /* set the remaining signatures to white */
749   4      DO x_dex = 0 TO database_size - 1;
750   5       DO j_dex = 0 TO num_samples - 1;
751   6        signature(x_dex).sample(j_dex) = 0;
752   6        signature(x_dex).count(j_dex) = 0;
753   6        signature(x_dex).range(j_dex) = 0;
754   6        signature(x_dex).time(j_dex) = 0;
755   6       END;
756   5       signature(x_dex).tag = 0;
757   5      END;
```

```
758   4        CALL rqsseek(signature_conn,2,0,@rq_err);
759   4        bytes_written = rqswritemove(signature_conn,@num_ads,2,@rq_err);
760   4        bytes_written = rqswritemove(signature_conn,@signature,SIZE(signature),
                              @rq_err);

761   4      END create_case;

762   3     END; /* DO CASE */

763   2     prompt(0) = 1;
764   2     prompt(1) = '#';

765   2    END; /* DO FOREVER - MAIN MODULE */
766   1   END getsig;
```

MODULE INFORMATION:

CODE AREA SIZE     = 1944H    6468D
    CONSTANT AREA SIZE = 05A1H    1441D
    VARIABLE AREA SIZE = 2CC2H   11458D
    MAXIMUM STACK SIZE = 0034H      52D
    2093 LINES READ
    0 PROGRAM WARNINGS
    0 PROGRAM ERRORS

DICTIONARY SUMMARY:

471KB MEMORY AVAILABLE
    24KB MEMORY USED    (5%)
    0KB DISK SPACE USED

END OF PL/M-86 COMPILATION
iRMX 86 PL/M-86 V2.3 COMPILATION OF MODULE FRAME

```
            /************************************************************/
            /************************************************************/
            /***                                                      ***/
            /***        © 1986 Selling Areas -                        ***/
            /***        Marketing, Inc.                               ***/
            /***        Unpublished work -                            ***/
            /***        All rights reserved                           ***/
            /***                                                      ***/
            /************************************************************/
            /************************************************************/
            $optimize(3)
1           frame: DO;

2    1      DECLARE DCL LITERALLY 'DECLARE',
                    LIT LITERALLY 'LITERALLY',
                    PROC LIT 'PROCEDURE',
                    EXT LIT 'EXTERNAL',
                    FOREVER LIT 'WHILE 1',
                    TRUE LIT '1',
                    FALSE LIT '0';

/************************************************************/
```

```
            $NOLIST
            $INCLUDE(:HOME:SRN_SIG.INC)
137  1  =   DCL
        =       delta_err                LIT '1',
        =       database_size            LIT '64',
        =       num_samples              LIT '8', =   /* "num_elements" LITERAL CHANGED TO 6 FROM 4...SRN, 2-27-86 */

=       num_elements             LIT '6',
        =       Sig_and_Mask             LIT '2',
        =       element_size             LIT '1',
        =       num_sample_elements      LIT '(Num_Samples * Num_Elements)',
        =       num_frames               LIT '2048';

138  1  =   DCL
        =       num_ads                  WORD,
        =       signature_tkn            TOKEN PUBLIC,
        =       signature (database_size) STRUCTURE (
        =         sample(num_samples)      BYTE,
        =         count(num_samples)       BYTE,
        =         range(num_samples)       BYTE,
        =         time(num_samples)        WORD,
        =         tag                      DWORD ),
        =       frame_1_buff(num_frames) BYTE PUBLIC,
        =       frame_2_buff(num_frames) BYTE PUBLIC,
        =       get_frame_1_buff         STRUCTURE (
        =         sample                   BYTE,
        =         mask                     BYTE,
        =         time                     WORD ) PUBLIC,
        =       zero_frame_1_index       WORD,
        =       old_frame_1_index        WORD,
        =       delta_frame_1_index      WORD,
        =       end_frame_1_index        WORD,
        =       frame_1_mask(num_frames) BYTE PUBLIC,
        =       frame_2_mask(num_frames) BYTE PUBLIC,
        =       get_frame_2_buff         STRUCTURE (
        =         sample(num_elements)     BYTE,
        =         time                     WORD ) PUBLIC,
        =       zero_frame_2_index       WORD,
        =       old_frame_2_index        WORD,
        =       delta_frame_2_index      WORD,
        =       end_frame_2_index        WORD;

139  1  =   DCL
        =       old_x_handler            STRUCTURE (
        =         x_offset                 WORD,
        =         x_base                   WORD,
        =         x_mode                   BYTE),
        =       new_x_handler            STRUCTURE (
        =         x_offset                 WORD,
        =         x_base                   WORD,
        =         x_mode                   BYTE);

140  1  =   DCL
        =       terminal_param           STRUCTURE (
        =         number_param             WORD,
        =         number_used              WORD,
        =         connection_flags         WORD,
        =         terminal_flags           WORD,
        =         in_baud_rate             WORD,
        =         out_baud_rate            WORD,
        =         scroll_lines             WORD) ;
```

```
141  1  =  DCL
        =     num_elements_mask(8)        BYTE DATA
        =     (01H,03H,07H,0FH,1FH,3FH,7FH,0FFH);

142  1  =  DCL
        =     num_bits_set(256)           BYTE DATA (
        =  /*    00, 01, 02, 03, 04, 05, 06, 07, 08, 09, 0A, 0B, 0C, 0D, 0E, 0F, */
        =        0,  1,  1,  2,  1,  2,  2,  3,  1,  2,  2,  3,  2,  3,  3,  4,
        =  /*    10, 11, 12, 13, 14, 15, 16, 17, 18, 19, 1A, 1B, 1C, 1D, 1E, 1F, */
        =        1,  2,  2,  3,  2,  3,  3,  4,  2,  3,  3,  4,  3,  4,  4,  5,
        =  /*    20, 21, 22, 23, 24, 25, 26, 27, 28, 29, 2A, 2B, 2C, 2D, 2E, 2F, */
        =        1,  2,  2,  3,  2,  3,  3,  4,  2,  3,  3,  4,  3,  4,  4,  5,
        =  /*    30, 31, 32, 33, 34, 35, 36, 37, 38, 39, 3A, 3B, 3C, 3D, 3E, 3F, */
        =        2,  3,  3,  4,  3,  4,  4,  5,  3,  4,  4,  5,  4,  5,  5,  6,
        =  /*    40, 41, 42, 43, 44, 45, 46, 47, 48, 49, 4A, 4B, 4C, 4D, 4E, 4F, */
        =        1,  2,  2,  3,  2,  3,  3,  4,  2,  3,  3,  4,  3,  4,  4,  5,
        =  /*    50, 51, 52, 53, 54, 55, 56, 57, 58, 59, 5A, 5B, 5C, 5D, 5E, 5F, */
        =        2,  3,  3,  4,  3,  4,  4,  5,  3,  4,  4,  5,  4,  5,  5,  6,
        =  /*    60, 61, 62, 63, 64, 65, 66, 67, 68, 69, 6A, 6B, 6C, 6D, 6E, 6F, */
        =        2,  3,  3,  4,  3,  4,  4,  5,  3,  4,  4,  5,  4,  5,  5,  6,
        =  /*    70, 71, 72, 73, 74, 75, 76, 77, 78, 79, 7A, 7B, 7C, 7D, 7E, 7F, */
        =        3,  4,  4,  5,  4,  5,  5,  6,  4,  5,  5,  6,  5,  6,  6,  7,
        =  /*    80, 81, 82, 83, 84, 85, 86, 87, 88, 89, 8A, 8B, 8C, 8D, 8E, 8F, */
        =        1,  2,  2,  3,  2,  3,  3,  4,  2,  3,  3,  4,  3,  4,  4,  5,
        =  /*    90, 91, 92, 93, 94, 95, 96, 97, 98, 99, 9A, 9B, 9C, 9D, 9E, 9F, */
        =        2,  3,  3,  4,  3,  4,  4,  5,  3,  4,  4,  5,  4,  5,  5,  6,
        =  /*    A0, A1, A2, A3, A4, A5, A6, A7, A8, A9, AA, AB, AC, AD, AE, AF, */
        =        2,  3,  3,  4,  3,  4,  4,  5,  3,  4,  4,  5,  4,  5,  5,  6,
        =  /*    B0, B1, B2, B3, B4, B5, B6, B7, B8, B9, BA, BB, BC, BD, BE, BF, */
        =        3,  4,  4,  5,  4,  5,  5,  6,  4,  5,  5,  6,  5,  6,  6,  7,
        =  /*    C0, C1, C2, C3, C4, C5, C6, C7, C8, C9, CA, CB, CC, CD, CE, CF, */
        =        2,  3,  3,  4,  3,  4,  4,  5,  3,  4,  4,  5,  4,  5,  5,  6,
        =  /*    D0, D1, D2, D3, D4, D5, D6, D7, D8, D9, DA, DB, DC, DD, DE, DF, */
        =        3,  4,  4,  5,  4,  5,  5,  6,  4,  5,  5,  6,  5,  6,  6,  7,
        =  /*    E0, E1, E2, E3, E4, E5, E6, E7, E8, E9, EA, EB, EC, ED, EE, EF, */
        =        3,  4,  4,  5,  4,  5,  5,  6,  4,  5,  5,  6,  5,  6,  6,  7,
        =  /*    F0, F1, F2, F3, F4, F5, F6, F7, F8, F9, FA, FB, FC, FD, FE, FF, */
        =        4,  5,  5,  6,  5,  6,  6,  7,  5,  6,  6,  7,  6,  7,  7,  8 );

143  1  =  DCL
        =     random_signature (16)    STRUCTURE (
        =     sample(num_samples)      BYTE,
        =     count(num_samples)       BYTE,
        =     time(num_samples)        WORD,
        =     tag                      DWORD ) DATA (
        =  /*          1     2     3     4     5     6     7     8   */
        =  /* 1 */   0DH,  0CH,  03H,  04H,  08H,  03H,  0EH,  09H,  /* SAMPLES */
        =             0,    0,    0,    0,    0,    0,    0,    0,  /* MASK COUNTS */
        =           0399, 1104, 0193, 1161, 0894, 0608, 1246, 1384,  /* TIME */
        =           1001,                                            /* TAG */
        =  /* 2 */   03H,  09H,  01H,  08H,  07H,  01H,  08H,  0FH,  /* SAMPLES */
        =             0,    0,    0,    0,    0,    0,    0,    0,  /* MASK COUNTS */
        =           0095, 0235, 0861, 0191, 0138, 1559, 0554, 1288,  /* TIME */
        =           1002,                                            /* TAG */
        =  /* 3 */   03H,  01H,  01H,  09H,  0FH,  06H,  08H,  08H,  /* SAMPLES */
        =             0,    0,    0,    0,    0,    0,    0,    0,  /* MASK COUNTS */
        =           0597, 0008, 1556, 0860, 0973, 1477, 0271, 0992,  /* TIME */
        =           1003,                                            /* TAG */
        =  /* 4 */   09H,  0AH,  08H,  0DH,  0BH,  00H,  08H,  08H,  /* SAMPLES */
        =             0,    0,    0,    0,    0,    0,    0,    0,  /* MASK COUNTS */
        =           1855, 1754, 0737, 0492, 0524, 0215, 1512, 1292,  /* TIME */
        =           1004,                                            /* TAG */
        =  /* 5 */   05H,  0DH,  0DH,  0EH,  08H,  09H,  05H,  0AH,  /* SAMPLES */
        =             0,    0,    0,    0,    0,    0,    0,    0,  /* MASK COUNTS */
```

```
  =                0159, 0760, 1936, 0795, 0589, 0932, 0435, 0861, /* TIME */
  =                1005,                                           /* TAG */
  =    /*  6 */    03H,  08H,  0DH,  05H,  09H,  09H,  0EH,  05H,  /* SAMPLES */
  =                  0,    0,    0,    0,    0,    0,    0,    0,  /* MASK COUNTS */
  =                1581, 1068, 1100, 0119, 0936, 1635, 1937, 1980, /* TIME */
  =                1006,                                           /* TAG */
  =    /*  7 */    07H,  0DH,  0AH,  07H,  0DH,  00H,  01H,  0FH,  /* SAMPLES */
  =                  0,    0,    0,    0,    0,    0,    0,    0,  /* MASK COUNTS */
  =                0630, 0514, 0957, 0287, 1739, 1103, 1905, 1406, /* TIME */
  =                1007,                                           /* TAG */
  =    /*  8 */    08H,  01H,  0FH,  02H,  01H,  03H,  03H,  0BH,  /* SAMPLES */
  =                  0,    0,    0,    0,    0,    0,    0,    0,  /* MASK COUNTS */
  =                0406, 1929, 1496, 1633, 1646, 0780, 0412, 0665, /* TIME */
  =                1008,                                           /* TAG */
  =    /*  9 */    0DH,  07H,  09H,  0BH,  0AH,  07H,  01H,  03H,  /* SAMPLES */
  =                  0,    0,    0,    0,    0,    0,    0,    0,  /* MASK COUNTS */
  =                1127, 0990, 0494, 1484, 1466, 1261, 1587, 1100, /* TIME */
  =                1009,                                           /* TAG */
  =    /* 10 */    09H,  05H,  0BH,  07H,  0CH,  0AH,  0DH,  0EH,  /* SAMPLES */
  =                  0,    0,    0,    0,    0,    0,    0,    0,  /* MASK COUNTS */
  =                1089, 0757, 1461, 1963, 0231, 1296, 0617, 1341, /* TIME */
  =                1010,                                           /* TAG */
  =    /* 11 */    0BH,  08H,  08H,  0DH,  0CH,  07H,  02H,  04H,  /* SAMPLES */
  =                  0,    0,    0,    0,    0,    0,    0,    0,  /* MASK COUNTS */
  =                0183, 1553, 0217, 0677, 0943, 1803, 0702, 0730, /* TIME */
  =                1011,                                           /* TAG */
  =    /* 12 */    00H,  0BH,  08H,  09H,  09H,  0EH,  09H,  09H,  /* SAMPLES */
  =                  0,    0,    0,    0,    0,    0,    0,    0,  /* MASK COUNTS */
  =                1889, 1599, 1586, 1207, 1774, 0165, 1166, 1520, /* TIME */
  =                1012,                                           /* TAG */
  =    /* 13 */    0EH,  02H,  00H,  0EH,  07H,  03H,  09H,  03H,  /* SAMPLES */
  =                  0,    0,    0,    0,    0,    0,    0,    0,  /* MASK COUNTS */
  =                0083, 1374, 0753, 1088, 0348, 0286, 1379, 0578, /* TIME */
  =                1013,                                           /* TAG */
  =    /* 14 */    08H,  03H,  03H,  0CH,  07H,  0CH,  0FH,  02H,  /* SAMPLES */
  =                  0,    0,    0,    0,    0,    0,    0,    0,  /* MASK COUNTS */
  =                1476, 1953, 1526, 1433, 1566, 0529, 1216, 0186, /* TIME */
  =                1014,                                           /* TAG */
  =    /* 15 */    01H,  01H,  04H,  05H,  0CH,  06H,  0BH,  0FH,  /* SAMPLES */
  =                  0,    0,    0,    0,    0,    0,    0,    0,  /* MASK COUNTS */
  =                0311, 0036, 1946, 1335, 0753, 0949, 0261, 0292, /* TIME */
  =                1015,                                           /* TAG */
  =    /* 16 */    0BH,  08H,  0BH,  01H,  0FH,  05H,  0BH,  09H,  /* SAMPLES */
  =                  0,    0,    0,    0,    0,    0,    0,    0,  /* MASK COUNTS */
  =                1297, 0191, 0283, 1698, 1537, 1231, 0379, 1424, /* TIME */
  =                1016);                                          /* TAG */
144  1   DCL
         prompt(80)              BYTE,
         response(80)            BYTE,
         command (80)            BYTE,
         new_tag                 DWORD,
         old_tag                 DWORD;

145  1   DCL
         clock                   STRUCTURE (
             sys_time                DWORD,
             date(8)                 BYTE,
             time(8)                 BYTE);
146  1   DCL
         log1                    STRUCTURE (
             start_flag              DWORD,
             sys_time                DWORD,
             tag                     DWORD,
             channel                 WORD,
```

```
              frame_num              WORD),
            log2                     STRUCTURE (
              start_flag             DWORD,
              sys_time               DWORD,
              tag                    DWORD,
              channel                WORD,
              frame_num              WORD);

147  1  DCL
            corr_msg                 STRUCTURE (
              sync                   DWORD,
              value(16)              BYTE);

148  1  DCL
            mask_found               BYTE,
            bit_count                BYTE,
            frame_bits               BYTE,
            mask_bits                BYTE,
            set_bit                  BYTE,
            found                    BYTE,
            mask_set                 BYTE,
            task_priority            BYTE,
            frame_average            WORD,
            ad_found                 WORD,
            time_found               DWORD,
            null_ptr                 POINTER,
            null                     WORD,
            diff                     INTEGER,
            exit_status              WORD,
            tkn_type                 WORD,
            t1_i_resp_mbx            TOKEN,
            t1_o_resp_mbx            TOKEN,
            t1_dev_connection        TOKEN,
            t1_connection            TOKEN,
            t2_i_resp_mbx            TOKEN,
            t2_o_resp_mbx            TOKEN,
            t2_dev_connection        TOKEN,
            t2_connection            TOKEN,
            t3_i_resp_mbx            TOKEN,
            t3_o_resp_mbx            TOKEN,
            t3_dev_connection        TOKEN,
            t3_connection            TOKEN,
            T4_dev_connection        TOKEN,
            T4_connection            TOKEN,
            t0_connection            TOKEN,
            lp_response_mbx          TOKEN,
            lp_dev_connection        TOKEN,
            lp_connection            TOKEN,
            signature_conn           TOKEN,
            time_out_1               WORD,
            time_out_2               WORD,
            bytes_written            WORD,
            bytes_read               WORD,
            next_ad                  WORD,
            next_dsp                 WORD,
            next_sample              WORD,
            next_element             WORD,
            sig_index                WORD,
            time_index               WORD,
            end_frame_1_time         WORD,
            end_frame_2_time         WORD,
            next                     WORD,
            left                     WORD,
```

```
                    rq_err                    WORD;

149  1    init_bars: PROC EXT;
150  2    END init_bars;

151  1    bar_disp: PROC (line_num,corr_num) EXT;
152  2    DCL
                  line_num              BYTE,
                  corr_num              BYTE;
153  2    END bar_disp;

$eject
          /*................................................................*/
          /*                                                                */
          /*                      CLEAR INPUT BUFFER                        */
          /*                                                                */
          /*................................................................*/
154  1    clear_buff_1: PROC PUBLIC;

/* set to transparent mode */
155  2    terminal_param.number_param = 5;
156  2    terminal_param.number_used = 4;
157  2    terminal_param.connection_flags = 0FFH;
158  2    terminal_param.terminal_flags = 110H;
159  2    terminal_param.in_baud_rate = 9600;
160  2    terminal_param.out_baud_rate = 1;
161  2    terminal_param.scroll_lines = 24;
162  2    CALL rqaspecial(t1_connection,5,@terminal_param,0,@rq_err);

/* CLEAR INPUT BUFFER */
163  2    CALL rqaread(t1_connection,@frame_1_buff,1,t1_i_resp_mbx,@rq_err);
164  2    bytes_read = rqwaitio(t1_connection,t1_i_resp_mbx,0FFFFH,@rq_err);
165  2    DO WHILE bytes_read <> 0;
166  3     CALL rqaread(t1_connection,@frame_1_buff,1,t1_i_resp_mbx,@rq_err);
167  3     bytes_read = rqwaitio(t1_connection,t1_i_resp_mbx,0FFFFH,@rq_err);
168  3    END;

/* reset to flush mode */
169  2    terminal_param.number_param = 5;
170  2    terminal_param.number_used = 4;
171  2    terminal_param.connection_flags = 0FDH;
172  2    terminal_param.terminal_flags = 110H;
173  2    terminal_param.in_baud_rate = 9600;
174  2    terminal_param.out_baud_rate = 1;
175  2    terminal_param.scroll_lines = 24;
176  2    CALL rqaspecial(t1_connection,5,@terminal_param,0,@rq_err);

177  2    END clear_buff_1;

/*................................................................*/

178  1    clear_buff_2: PROC PUBLIC;

/* set to transparent mode */
179  2    terminal_param.number_param = 5;
180  2    terminal_param.number_used = 4;
181  2    terminal_param.connection_flags = 0FFH;
182  2    terminal_param.terminal_flags = 110H;
183  2    terminal_param.in_baud_rate = 9600;
184  2    terminal_param.out_baud_rate = 1;
185  2    terminal_param.scroll_lines = 24;
186  2    CALL rqaspecial(t2_connection,5,@terminal_param,0,@rq_err);
          /* CLEAR INPUT BUFFER */
```

```
187  2     CALL rqaread(t2_connection,@frame_1_buff,1,t2_i_resp_mbx,@rq_err);
188  2     bytes_read = rqwaitio(t2_connection,t2_i_resp_mbx,0FFFFH,@rq_err);
189  2     DO WHILE bytes_read <> 0;
190  3       CALL rqaread(t2_connection,@frame_1_buff,1,t2_i_resp_mbx,@rq_err);
191  3       bytes_read = rqwaitio(t2_connection,t2_i_resp_mbx,0FFFFH,@rq_err);
192  3     END;

/* reset to flush mode */
193  2     terminal_param.number_param = 5;
194  2     terminal_param.number_used = 4;
195  2     terminal_param.connection_flags = 0FDH;
196  2     terminal_param.terminal_flags = 110H;
197  2     terminal_param.in_baud_rate = 9600;
198  2     terminal_param.out_baud_rate = 1;
199  2     terminal_param.scroll_lines = 24;
200  2     CALL rqaspecial(t2_connection,5,@terminal_param,0,@rq_err);

201  2     END clear_buff_2;

$eject
           /**********************************************************************/
           /*                                                                    */
           /*              ASCII TO BINARY BYTE                                  */
           /*                                                                    */
           /**********************************************************************/
202  1     ascii_binary1: PROC(string_ptr,ierr_ptr) BYTE EXT;

203  2       DCL
                string_ptr      POINTER,
                ierr_ptr        POINTER;

204  2     END ascii_binary1;

/**********************************************************************/
           /*                                                                    */
           /*              ASCII TO BINARY WORD                                  */
           /*                                                                    */
           /**********************************************************************/
205  1     ascii_binary2: PROC(string_ptr,ierr_ptr) WORD EXT;

206  2       DCL
                string_ptr      POINTER,
                ierr_ptr        POINTER;

207  2     END ascii_binary2;

/**********************************************************************/
           /*                                                                    */
           /*              ASCII TO BINARY DWORD                                 */
           /*                                                                    */
           /**********************************************************************/
208  1     ascii_binary4: PROC(string_ptr,ierr_ptr) DWORD EXT;

209  2       DCL
                string_ptr      POINTER,
                ierr_ptr        POINTER;

210  2     END ascii_binary4;

/**********************************************************************/
           /*                                                                    */
           /*              BINARY TO ASCII BYTE                                  */
```

```
                /*                                                              */
                /**************************************************************/
211    1        binary1_ascii: PROC(value,string_ptr,ierr_ptr) EXT;

212    2        DCL
                    string_ptr       POINTER,
                    ierr_ptr         POINTER,
                    value            BYTE;

213    2        END binary1_ascii;

/**************************************************************/
                /*                                                              */
                /*             BINARY TO ASCII WORD                             */
                /*                                                              */
                /**************************************************************/
214    1        binary2_ascii: PROC(value,string_ptr,ierr_ptr) EXT;

215    2        DCL
                    string_ptr       POINTER,
                    ierr_ptr         POINTER,
                    value            WORD;

216    2        END binary2_ascii;

/**************************************************************/
                /*                                                              */
                /*             BINARY TO ASCII DWORD                            */
                /*                                                              */
                /**************************************************************/
217    1        binary4_ascii: PROC(value,string_ptr,ierr_ptr) EXT;

218    2        DCL
                    string_ptr       POINTER,
                    ierr_ptr         POINTER,
                    value            DWORD;

219    2        END binary4_ascii;

$SUBTITLE('GET DATA FROM FRAME GRABBER')
                /*............................................................*/
                /*                                                              */
                /*             GET DATA FROM FRAME GRABBER                      */
                /*                                                              */
                /*............................................................*/
220    1        get_frame_1: PROC(signature_sample_ptr) PUBLIC;

221    2        DCL
                    signature_sample_ptr    POINTER,
                    signature_sample        BASED signature_sample_ptr (1) BYTE,
                    next                    WORD,
                    left                    WORD;

/*............................................................*/

222    2        bytes_written = rqwaitio(t1_connection,t1_o_resp_mbx,0FFFFH,@rq_err);
223    2        IF time_out_1 = false
224    2        THEN DO;
225    3         left = (Sig_and_Mask * element_size) + 2;
226    3         CALL rqaread(t1_connection,@signature_sample(0),left,t1_i_resp_mbx,@rq_err);
227    3         END;
228    2        bytes_read = rqwaitio(t1_connection,t1_i_resp_mbx,15,@rq_err);
229    2        IF rq_err = e$time
230    2        THEN DO;
```

```
231   3       time_out_1 = true;
232   3       CALL rq$c$send$co$response(null_ptr,0,@(10,'TIMEOUT 1 '),@rq_err);
233   3       END;
234   2     ELSE IF time_out_1 = true
235   2     THEN DO;
236   3       CALL clear_buff_1;
237   3       time_out_1 = false;
238  .3       END;
239   2     ELSE IF bytes_read <> (Sig_and_Mask.* element_size) + 2
240   2     THEN DO;
241   3       CALL rq$c$send$co$response(null_ptr,0,@(8,'ERROR 1 '),@rq_err);
242   3       END;

243   2     END get_frame_1;

244   1     get_frame_2: PROC(signature_sample_ptr) PUBLIC;

245   2     DCL
                 signature_sample_ptr       POINTER,
                 signature_sample           BASED signature_sample_ptr (1) BYTE,
                 next                       WORD,
                 left                       WORD;

/*................................................................*/

246   2     bytes_written = rqwaitio(t2_connection,t2_o_resp_mbx,0FFFFH,@rq_err);
247   2     IF time_out_2 = false
248   2     THEN DO;
249   3       left = (Sig_and_Mask * element_size) + 2;
250   3       CALL rqaread(t2_connection,@signature_sample(0),left,t2_i_resp_mbx,@rq_err);
251   3       END;
252   2     bytes_read = rqwaitio(t2_connection,t2_i_resp_mbx,15,@rq_err);
253   2     IF rq_err = e$time
254   2     THEN DO;
255   3       time_out_2 = true;
256   3       CALL rq$c$send$co$response(null_ptr,0,@(10,'TIMEOUT 2 '),@rq_err);
257   3       END;
258   2     ELSE IF time_out_2 = true
259   2     THEN DO;
260   3       CALL clear_buff_2;
261   3       time_out_2 = false;
262   3       END;
263   2     ELSE IF bytes_read <> (Sig_and_Mask * element_size) + 2
264   2     THEN DO;
265   3       CALL rq$c$send$co$response(null_ptr,0,@(8,'ERROR 2 '),@rq_err);
266   3       END;

267   2     END get_frame_2;

/***................................................***/
             /***    BEGIN MAIN MODULE ("FRAME") PROCESSING      ***/
             /***................................................***/

$eject
             /*................................................................*/
             /*                                                                */
             /*           SET UP I/O FOR LOGGING COMPUTER                      */
             /*                                                                */
             /*................................................................*/

/*CALL rqlogicalattachdevice(@(4,':T3:'),@(2,'T3'),1,@rq_err);*/
268   1     t3_dev_connection = rqslookupconnection(@(4,':T3:'),@rq_err);
269   1     t3_o_resp_mbx = rqcreatemailbox(0,@rq_err);
```

```
270  1      t3_i_resp_mbx = rqcreatemailbox(0,@rq_err);
271  1      null_ptr = 0;
272  1      CALL rqaattachfile(0,t3_dev_connection,null_ptr,t3_i_resp_mbx,@rq_err);
273  1      t3_connection = rqreceivemessage(t3_i_resp_mbx,0FFFFH,null_ptr,@rq_err);
274  1      tkn_type = rqgettype(t3_connection,@rq_err);
275  1      IF tkn_type = 6
276  1      THEN DO;
277  2       CALL rqdeletesegment(t3_connection,@rq_err);
278  2       null = 0;
279  2       CALL RQ$EXIT$IO$JOB(rq_err,@null,@exit_status);
280  2      END;
281  1      CALL rqaopen(t3_connection,3,3,0,@rq_err);

282  1      terminal_param.number_param = 5;
283  1      terminal_param.number_used = 4;
284  1      terminal_param.connection_flags = 0FDH;
285  1      terminal_param.terminal_flags = 111H;
286  1      terminal_param.in_baud_rate = 4800;
287  1      terminal_param.out_baud_rate = 1;
288  1      terminal_param.scroll_lines = 24;
289  1      CALL rqaspecial(t3_connection,5,@terminal_param,0,@rq_err);

/*CALL rqlogicalattachdevice(@(4,':T4:'),@(2,'T4'),1,@rq_err);*/
290  1      T4_connection = rqsattachfile(@(4,':T4:'),@rq_err);
291  1      CALL rqsopen(T4_connection,3,0,@rq_err);

292  1      terminal_param.number_param = 5;
293  1      terminal_param.number_used = 4;
294  1      terminal_param.connection_flags = 0FFH;
295  1      terminal_param.terminal_flags = 111H;
296  1      terminal_param.in_baud_rate = 4800;
297  1      terminal_param.out_baud_rate = 1;
298  1      terminal_param.scroll_lines = 24;
299  1      null_ptr = 0;
300  1      CALL rqsspecial(T4_connection,5,@terminal_param,null_ptr,@rq_err);

$eject
            /*..............................................................*/
            /*                                                              */
            /*            SET UP I/O FOR FRAME GRABBER                      */
            /*                                                              */
            /*..............................................................*/

/*CALL rqlogicalattachdevice(@(4,':T1:'),@(2,'T1'),1,@rq_err);*/
301  1      t1_dev_connection = rqslookupconnection(@(4,':T1:'),@rq_err);
302  1      t1_o_resp_mbx = rqcreatemailbox(0,@rq_err);
303  1      t1_i_resp_mbx = rqcreatemailbox(0,@rq_err);
304  1      null_ptr = 0;
305  1      CALL rqaattachfile(0,t1_dev_connection,null_ptr,t1_i_resp_mbx,@rq_err);
306  1      t1_connection = rqreceivemessage(t1_i_resp_mbx,0FFFFH,null_ptr,@rq_err);
307  1      tkn_type = rqgettype(t1_connection,@rq_err);
308  1      IF tkn_type = 6
309  1      THEN DO;
310  2       CALL rqdeletesegment(t1_connection,@rq_err);
311  2       null = 0;
312  2       CALL RQ$EXIT$IO$JOB(rq_err,@null,@exit_status);
313  2      END;
314  1      CALL rqaopen(t1_connection,3,3,0,@rq_err);

315  1      terminal_param.number_param = 5;
316  1      terminal_param.number_used = 4;
317  1      terminal_param.connection_flags = 0FDH;
318  1      terminal_param.terminal_flags = 110H;
319  1      terminal_param.in_baud_rate = 9600;
```

```
320  1    terminal_param.out_baud_rate = 1;
321  1    terminal_param.scroll_lines = 24;
322  1    CALL rqaspecial(t1_connection,5,@terminal_param,0,@rq_err);

$eject
          /*CALL rqlogicalattachdevice(@(4,':T2:'),@(2,'T2'),1,@rq_err);*/
323  1    t2_dev_connection = rqslookupconnection(@(4,':T2:'),@rq_err);
324  1    t2_o_resp_mbx = rqcreatemailbox(0,@rq_err);
325  1    t2_i_resp_mbx = rqcreatemailbox(0,@rq_err);
326  1    null_ptr = 0;
327  1    CALL rqaattachfile(0,t2_dev_connection,null_ptr,t2_i_resp_mbx,@rq_err);
328  1    t2_connection = rqreceivemessage(t2_i_resp_mbx,0FFFFH,null_ptr,@rq_err);
329  1    tkn_type = rqgettype(t2_connection,@rq_err);
330  1    IF tkn_type = 6
331  1    THEN DO;
332  2     CALL rqdeletesegment(t2_connection,@rq_err);
333  2     null = 0;
334  2     CALL RQ$EXIT$IO$JOB(rq_err,@null,@exit_status);
335  2    END;
336  1    CALL rqaopen(t2_connection,3,3,0,@rq_err);

337  1    terminal_param.number_param = 5;
338  1    terminal_param.number_used = 4;
339  1    terminal_param.connection_flags = 0FDH;
340  1    terminal_param.terminal_flags = 110H;
341  1    terminal_param.in_baud_rate = 9600;
342  1    terminal_param.out_baud_rate = 1;
343  1    terminal_param.scroll_lines = 24;
344  1    CALL rqaspecial(t2_connection,5,@terminal_param,0,@rq_err);

$eject
          /*.............................................................*/
          /*                                                             */
          /*           SET UP I/O FOR LINE PRINTER                       */
          /*                                                             */
          /*.............................................................*/

/*CALL rqlogicalattachdevice(@(4,':LP:'),@(2,'T1'),1,@rq_err);*/
345  1    lp_dev_connection = rqslookupconnection(@(4,':LP:'),@rq_err);
346  1    lp_response_mbx = rqcreatemailbox(0,@rq_err);
347  1    null_ptr = 0;
348  1    CALL rqaattachfile(0,lp_dev_connection,null_ptr,lp_response_mbx,@rq_err);
349  1    lp_connection = rqreceivemessage(lp_response_mbx,0FFFFH,null_ptr,@rq_err);
350  1    tkn_type = rqgettype(lp_connection,@rq_err);
351  1    IF tkn_type = 6
352  1    THEN DO;
353  2     CALL rqdeletesegment(lp_connection,@rq_err);
354  2     null = 0;
355  2     CALL RQ$EXIT$IO$JOB(rq_err,@null,@exit_status);
356  2    END;
357  1    CALL rqaopen(lp_connection,2,2,0,@rq_err);

358  1    task_priority = rqgetpriority(0,@rq_err);
359  1    task_priority = task_priority - 1;
360  1    null_ptr = 0;

$eject
          /*.............................................................*/
          /*                                                             */
          /*           SET UP I/O FOR SIGNATURE DATA BASE                */
          /*                                                             */
          /*.............................................................*/
```

```
361  1    signature_conn = rqsattachfile(@(23,'/user/world/exp1sig.dat'),@rq_err);
362  1    CALL rqsopen(signature_conn,3,2,@rq_err);

363  1    bytes_read = rqsreadmove(signature_conn,@num_ads,2,@rq_err);
364  1    bytes_read = rqsreadmove(signature_conn,@signature,SIZE(signature),
                       @rq_err);

365  1    CALL rqsclose(signature_conn,@rq_err);
366  1    CALL rqsdeleteconnection(signature_conn,@rq_err);

367  1    time_out_1 = false;
368  1    time_out_2 = false;
369  1    next = 0;
370  1    end_frame_1_time = 0;
371  1    end_frame_1_index = num_frames - 1;
372  1    zero_frame_1_index = 0;

/* turn off exception handler for timeout in get_frame */
373  1    new_x_handler.x_offset = 0;
374  1    new_x_handler.x_base = 0;
375  1    new_x_handler.x_mode = 0;
376  1    CALL rqgetexceptionhandler(@old_x_handler,@rq_err);
377  1    CALL rqsetexceptionhandler(@new_x_handler,@rq_err);

/* CLEAR INPUT BUFFER */
378  1    CALL clear_buff_1;
379  1    CALL clear_buff_2;
380  1    corr_msg.sync = 0FFFFFFFFH;

/* prime the get frame comm */
381  1    CALL rqawrite(t1_connection,@(0DH),1,t1_o_resp_mbx,@rq_err);

$SUBTITLE('MAIN MODULE DO FOREVER')
          /************************************************************/
          /*                                                          */
          /*        * * * * * M A I N   M O D U L E * * * *           */
          /*                                                          */
          /************************************************************/

382  1    DO FOREVER;

/* get next frame data */
383  2    CALL get_frame_1(@get_frame_1_buff);
384  2    CALL rqawrite(t1_connection,@(0DH),1,t1_o_resp_mbx,@rq_err);

/* modulo subtract field count from a base count and convert to frame count */
385  2    old_frame_1_index = end_frame_1_index;
386  2    delta_frame_1_index = get_frame_1_buff.time - end_frame_1_time;
387  2    zero_frame_1_index = (zero_frame_1_index + delta_frame_1_index) MOD num_frames;
388  2    end_frame_1_index = (old_frame_1_index + delta_frame_1_index) MOD num_frames;
389  2    end_frame_1_time = get_frame_1_buff.time;

/* fill frame from last aquired frame with new frame data */

390  2    next_sample = old_frame_1_index;
391  2    DO WHILE next_sample <> end_frame_1_index;
392  3     next_sample = (next_sample + 1) MOD num_frames;
393  3     Frame_1_Buff(Next_Sample) = Get_Frame_1_Buff.Sample;
394  3     Frame_1_Mask(Next_Sample) = Get_Frame_1_Buff.Mask AND 03FH;
395  3    END;

/* compare signatures with frame buffer */
```

```
396   2      DO next_ad = 0 TO num_ads - 1;

/* cycle through the signature samples per ad */
397   3       found = 0;
398   3       mask_set = 0;
399   3       DO next_sample = 0 TO num_samples - 1;

/* calculate index in circular frame buffer of signature */
400   4        time_index = (signature(next_ad).time(next_sample) + zero_frame_1_index)
                            MOD num_frames;
401   4        bit_count = NOT(signature(next_ad).sample(next_sample)
                          XOR frame_1_buff(time_index));

/* count number of bits same */
402   4        bit_count = bit_count AND num_elements_mask(num_elements - 1);
403   4        found = found + num_bits_set(bit_count);
404   4        mask_set = mask_set + num_bits_set(frame_1_mask(time_index));

405   4       END;/* DO next_sample */
       /*     prompt(0) = 8;*/
       /*     CALL binary2_ascii(DOUBLE(found),@prompt,@rq_err);*/
       /*     CALL rqcsendcoresponse(null_ptr,0,@prompt,@rq_err);*/

406   3       IF (mask_set < (found * 2))
407   3       THEN DO;
408   4        mask_found = (found - mask_set / 2);
409   4       END;
410   3       ELSE DO;
411   4        mask_found = 0;
412   4       END;
413   3       corr_msg.value(next_ad) = mask_found;

414   3       IF mask_found > 45
415   3       THEN DO;
              /* ad detected */
416   4        log1.start_flag = 0;
417   4        log1.sys_time = rqgettime(@rq_err);
418   4        log1.tag = signature(next_ad).tag;
419   4        log1.channel = (1 OR SHL(DOUBLE(mask_found),8));
420   4        log1.frame_num = end_frame_1_time;
421   4        CALL rqawrite(t3_connection,@log1.start_flag,SIZE(log1),t3_o_resp_mbx,@rq_err);
422   4        bytes_written = rqwaitio(t3_connection,t3_o_resp_mbx,0FFFFH,@rq_err);

423   4        next_dsp = 5;
424   4       END;

425   3      END;/* DO next_ad */

426   2      next_dsp = next_dsp + 1;
427   2      IF (next_dsp MOD 6) = 0
428   2      THEN DO;
429   3       bytes_written = rqswritemove(T4_connection,@corr_msg,SIZE(corr_msg),@rq_err);
430   3      END;

/***********************************************************************/

431   2     END;/* DO FOREVER */

432   1    END frame;

$EJECT
```

MODULE INFORMATION:

```
    CODE AREA SIZE     = 0A2EH   2606D
    CONSTANT AREA SIZE = 03A3H    931D
    VARIABLE AREA SIZE = 2CE0H  11488D
    MAXIMUM STACK SIZE = 0028H     40D
    1614 LINES READ
    0 PROGRAM WARNINGS
    0 PROGRAM ERRORS

DICTIONARY SUMMARY:

507KB MEMORY AVAILABLE
    22KB MEMORY USED   (4%)
    0KB DISK SPACE USED

END OF PL/M-86 COMPILATION
iNDX-W51 (X325) PL/M-86 V2.3 COMPILATION OF MODULE PRTHIT
```

```
/************************************************************/
/*                                                          */
/*      © 1986 Selling Areas -                              */
/*      Marketing, Inc.                                     */
/*      Unpublished work -                                  */
/*      All rights reserved                                 */
/*                                                          */
/*                                                          */
/*                    NARRATIVE                             */
/*                    ^^^^^^^^^                             */
/*                                                          */
/*  This module receives data from port "t2", written there by the */
/* "GETSIG" commercial detection module.  This data consists of: */
/*                                                          */
/* Check       - DWORD --- should be a zero if the packet sent is in */
/*                         sync; used to check for valid data sent */
/* Sent_Time   - DWORD --- format: no. of seconds since iRMX was released */
/* Sent_ID     - DWORD --- ID # of commercial detected by GETSIG module */
/* Channel_Num - BYTE  --- one of two channel numbers       */
/* Cor_Bits    - BYTE  ---                                  */
/* Cor_Frames  - WORD  --- # of frames btwn hits within 5 seconds */
/*                                                          */
/*  Using these values, this module will:                   */
/*                                                          */
/*    a) Check that valid data has been sent.               */
/*    b) Check that no other commercial has been detected in the last */
/*       34 seconds.                                        */
/*    c) Subtract from SENT_TIME 34 seconds to make up for time lag in */
/*       being sent the data from GETSIG.                   */
/*    d) Convert SENT_TIME value to ASCII_TIME.             */
/*    e) Search "descriptive" data base until this COMM_ID is found */
/*    f) Store the ASCII description along with ASCII_TIME into a */
/*       buffer for printing.                               */
/*    g) Send the "print_buffer" to the line printer to be printed. */
/*                                                          */
/************************************************************/

$LARGE

1   Prthit:
    DO;
```

```
/************************************/
/*** NON-iRMX INCLUDE FILES      ***/
/************************************/

$INCLUDE (:F8:ARGLST.INC)
   =  /********************************************************************/
   =  /*   ARGLST.INC  Screen Processor -- Argument List Delimiters        */
   =  /********************************************************************/
 2  1 =  DECLARE  TN    LITERALLY  '0E0H';   /* <Type No Operation>           */
 3  1 =  DECLARE  TS    LITERALLY  '0E1H';   /* <Type Character String>       */
 4  1 =  DECLARE  CI    LITERALLY  '0E2H';   /* <Type Character String Indirect> */
 5  1 =  DECLARE  MS    LITERALLY  '0E3H';   /* <Type Message String>         */
 6  1 =  DECLARE  MI    LITERALLY  '0E4H';   /* <Type Message String Indirect> */
 7  1 =  DECLARE  MC    LITERALLY  '0E5H';   /* <Type Meessage Constant>      */
 8  1 =  DECLARE  SR    LITERALLY  '0E6H';   /* <Type Screen Reference>       */
 9  1 =  DECLARE  TR    LITERALLY  '0E7H';   /* <Type Reply>                  */
10  1 =  DECLARE  RD    LITERALLY  '0E8H';   /* <Type Reply Default>          */
11  1 =  DECLARE  TT    LITERALLY  '0E9H';   /* <Type Timeout>                */
12  1 =  DECLARE  DM    LITERALLY  '0EAH';   /* <Type Display Miniimum>       */
13  1 =  DECLARE  OL    LITERALLY  '0EBH';   /* <Type Out-Line List>          */
14  1 =  DECLARE  TL    LITERALLY  '0ECH';   /* <Type List Transfer>          */
15  1 =  DECLARE  TC    LITERALLY  '0EDH';   /* <Type Count>                  */
16  1 =  DECLARE  I2    LITERALLY  '0EEH';   /* <Type Integer*2 Datum>        */
17  1 =  DECLARE  I4    LITERALLY  '0EFH';   /* <Type Integer*4 Datum>        */
18  1 =  DECLARE  B1    LITERALLY  '0F0H';   /* <Type Binary*1 Datum>         */
19  1 =  DECLARE  B2    LITERALLY  '0F1H';   /* <Type Binary*2 Datum>         */
20  1 =  DECLARE  B4    LITERALLY  '0F2H';   /* <Type Binary*4 Datum>         */
21  1 =  DECLARE  TD    LITERALLY  '0F3H';   /* <Type Decimal Datum>          */
22  1 =  DECLARE  CD    LITERALLY  '0F4H';   /* <Type Character Datum>        */
23  1 =  DECLARE  EI    LITERALLY  '0F5H';   /* <Type End of I/O List>        */
24  1 =  DECLARE  GD    LITERALLY  '0F6H';   /* <Group Definition>            */
25  1 =  DECLARE  GE    LITERALLY  '0F7H';   /* <Group End>                   */
26  1 =  DECLARE  RI    LITERALLY  '0F8H';   /* <Type Reply I/O List>         */
27  1 =  DECLARE  IO    LITERALLY  '0F9H';   /* <Type Reply Default I/O List> */
28  1 =  DECLARE  EL    LITERALLY  '0FAH';   /* <End of List>                 */
         $INCLUDE (:F2:IDTBLE.INC)
29  1 =  DECLARE  DBS001  LITERALLY  ' 0 ';
30  1 =  DECLARE  DBS002  LITERALLY  ' 1 ';
31  1 =  DECLARE  DBS003  LITERALLY  ' 2 ';
32  1 =  DECLARE  DBS004  LITERALLY  ' 3 ';
33  1 =  DECLARE  DBS005  LITERALLY  ' 4 ';
34  1 =  DECLARE  DBS006  LITERALLY  ' 5 ';
35  1 =  DECLARE  DBS007  LITERALLY  ' 6 ';
36  1 =  DECLARE  DBS008  LITERALLY  ' 7 ';
37  1 =  DECLARE  DBS009  LITERALLY  ' 8 ';
38  1 =  DECLARE  DBS010  LITERALLY  ' 9 ';
39  1 =  DECLARE  DBM001  LITERALLY  ' 0 ';
40  1 =  DECLARE  DBM002  LITERALLY  ' 1 ';
41  1 =  DECLARE  DBM003  LITERALLY  ' 2 ';
42  1 =  DECLARE  DBM004  LITERALLY  ' 3 ';
43  1 =  DECLARE  DBM005  LITERALLY  ' 4 ';
44  1 =  DECLARE  DBM006  LITERALLY  ' 5 ';
45  1 =  DECLARE  DBM007  LITERALLY  ' 6 ';
46  1 =  DECLARE  DBM008  LITERALLY  ' 7 ';
47  1 =  DECLARE  DBM009  LITERALLY  ' 8 ';
48  1 =  DECLARE  DBM010  LITERALLY  ' 9 ';
49  1 =  DECLARE  SGS001  LITERALLY  ' 10 ';
50  1 =  DECLARE  SGS002  LITERALLY  ' 11 ';
51  1 =  DECLARE  SGS003  LITERALLY  ' 12 ';
52  1 =  DECLARE  SGS004  LITERALLY  ' 13 ';
53  1 =  DECLARE  SGS005  LITERALLY  ' 14 ';
54  1 =  DECLARE  SGS006  LITERALLY  ' 15 ';
55  1 =  DECLARE  SGS007  LITERALLY  ' 16 ';
56  1 =  DECLARE  SGS008  LITERALLY  ' 17 ';
```

```
57  1 =     DECLARE  SGS009  LITERALLY  ' 18 ';
58  1 =     DECLARE  SGM001  LITERALLY  ' 10 ';
59  1 =     DECLARE  SGM002  LITERALLY  ' 11 ';
60  1 =     DECLARE  SGM003  LITERALLY  ' 12 ';
61  1 =     DECLARE  SGM004  LITERALLY  ' 13 ';
62  1 =     DECLARE  SGM005  LITERALLY  ' 14 ';
63  1 =     DECLARE  SGM006  LITERALLY  ' 15 ';
64  1 =     DECLARE  SGM007  LITERALLY  ' 16 ';
65  1 =     DECLARE  SGM008  LITERALLY  ' 17 ';
66  1 =     DECLARE  SGM009  LITERALLY  ' 18 ';
           $INCLUDE (:F8:KBINPT.INC)
    =      /****************************************************************/
    =      /*           Screen Processor -- Keyboard Input Codes           */
    =      /****************************************************************/
67  1 =     DECLARE   MU    LITERALLY   '080h';   /*   <Cursor Up>         */
68  1 =     DECLARE   MD    LITERALLY   '081h';   /*   <Cursor Down>       */
69  1 =     DECLARE   MR    LITERALLY   '082h';   /*   <Cursor Right>      */
70  1 =     DECLARE   ML    LITERALLY   '083h';   /*   <Cursor Left>       */
71  1 =     DECLARE   TAB   LITERALLY   '084h';   /*   <Tab>               */
72  1 =     DECLARE   EN    LITERALLY   '085h';   /*   <Enter>             */
73  1 =     DECLARE   RT    LITERALLY   '086h';   /*   <Return>            */
74  1 =     DECLARE   HM    LITERALLY   '087h';   /*   <Home>              */
75  1 =     DECLARE   HLP   LITERALLY   '088h';   /*   <Help>              */
76  1 =     DECLARE   MM    LITERALLY   '089h';   /*   <Main Menu>         */
77  1 =     DECLARE   FMU   LITERALLY   '08Ah';   /*   <Function Menu>     */
78  1 =     DECLARE   F1    LITERALLY   '08Bh';   /*   <Function 1>        */
79  1 =     DECLARE   F2    LITERALLY   '08Ch';   /*   <Function 2>        */
80  1 =     DECLARE   F3    LITERALLY   '08Dh';   /*   <Function 4>        */
81  1 =     DECLARE   F4    LITERALLY   '08Eh';   /*   <Function 4>        */
82  1 =     DECLARE   F5    LITERALLY   '08Fh';   /*   <Function 5>        */
83  1 =     DECLARE   F6    LITERALLY   '090h';   /*   <Function 6>        */
84  1 =     DECLARE   F7    LITERALLY   '091h';   /*   <Function 7>        */
85  1 =     DECLARE   F8    LITERALLY   '092h';   /*   <Function 8>        */
86  1 =     DECLARE   F9    LITERALLY   '093h';   /*   <Function 9>        */
87  1 =     DECLARE   F10   LITERALLY   '094h';   /*   <Function 10>       */
88  1 =     DECLARE   F11   LITERALLY   '095h';   /*   <Function 11>       */
89  1 =     DECLARE   F12   LITERALLY   '096h';   /*   <Function 12>       */
90  1 =     DECLARE   F13   LITERALLY   '097h';   /*   <Function 13>       */
91  1 =     DECLARE   F14   LITERALLY   '098h';   /*   <Function 14>       */
92  1 =     DECLARE   F15   LITERALLY   '099h';   /*   <Function 15>       */
           $INCLUDE (:F8:SCRCC.INC)
    =      /****************************************************************/
    =      /*  SCRCC.INC    Screen Processor -- Screen Control Codes       */
    =      /****************************************************************/
93  1 =     DECLARE   RC    LITERALLY   '080H';   /*   <Repeated Character>    */
94  1 =     DECLARE   RS    LITERALLY   '081H';   /*   <Repeated Space>        */
95  1 =     DECLARE   FD    LITERALLY   '082H';   /*   <Flag Definition>       */
96  1 =     DECLARE   FR    LITERALLY   '083H';   /*   <Flag Reference>        */
97  1 =     DECLARE   CM    LITERALLY   '084H';   /*   <Output All Caps>       */
98  1 =     DECLARE   NA    LITERALLY   '085H';   /*   <No Output All Caps>    */
99  1 =     DECLARE   NO    LITERALLY   '086H';   /*   <No Operation>          */
100 1 =     DECLARE   HT    LITERALLY   '087H';   /*   <Horizontal Tab>        */
101 1 =     DECLARE   VT    LITERALLY   '088H';   /*   <Vertical Tab>          */
102 1 =     DECLARE   VB    LITERALLY   '089H';   /*   <Vertical Tab To Bottom> */
103 1 =     DECLARE   XM    LITERALLY   '08AH';   /*   <Expanded Mode>         */
104 1 =     DECLARE   NX    LITERALLY   '08BH';   /*   <Not Expanded Mode>     */
105 1 =     DECLARE   CS    LITERALLY   '08CH';   /*   <Clear Screen>          */
106 1 =     DECLARE   CP    LITERALLY   '08DH';   /*   <Cursor Position>       */
107 1 =     DECLARE   NL    LITERALLY   '08EH';   /*   <New Line>              */
108 1 =     DECLARE   NI    LITERALLY   '08FH';   /*   <Normal Intensity>      */
109 1 =     DECLARE   HI    LITERALLY   '090H';   /*   <High Intensity>        */
110 1 =     DECLARE   NB    LITERALLY   '091H';   /*   <Blink Off>             */
111 1 =     DECLARE   BL    LITERALLY   '092H';   /*   <Blink On>              */
```

```
112  1 =    DECLARE   NU    LITERALLY   '093H';  /* <No Underscore>              */
113  1 =    DECLARE   UC    LITERALLY   '094H';  /* <Underscore>                 */
114  1 =    DECLARE   AC    LITERALLY   '095H';  /* <Activate Cursor>            */
115  1 =    DECLARE   DC    LITERALLY   '096H';  /* <Deactivate Cursor>          */
116  1 =    DECLARE   NV    LITERALLY   '097H';  /* <Normal Video>               */
117  1 =    DECLARE   RV    LITERALLY   '098H';  /* <Reverse Video>              */
            $INCLUDE (:F8:SCRPRS.INC)
       =    /****************************************************************/
       =    /*   SCRPRS.INC  Screen Processor -- Screen Data Control Codes   */
       =    /****************************************************************/
118  1 =    DECLARE   FE    LITERALLY   '0F7H';  /* <Function Enable>            */
119  1 =    DECLARE   RP    LITERALLY   '0F8H';  /* <Reply Code>                 */
120  1 =    DECLARE   MK    LITERALLY   '0F9H';  /* <Message Constant>           */
121  1 =    DECLARE   SF    LITERALLY   '0FAH';  /* <Screen Reference>           */
122  1 =    DECLARE   SH    LITERALLY   '0FBH';  /* <Short Help Code>            */
123  1 =    DECLARE   FH    LITERALLY   '0FCH';  /* <Full Screen Help Code>      */
124  1 =    DECLARE   NF    LITERALLY   '0FDH';  /* <Numeric Output Format>      */
125  1 =    DECLARE   CF    LITERALLY   '0FEH';  /* <Character Output Format>    */

126  1 =    DECLARE   SE    LITERALLY   '0FFH',  /* <Screen Message End>         */
       =              HE    LITERALLY   '0FFH';  /* <Help Message End>           */

/**************************************************/
            /*** iRMX EXTERNAL PROCEDURE DECLARATIONS     ***/
            /***     (BY WAY OF INCLUDE FILES)            ***/
            /**************************************************/

$INCLUDE(:F3:EEXCEP.LIT)
       =    $save nolist
            $INCLUDE(:F3:HEXCEP.LIT)
       =    $save nolist
            $INCLUDE(:F3:IEXCEP.LIT)
       =    $save nolist
            $INCLUDE(:F3:LTKSEL.LIT)
       =    $SAVE NOLIST
            $INCLUDE(:F3:NEXCEP.LIT)
       =    $save nolist
            $INCLUDE(:F3:UEXCEP.LIT)
       =    /*
       =        This literal file was supplied as ZBRA58.LIT with the
       =        iRMX 86 UPDATE 3, 03/28/85. It replaces the original module
       =        which was missing carraige return characters.
       =    */

=    $save nolist $INCLUDE(:F3:HSNCOR.EXT)
       =    $SAVE NOLIST $INCLUDE(:F3:IAREAD.EXT)
       =    $SAVE NOLIST
            $INCLUDE(:F3:IASPEC.EXT)
       =    $SAVE NOLIST
            $INCLUDE(:F3:IEXIOJ.EXT)
       =    $SAVE NOLIST
            $INCLUDE(:F3:IGTTIM.EXT)
       =    $SAVE NOLIST $INCLUDE(:F3:ILATDV.EXT)
       =    $SAVE NOLIST
            $INCLUDE(:F3:ILDTDV.EXT)
       =    $SAVE NOLIST
```

```
           $INCLUDE(:F3:ISATFL.EXT)
    =      $SAVE NOLIST
           $INCLUDE(:F3:ISCLOS.EXT)
    =      $SAVE NOLIST
           $INCLUDE(:F3:ISCRFL.EXT)
    =      $SAVE NOLIST
           $INCLUDE(:F3:ISDLCN.EXT)
    =      $SAVE NOLIST
           $INCLUDE(:F3:ISLUCN.EXT)
    =      $SAVE NOLIST
           $INCLUDE(:F3:ISOPEN.EXT)
    =      $SAVE NOLIST
           $INCLUDE(:F3:ISRDMV.EXT)
    =      $SAVE NOLIST
           $INCLUDE(:F3:ISSEEK.EXT)
    =      $SAVE NOLIST
           $INCLUDE(:F3:ISSPEC.EXT)
    =      $SAVE NOLIST
           $INCLUDE(:F3:ISWRMV.EXT)
    =      $SAVE NOLIST
           $INCLUDE(:F3:IWTIO.EXT)
    =      $SAVE NOLIST $INCLUDE(:F3:NCRMBX.EXT)
    =      $SAVE NOLIST
           $INCLUDE(:F3:NCRSEG.EXT)
    =      $SAVE NOLIST
           $INCLUDE(:F3:NCRTSK.EXT)
    =      $SAVE NOLIST
           $INCLUDE(:F3:NDLMBX.EXT)
    =      $SAVE NOLIST
           $INCLUDE(:F3:NDLSEG.EXT)
    =      $SAVE NOLIST
           $INCLUDE(:F3:NDLTSK.EXT)
    =      $SAVE NOLIST
           $INCLUDE(:F3:NGTEXH.EXT)
    =      $SAVE NOLIST
           $INCLUDE(:F3:NRCMES.EXT)
    =      $SAVE NOLIST
           $INCLUDE(:F3:NSLEEP.EXT)
    =      $SAVE NOLIST
           $INCLUDE(:F3:NSNMES.EXT)
    =      $SAVE NOLIST
           $INCLUDE(:F3:NSTEXH.EXT)
    =      $SAVE NOLIST $INCLUDE(:F3:UDCTIM.EXT)
    =      $SAVE NOLIST

/****************************************/
           /*** VT220 ARRAY DECLARATIONS        ***/
           /****************************************/

229  1     DECLARE Reverse_Vid(*) BYTE DATA(01BH,'[7m');

230  1     DECLARE Normal_Vid(*) BYTE DATA(01BH,'[0;27m');

231  1     DECLARE High_Intensity(*) BYTE DATA(01BH,'[1m');

232  1     DECLARE Low_Intensity(*) BYTE DATA(01BH,'[0;22m');

233  1     DECLARE Cursor_Pos STRUCTURE
                   (CSI WORD,
```

```
                    Bracket BYTE,
                    Row BYTE,
                    Semi_Colon BYTE,
                    Column BYTE,
                    Terminator BYTE);

/********************************/
            /*** ARRAY DECLARATIONS      ***/
            /********************************/

234   1     DECLARE Begin_Console_Msg(*) BYTE DATA(
            01BH,'[7;4m','                        ',01BH,'[0;27;24m',
            ' DETECT PROGRAM: "DETECT" <-> REV. 1.0 ',
            01BH,'[7;4m','                        ',01BH,'[0;27;24m',0DH,0AH);

235   1     DECLARE Begin_Printer_Msg(*) BYTE DATA(
            '====================
              DETECT PROGRAM: "DETECT" <-> REV. 1.0 ====================',0DH,0AH);

236   1     DECLARE Chnl_Width_Line(80) BYTE;

237   1     DECLARE Date_Peak_Line(80) BYTE;

238   1     DECLARE DB_Line(*) BYTE DATA(
            '            ----- DATA BASE: "AUTOSIG" <-> REV. 1.0 -----',0DH,0AH);

239   1     DECLARE Desc_Msg(268) BYTE;

240   1     DECLARE Fade_Buf(91) BYTE;

241   1     DECLARE ID_Line(91) BYTE;

242   1     DECLARE Prtr_ID_Line(80) BYTE;

/********************************/
            /*** LITERAL DECLARATIONS    ***/
            /********************************/

243   1     DECLARE Forever LITERALLY 'WHILE 1';

/********************************/
            /*** TOKEN DECLARATIONS      ***/
            /********************************/

244   1     DECLARE Chnl1_Mbx_Tkn TOKEN;  /*** TOKEN RETURNED FROM "CREATE$MBOX" ***/
245   1     DECLARE Chnl2_Mbx_Tkn TOKEN;  /*** TOKEN RETURNED FROM "CREATE$MBOX" ***/
246   1     DECLARE Dummy_Tkn TOKEN;      /*** TOKEN RETURNED FROM "ATTACH$FILE" ***/
247   1     DECLARE File_Conn TOKEN;      /*** TOKEN RETURNED FROM "ATTACH$FILE" (DESCDB FILE) ***
                    */
248   1     DECLARE Lprt_Conn TOKEN;      /*** TOKEN RETURNED FROM "ATTACH$FILE" (LINE PRT) ***/
249   1     DECLARE Prt1_Task_Tkn TOKEN;  /*** TOKEN RETURNED FROM "CREATE$TASK" IN "RECEIVE_DATA"
                    . ***/
250   1     DECLARE Prt2_Task_Tkn TOKEN;  /*** TOKEN RETURNED FROM "CREATE$TASK" IN "RECEIVE_DATA"
                    . ***/
251   1     DECLARE Resp_Mbx_Tkn TOKEN;   /*** TOKEN RETURNED FROM "CREATE$MBOX ***/
252   1     DECLARE Seg1_Tkn TOKEN,       /*** TOKEN RETURNED FROM "CREATE$SEGMENT" ***/
                    Msg1_Buf BASED Seg1_Tkn(13) BYTE;  /*** MSG SENT TO "PRINT_HIT" ***/
253   1     DECLARE Seg2_Tkn TOKEN,       /*** TOKEN RETURNED FROM "CREATE$SEGMENT" ***/
                    Msg2_Buf BASED Seg2_Tkn(13) BYTE;  /*** MSG SENT TO "PRINT_HIT" ***/
254   1     DECLARE T1_Conn TOKEN;        /*** TOKEN RETURNED FROM "ATTACH$FILE" ***/
255   1     DECLARE T2_Conn TOKEN;        /*** TOKEN RETURNED FROM "ATTACH$FILE" ***/

/********************************/
```

```
                    /*** VARIABLE DECLARATIONS    ***/
                    /*********************************/

256   1    DECLARE Already_Read WORD;  /*** FOR "$READ"...BYTES READ IN LOOP ***/
257   1    DECLARE Bytes_Read WORD;  /*** RETURNED FROM "...S$READ$MOVE" - # OF BYTES READ ***/
258   1    DECLARE Bytes_Written WORD;  /*** RETURNED FROM "...S$WRITE$MOVE" - # OF BYTES WRITTEN
              . ***/
259   1    DECLARE Channel_Num WORD;
260   1    DECLARE Chnl1_Last_Fade DWORD;  /*** CONTAINS TIME OF LAST Fade ON THIS CHNL ***/
261   1    DECLARE Chnl2_Last_Fade DWORD;  /*** CONTAINS TIME OF LAST Fade ON THIS CHNL ***/
262   1    DECLARE Chnl1_Last_Hit DWORD;  /*** CONTAINS TIME OF LAST HIT ON THIS CHNL ***/
263   1    DECLARE Chnl2_Last_Hit DWORD;  /*** CONTAINS TIME OF LAST HIT ON THIS CHNL ***/
264   1    DECLARE Chnl1_Last_ID DWORD;  /*** CONTAINS LAST ID ON THIS CHNL ***/
265   1    DECLARE Chnl2_Last_ID DWORD;  /*** CONTAINS LAST ID ON THIS CHNL ***/
266   1    DECLARE Continue BYTE;  /*** FLAG VARIABLE ***/
267   1    DECLARE Cor1_Peak BYTE;
268   1    DECLARE Cor2_Peak BYTE;
269   1    DECLARE Cor1_Frame WORD;
270   1    DECLARE Cor2_Frame WORD;
271   1    DECLARE Cor1_Width BYTE;
272   1    DECLARE Cor2_Width BYTE;
273   1    DECLARE Counter WORD;
274   1    DECLARE Create_Status WORD;  /*** STATUS RETURNED FROM "CREATE$TASK" ***/
275   1    DECLARE Dword_Var DWORD;  /*** USED WITH "LPRINT" TO PRINT OUT VAR VALUE ***/
           /***********************************************************************/
           /*** NUMBER OF RECS IN "DESCDB" FILE - DOUBLE CURRENT VALUE OF * 100 *,,,,***/
           /*** ...IF MSG APPEARS ON SCREEN DURING ATTEMPT TO ADD A REC TO DATA BASE ***/
           /*** ...(CHANGE HERE AND IN "DESCDB.SRC")                         ***/
           /***********************************************************************/
276   1    DECLARE Err_Msg(80) BYTE;
277   1    DECLARE File_Size LITERALLY '100';  /*** <=== SEE ABOVE MSG ***/
278   1    DECLARE First_Detect BYTE;  /*** FLAG FOR INITIALIZATION ***/
279   1    DECLARE First_Fade BYTE;  /*** FLAG FOR INITIALIZATION ***/
280   1    DECLARE First_Frame_On_1 WORD;
281   1    DECLARE First_Frame_On_2 WORD;
282   1    DECLARE Last_Frame_Num WORD;  /*** LAST FRAME OF COMM IN WHICH SIGNATURE RESIDES ***/
283   1    DECLARE Left_To_Read WORD;  /*** FOR "$READ"...BYTES LEFT TO READ (IN LOOP) ***/
284   1    DECLARE Null_Ptr POINTER;  /*** SET TO "0" FOR SYSTEM CALLS ***/
285   1    DECLARE Null_Tkn TOKEN;  /*** SET TO "0" FOR "PHYSICAL$DETACH" BIOS CALL ***/
286   1    DECLARE Num_Recs WORD;  /*** # OF RECS IN FILE "DESCDB" ***/
287   1    DECLARE Peak1_Time DWORD;
288   1    DECLARE Peak2_Time DWORD;
289   1    DECLARE Prt_Byte(5) BYTE;  /*** "CHNL NUM" CONVERTED TO ASCII FOR PRINTING ***/
290   1    DECLARE Prt_ID(9) BYTE;  /*** "SENT_ID" CONVERTED TO ASCII FOR PRINTING ***/
291   1    DECLARE Prt_Last_Fade(8) BYTE;  /*** ASCII OF SECONDS SINCE LAST "FADE" DETECT ***/
292   1    DECLARE Prtr_Response(2) BYTE;  /*** CONTAINS REPSONSE TO "CO$SEND" ***/
293   1    DECLARE Same_Comm BYTE;  /*** FLAG INDICATING SAME COMMERCIAL DETECTED ***/
294   1    DECLARE Scr_Peak BYTE;
295   1    DECLARE Scr_Time DWORD;
296   1    DECLARE Scr_Width BYTE;
297   1    DECLARE Send_To_Printer BYTE;  /*** INDICATES DATA SHOULD GO TO LINE PRINTER ***/
298   1    DECLARE Since_Last_Chnl1_Fade DWORD;  /*** # OF SECONDS SINCE LAST "FADE" DETECTED ***
              ./
299   1    DECLARE Since_Last_Chnl2_Fade DWORD;  /*** # OF SECONDS SINCE LAST "FADE" DETECTED ***
              ./
300   1    DECLARE Status WORD;     /*** VALUE RETURNED FROM SYSTEM CALLS ***/
301   1    DECLARE Stay_In_Loop BYTE;  /*** "DO-WHILE" FLAG ***/

/*********************************/
           /*** STRUCTURE DECLARATIONS   ***/
           /*********************************/

302   1    DECLARE Descdb_File(File_Size) STRUCTURE
                   (Comm_ID DWORD,
```

Ascii_Desc(200) BYTE);

303   1   DECLARE New_X_Handler STRUCTURE
              (X_Offset WORD,
               X_Base WORD,
               X_Mode BYTE);

304   1   DECLARE Old_X_Handler STRUCTURE
              (X_Offset WORD,
               X_Base WORD,
               X_Mode BYTE);

305   1   DECLARE Receive_Buf STRUCTURE
              (Check_Bytes(4) BYTE,
               Sent_Time DWORD,
               Sent_ID DWORD,
               Channel_Num BYTE,
               Correlate_Bits BYTE,
               Frame WORD);

306   1   DECLARE Terminal_Param STRUCTURE
              (Number_Param WORD,
               Number_Used WORD,
               Connection_Flags WORD,
               Terminal_Flags WORD,
               In_Baud_Rate WORD,
               Out_Baud_Rate WORD,
               Scroll_Lines WORD);

307   1   DECLARE Time STRUCTURE
              (Actual_Time DWORD,
               Date(8) BYTE,
               Time(8) BYTE);

/***************************************/
          /* EXTERNAL PROCEDURE DECLARATIONS */
          /***************************************/

/************************************************************/
          /*                                                          */
          /*              BINARY TO ASCII   WORD                      */
          /*                                                          */
          /* This procedure (BYTE_ASCII) written by Steve Sletten     */
          /************************************************************/
308   1   Byte_Ascii:
             PROCEDURE (Value,String_Ptr,String_Cnt,Ierr_Ptr) EXTERNAL;

309   2   DECLARE Value BYTE;
310   2   DECLARE String_Ptr POINTER;
311   2   DECLARE String_Cnt WORD;
312   2   DECLARE Ierr_Ptr POINTER;

313   2   END Byte_Ascii;

/************************************************************/
          /*                                                          */
          /*              BINARY TO ASCII   WORD                      */
          /*                                                          */
          /* This procedure (BINARY2_ASCII) written by Steve Sletten  */
          /************************************************************/
314   1   binary2_ascii: PROCEDURE(value,string_ptr,ierr_ptr) EXTERNAL;

315   2   DECLARE
             string_ptr        POINTER,

```
                    ierr_ptr          POINTER,
                    value             WORD;

316   2     END binary2_ascii;

/************************************************************/
            /*                                                          */
            /*              BINARY TO ASCII DWORD                       */
            /*                                                          */
            /* This procedure (BINARY4_ASCII) written by Steve Sletten  */
            /************************************************************/
317   1     binary4_ascii: PROCEDURE(value,string_ptr,ierr_ptr) EXTERNAL;
318   2     DECLARE
                    string_ptr        POINTER,
                    ierr_ptr          POINTER,
                    value             DWORD;

319   2     END Binary4_Ascii;

/*******************************/
            /*** PROCEDURE DECLARATIONS ***/
            /*******************************/

320   1     Check_Data:
                PROCEDURE;

321   2     Continue = 1;

/************************************************************/
            /*** CHECK THAT NO OTHER COMM HAS BEEN DETECTED IN LAST 30 SECONDS ***/
            /************************************************************/

322   2     IF (Receive_Buf.Sent_ID <> 0FFFFFFFFH) THEN
323   2       DO;  /*** BEGIN 1ST "IF-THEN" ***/
324   3         IF (First_Detect = 1) THEN
325   3           DO;  /*** BEGIN 2ND "IF-THEN" ***/
326   4             First_Detect = 0;
327   4             Chnl1_Last_Hit = Receive_Buf.Sent_Time - 5;
328   4             Chnl2_Last_Hit = Receive_Buf.Sent_Time - 5;
329   4           END; /*** END 2ND "IF-THEN" ***/
330   3         IF (Continue = 1) THEN
331   3           DO;  /*** BEGIN 2ND "IF-THEN" ***/
332   4             IF (Receive_Buf.Channel_Num = 1) THEN
333   4               DO;  /*** BEGIN 3RD "IF-THEN" ***/
334   5                 IF (Chnl1_Last_Hit > Receive_Buf.Sent_Time - 5) THEN
        /***==> FOR "NO PRINT" OF SAME ID <==  (Chnl1_Last_ID = Receive_Buf.Sent_ID) AND    *
                .**/
335   5                   DO;  /*** BEGIN 4TH "IF-THEN" - 2ND DETECT IN 5 SECS OR LESS ***/
336   6                     Cor1_Frame = Receive_Buf.Frame - First_Frame_On_1;
337   6                     Cor1_Width = Cor1_Width + 1;
338   6                     IF (Receive_Buf.Correlate_Bits > Cor1_Peak) THEN
339   6                       DO;  /*** BEGIN 5TH "IF-THEN" ***/
340   7                         Cor1_Peak = Receive_Buf.Correlate_Bits;
341   7                         Peak1_Time = Receive_Buf.Sent_Time;
342   7                       END; /*** END 5TH "IF-THEN" ***/
343   6                     Seg1_Tkn = RQ$CREATE$SEGMENT(16,@Status);
344   6                     CALL Movb(@Peak1_Time,@Msg1_Buf(0),4);
345   6                     CALL Movb(@Receive_Buf.Sent_ID,@Msg1_Buf(4),5);
346   6                     CALL Movb(@Cor1_Peak,@Msg1_Buf(9),1);
347   6                     CALL Movb(@Cor1_Width,@Msg1_Buf(10),1);
348   6                     CALL Movb(@Cor1_Frame,@Msg1_Buf(11),2);
```

```
/************************************/
/***   SEND DATA TO "PRINT1_HIT" ***/
/************************************/

349  6              CALL RQ$SEND$MESSAGE(Chnl1_Mbx_Tkn,Seg1_Tkn,0,@Status);
350  6              IF (Status <> E$OK) THEN
351  6                DO;   /*** BEGIN 3rd "IF-THEN" ***/
352  7                  Continue = 0;
353  7                  Dword_Var = DOUBLE(Status);
354  7                  CALL Movb(@('Status from SEND$MSG(CHNL 1[IF]) = '),@Err_Msg,31);
355  7                  Bytes_Written = RQ$S$WRITE$MOVE(Lprt_Conn,@Err_Msg,80,@Status);
356  7                  CALL Setb(' ',@Err_Msg,78);
357  7                END;  /*** END 3rd "IF-THEN" ***/
358  6              Chnl1_Last_Hit = Receive_Buf.Sent_Time;
359  6              Chnl1_Last_ID = Receive_Buf.Sent_ID;
360  6            END;  /*** END 4TH "IF-THEN" ***/
361  5          ELSE
               DO;  /*** BEGIN 4TH "ELSE" ***/
362  6            First_Frame_On_1 = Receive_Buf.Frame;
363  6            Cor1_Peak = Receive_Buf.Correlate_Bits;
364  6            Cor1_Frame = 0;
365  6            Peak1_Time = Receive_Buf.Sent_Time;
366  6            Cor1_Width = 1;
367  6            Seg1_Tkn = RQ$CREATE$SEGMENT(16,@Status);
368  6            CALL Movb(@Peak1_Time,@Msg1_Buf(0),4);
369  6            CALL Movb(@Receive_Buf.Sent_ID,@Msg1_Buf(4),5);
370  6            CALL Movb(@Cor1_Peak,@Msg1_Buf(9),1);
371  6            CALL Movb(@Cor1_Width,@Msg1_Buf(10),1);
372  6            CALL Movb(@Cor1_Frame,@Msg1_Buf(11),2);

/************************************/
/***   SEND DATA TO "PRINT1_HIT" ***/
/************************************/

373  6              CALL RQ$SEND$MESSAGE(Chnl1_Mbx_Tkn,Seg1_Tkn,0,@Status);
374  6              IF (Status <> E$OK) THEN
375  6                DO;   /*** BEGIN 3rd "IF-THEN" ***/
376  7                  Continue = 0;
377  7                  Dword_Var = DOUBLE(Status);
378  7                  CALL Movb(@('Status from SEND$MSG(CHNL 1[ELSE]) = '),@Err_Msg,31);
379  7                  Bytes_Written = RQ$S$WRITE$MOVE(Lprt_Conn,@Err_Msg,80,@Status);
380  7                  CALL Setb(' ',@Err_Msg,78);
381  7                END;  /*** END 3rd "IF-THEN" ***/
382  6              Chnl1_Last_Hit = Receive_Buf.Sent_Time;
383  6              Chnl1_Last_ID = Receive_Buf.Sent_ID;
384  6            END;  /*** END 4TH "ELSE" ***/
385  5          END;  /*** END 3RD "IF-THEN" ***/
386  4        ELSE IF (Receive_Buf.Channel_Num = 2) THEN
387  4          DO;  /*** BEGIN 3RD "IF-THEN" ***/
388  5            IF (Chnl2_Last_Hit > Receive_Buf.Sent_Time - 5) THEN
         /***==> FOR "NO PRINT" OF SAME ID <==   (Chnl2_Last_ID = Receive_Buf.Sent_ID) AND   *
                 .**/
389  5              DO;  /*** BEGIN 4TH "IF-THEN" ***/
390  6                Cor2_Frame = Receive_Buf.Frame - First_Frame_On_2;
391  6                Cor2_Width = Cor2_Width + 1;
392  6                IF (Receive_Buf.Correlate_Bits > Cor2_Peak) THEN
393  6                  DO;  /*** BEGIN 5TH "IF-THEN" ***/
394  7                    Cor2_Peak = Receive_Buf.Correlate_Bits;
395  7                    Peak2_Time = Receive_Buf.Sent_Time;
396  7                  END;  /*** END 5TH "IF-THEN" ***/
397  6                Seg2_Tkn = RQ$CREATE$SEGMENT(16,@Status);
398  6                CALL Movb(@Peak2_Time,@Msg2_Buf(0),4);
399  6                CALL Movb(@Receive_Buf.Sent_ID,@Msg2_Buf(4),5);
```

```
400    6                         CALL Movb(@Cor2_Peak,@Msg2_Buf(9),1);
401    6                         CALL Movb(@Cor2_Width,@Msg2_Buf(10),1);
402    6                         CALL Movb(@Cor2_Frame,@Msg2_Buf(11),2);

/************************************/
                     /***   SEND DATA TO "PRINT2_HIT" ***/
                     /************************************/

403    6                         CALL RQ$SEND$MESSAGE(Chnl2_Mbx_Tkn,Seg2_Tkn,0,@Status);
404    6                         IF (Status <> E$OK) THEN
405    6                           DO;    /*** BEGIN 3rd "IF-THEN" ***/
406    7                             Continue = 0;
407    7                             Dword_Var = DOUBLE(Status);
408    7                             CALL Movb(@('Status from SEND$MSG(CHNL 2[IF]) = '),@Err_Msg,31);
409    7                             Bytes_Written = RQ$S$WRITE$MOVE(Lprt_Conn,@Err_Msg,80,@Status);
410    7                             CALL Setb(' ',@Err_Msg,78);
411    7                           END;    /*** END 3rd "IF-THEN" ***/
412    6                         Chnl2_Last_Hit = Receive_Buf.Sent_Time;
413    6                         Chnl2_Last_ID = Receive_Buf.Sent_ID;
414    6                       END;    /*** END 4TH "IF-THEN" ***/
415    5                     ELSE
                               DO;    /*** BEGIN 4TH "ELSE" ***/
416    6                         First_Frame_On_2 = Receive_Buf.Frame;
417    6                         Cor2_Peak = Receive_Buf.Correlate_Bits;
418    6                         Peak2_Time = Receive_Buf.Sent_Time;
419    6                         Cor2_Frame = 0;
420    6                         Cor2_Width = 1;
421    6                         Seg2_Tkn = RQ$CREATE$SEGMENT(16,@Status);
422    6                         CALL Movb(@Peak2_Time,@Msg2_Buf(0),4);
423    6                         CALL Movb(@Receive_Buf.Sent_ID,@Msg2_Buf(4),5);
424    6                         CALL Movb(@Cor2_Peak,@Msg2_Buf(9),1);
425    6                         CALL Movb(@Cor2_Width,@Msg2_Buf(10),1);
426    6                         CALL Movb(@Cor2_Frame,@Msg2_Buf(11),2);

/************************************/
                     /***   SEND DATA TO "PRINT2_HIT" ***/
                     /************************************/

427    6                         CALL RQ$SEND$MESSAGE(Chnl2_Mbx_Tkn,Seg2_Tkn,0,@Status);
428    6                         IF (Status <> E$OK) THEN
429    6                           DO;    /*** BEGIN 3rd "IF-THEN" ***/
430    7                             Continue = 0;
431    7                             Dword_Var = DOUBLE(Status);
432    7                             CALL Movb(@('Status from SEND$MSG(CHNL 2[ELSE]) = '),@Err_Msg,31);
433    7                             Bytes_Written = RQ$S$WRITE$MOVE(Lprt_Conn,@Err_Msg,80,@Status);
434    7                             CALL Setb(' ',@Err_Msg,78);
435    7                           END;    /*** END 3rd "IF-THEN" ***/
436    6                         Chnl2_Last_Hit = Receive_Buf.Sent_Time;
437    6                         Chnl2_Last_ID = Receive_Buf.Sent_ID;
438    6                       END;    /*** END 4TH "ELSE" ***/
439    5                     END;    /*** END 3RD "IF-THEN" ***/
440    4                   ELSE
                             DO;    /*** BEGIN 3RD "ELSE" ***/
441    5                       Continue = 0;
442    5                       CALL Movb(@('Invalid channel number sent.'),@Err_Msg,28);
443    5                       Bytes_Written = RQ$S$WRITE$MOVE(Lprt_Conn,@Err_Msg,80,@Status);
444    5                       CALL Setb(' ',@Err_Msg,78);
445    5                     END;    /*** END 3RD "ELSE" ***/
446    4                 END;    /*** END 2ND "IF-THEN" ***/
447    3             END;    /*** END 1ST "IF-THEN" ***/
448    2           ELSE
                     DO;    /*** BEGIN 1ST "ELSE" ***/
449    3             IF (First_Fade = 1) THEN
```

```
450  3          DO;  /*** BEGIN 2ND "IF-THEN" ***/
451  4             First_Fade = 0;
452  4             Chnl1_Last_Fade = Receive_Buf.Sent_Time;
453  4             Chnl2_Last_Fade = Receive_Buf.Sent_Time;
454  4          END;  /*** END 2ND "IF-THEN" ***/
455  3          IF (Continue = 1) THEN
456  3             DO;  /*** BEGIN 2ND "IF-THEN" ***/
457  4                IF (Receive_Buf.Channel_Num = 1) THEN
458  4                   DO;  /*** BEGIN 3RD "IF-THEN" ***/
459  5                      Since_Last_Chnl1_Fade = Receive_Buf.Sent_Time - Chnl1_Last_Fade;
460  5                      IF (Chnl1_Last_Fade >= Receive_Buf.Sent_Time - 5) THEN
461  5                         DO;  /*** BEGIN 4TH "IF-THEN" ***/
462  6                            Chnl1_Last_Fade = Receive_Buf.Sent_Time;
                       /***     Continue = 0;    ***/
463  6                         END;  /*** END 4TH "IF-THEN" ***/
464  5                      ELSE
                            DO;  /*** BEGIN 4TH "ELSE" ***/
465  6                         Chnl1_Last_Fade = Receive_Buf.Sent_Time;
466  6                         END;  /*** END 4TH "ELSE" ***/
467  5                   END;  /*** END 3RD "IF-THEN" ***/
468  4                ELSE IF (Receive_Buf.Channel_Num = 2) THEN
469  4                   DO;  /*** BEGIN 3RD "IF-THEN" ***/
470  5                      Since_Last_Chnl2_Fade = Receive_Buf.Sent_Time - Chnl2_Last_Fade;
471  5                      IF (Chnl2_Last_Fade >= Receive_Buf.Sent_Time - 5) THEN
472  5                         DO;  /*** BEGIN 4TH "IF-THEN" ***/
473  6                            Chnl2_Last_Fade = Receive_Buf.Sent_Time;
                       /***     Continue = 0;    ***/
474  6                         END;  /*** END 4TH "IF-THEN" ***/
475  5                      ELSE
                            DO;  /*** BEGIN 4TH "ELSE" ***/
476  6                         Chnl2_Last_Fade = Receive_Buf.Sent_Time;
477  6                         END;  /*** END 4TH "ELSE" ***/
478  5                   END;  /*** END 3RD "IF-THEN" ***/
479  4                ELSE
                      DO;  /*** BEGIN 3RD "ELSE" ***/
480  5                   Continue = 0;
481  5                   CALL Movb(@('Invalid channel number sent(FADE TO BLACK).'),@Err_Msg,43);
482  5                   Bytes_Written = RQ$S$WRITE$MOVE(Lprt_Conn,@Err_Msg,80,@Status);
483  5                   CALL Setb(' ',@Err_Msg,78);
484  5                END;  /*** END 3RD "ELSE" ***/
485  4             END;  /*** END 2ND "IF-THEN" ***/
486  3          END;  /*** END 1ST "ELSE" ***/

487  2       END Check_Data;

/*.................................................................*/
             /*                                                                 */
             /*                     CLEAR INPUT BUFFER                          */
             /*                                                                 */
             /*.................................................................*/
488  1       Clear_Buff:
                PROCEDURE;

/* set to transparent mode */

489  2       Terminal_Param.Number_Param = 5;
490  2       Terminal_Param.Number_Used = 4;
491  2       Terminal_Param.Connection_Flags = 0FFH;
492  2       Terminal_Param.Terminal_Flags = 110H;
493  2       Terminal_Param.In_Baud_Rate = 4800;
494  2       Terminal_Param.Out_Baud_Rate = 1;
495  2       Terminal_Param.Scroll_Lines = 24;
496  2       CALL RQ$S$SPECIAL(T2_Conn,5,@Terminal_Param,Null_Ptr,@Status);
```

```
            /* CLEAR INPUT BUFFER */

497  2    Bytes_Read = RQ$S$READ$MOVE(T2_Conn,
                            @Receive_Buf.Check_Bytes(0),
                            1,
                            @Status);
498  2    IF (Status <> E$OK) THEN
499  2      DO;   /*** BEGIN 2ND "IF-THEN" ***/
500  3        Continue = 0;
501  3        Dword_Var = DOUBLE(Status);
502  3        CALL Movb(@('Status from 1-byte READ$MOVE = '),@Err_Msg,31);
503  3        Bytes_Written = RQ$S$WRITE$MOVE(Lprt_Conn,@Err_Msg,80,@Status);
504  3        CALL Setb(' ',@Err_Msg,78);
505  3      END;  /*** END 2ND "IF-THEN" ***/
506  2    DO WHILE (Bytes_Read <> 0);  /*** BEGIN 3RD "DO-WHILE" ***/
507  3      Bytes_Read = RQ$S$READ$MOVE(T2_Conn,
                            @Receive_Buf.Check_Bytes(0),
                            1,
                            @Status);
508  3      IF (Status <> E$OK) THEN
509  3        DO;   /*** BEGIN 2ND "IF-THEN" ***/
510  4          Continue = 0;
511  4          Dword_Var = DOUBLE(Status);
512  4          CALL Movb(@('Status from 1-byte READ$MOVE = '),@Err_Msg,31);
513  4          Bytes_Written = RQ$S$WRITE$MOVE(Lprt_Conn,@Err_Msg,80,@Status);
514  4          CALL Setb(' ',@Err_Msg,78);
515  4        END;  /*** END 2ND "IF-THEN" ***/
516  3    END;  /*** END "DO-WHILE" ***/

/* reset to flush mode */

517  2    Terminal_Param.Number_Param = 5;
518  2    Terminal_Param.Number_Used = 4;
519  2    Terminal_Param.Connection_Flags = 0FDH;
520  2    Terminal_Param.Terminal_Flags = 110H;
521  2    Terminal_Param.In_Baud_Rate = 4800;
522  2    Terminal_Param.Out_Baud_Rate = 1;
523  2    Terminal_Param.Scroll_Lines = 24;
524  2    CALL RQ$S$SPECIAL(T2_Conn,5,@terminal_param,Null_Ptr,@Status);

525  2    END Clear_Buff;

526  1    Close_File:
              PROCEDURE;

/*************************/
          /*** BEGIN PROCESSING ***/
          /*************************/

/********************************************************************/
          /*** CLOSE "DESCDB" FILE                                         ***/
          /********************************************************************/

527  2    CALL RQ$S$CLOSE(File_Conn,@Status);
528  2    IF (Status <> E$OK) THEN
529  2      DO;   /*** BEGIN 2ND "IF-THEN" ***/
530  3        Dword_Var = DOUBLE(Status);
531  3        CALL Movb(@('Status from $CLOSE = '),@Err_Msg,21);
532  3        Bytes_Written = RQ$S$WRITE$MOVE(Lprt_Conn,@Err_Msg,80,@Status);
533  3        CALL Setb(' ',@Err_Msg,78);
534  3      END;  /*** END 2ND "IF-THEN" ***/

535  2    END Close_File;
```

```
536  1    Get_File:
            PROCEDURE;

/*************************/
          /*** BEGIN PROCESSING ***/
          /*************************/

/**********************************************/
          /*** ATTACH TO FILE "DESCDB"              ***/
          /**********************************************/

537  2    Continue = 1;

/*****************************************************************************/
          /*** TURN OFF EXCEPTION HANDLER SO "NO FILE EXISTS" ERR CAN BE HANDLED ***/
          /*****************************************************************************/

538  2    New_X_Handler.X_Offset = 0;
539  2    New_X_Handler.X_Base = 0;
540  2    New_X_Handler.X_Mode = 0;

541  2    CALL RQ$GET$EXCEPTION$HANDLER(@Old_X_Handler,@Status);
542  2    CALL RQ$SET$EXCEPTION$HANDLER(@New_X_Handler,@Status);

543  2    File_Conn = RQ$S$ATTACH$FILE(@(12,':HOME:Descdb'),@Status);
544  2    IF (Status = E$FNEXIST) THEN
545  2      DO; /*** BEGIN 1ST "IF-THEN" ***/
546  3        CALL Movb(@('File DESCDB does not presently exist...'),@Err_Msg,39);
547  3        Bytes_Written = RQ$S$WRITE$MOVE(Lprt_Conn,@Err_Msg,80,@Status);
548  3        CALL Setb(' ',@Err_Msg,78);
549  3        Continue = 0;
550  3      END; /*** END 1ST "IF-THEN" ***/
551  2    ELSE IF (Status <> E$OK) THEN
552  2      DO; /*** BEGIN 1ST "ELSEIF" ***/
553  3        Dword_Var = DOUBLE(Status);
554  3        CALL Movb(@('Status from ATTACH$FILE = '),@Err_Msg,26);
555  3        Bytes_Written = RQ$S$WRITE$MOVE(Lprt_Conn,@Err_Msg,80,@Status);
556  3        CALL Setb(' ',@Err_Msg,78);
557  3        Continue = 0;
558  3      END; /*** END 1ST "ELSEIF" ***/

559  2    CALL RQ$SET$EXCEPTION$HANDLER(@Old_X_Handler,@Status);

/*****************************************************************************/
          /*** OPEN FILE ("Descdb")                                               ***/
          /*****************************************************************************/

560  2    IF (Continue = 1) THEN
561  2      DO; /*** BEGIN 1ST "IF-THEN" ***/
562  3        CALL RQ$S$OPEN(File_Conn,
                              1H,        /*** READ ONLY ***/
                              2,         /*** NUMBER OF BUFFERS ***/
                              @Status);
563  3        IF (Status <> E$OK) THEN
564  3          DO; /*** BEGIN 2ND "IF-THEN" ***/
565  4            Dword_Var = DOUBLE(Status);
566  4            CALL Movb(@('Status from $OPEN = '),@Err_Msg,20);
567  4            Bytes_Written = RQ$S$WRITE$MOVE(Lprt_Conn,@Err_Msg,80,@Status);
568  4            CALL Setb(' ',@Err_Msg,78);
569  4            Continue = 0;
570  4          END; /*** END 2ND "IF-THEN" ***/
571  3        END; /*** END 1ST "IF-THEN" ***/
```

```
/*************************************************************************/
/*** READ 1ST RECORD INTO "DESCDB_FILE(0)" TO GET NUMBER OF RECORDS    ***/
/*************************************************************************/

572  2      IF (Continue = 1) THEN
573  2        DO;  /*** BEGIN 1ST "IF-THEN" ***/
574  3          Bytes_Read = RQ$S$READ$MOVE(File_Conn,
                                @Descdb_File(0),
                                204,           /*** SIZE OF 1st REC in "DESCDB" FILE ***/
                                @Status);
575  3          IF (Status <> E$OK) THEN
576  3            DO;  /*** BEGIN 2ND "IF-THEN" ***/
577  4              Continue = 0;
578  4              Dword_Var = DOUBLE(Status);
579  4              CALL Movb(@('Status from READ$MOVE = '),@Err_Msg,24);
580  4              Bytes_Written = RQ$S$WRITE$MOVE(Lprt_Conn,@Err_Msg,80,@Status);
581  4              CALL Setb(' ',@Err_Msg,78);
582  4            END;  /*** END 2ND "IF-THEN" ***/
583  3          ELSE
                  DO;  /*** BEGIN 2ND "ELSE" ***/
584  4              Num_Recs = Descdb_File(0).Comm_ID;
585  4            END;  /*** END 2ND "ELSE" ***/

/*************************************************************************/
/*** READ ALL EXCEPT 1ST RECORD OF "DESCDB" FILE INTO "DESCDB_FILE" STRUCTURE ***/
/*************************************************************************/

586  3          IF (Num_Recs > 1) THEN
587  3            DO;  /*** BEGIN 2ND "IF" ***/
588  4              Bytes_Read = RQ$S$READ$MOVE(File_Conn,
                                  @Descdb_File(1),
                                  ((Num_Recs - 1) * 204),  /*** BYTES IN "DESCDB" - 1 REC ***/
                                  @Status);
589  4              IF (Status <> E$OK) THEN
590  4                DO;  /*** BEGIN 3RD "IF-THEN" ***/
591  5                  Dword_Var = DOUBLE(Status);
592  5                  CALL Movb(@('Status from 2nd READ$MOVE = '),@Err_Msg,28);
593  5                  Bytes_Written = RQ$S$WRITE$MOVE(Lprt_Conn,@Err_Msg,80,@Status);
594  5                  CALL Setb(' ',@Err_Msg,78);
595  5                  Continue = 0;
596  5                END;  /*** END 3RD "IF-THEN" ***/

/*************************************************************************/
/*** CHECK THAT ALL BYTES IN "Check_Rec" WERE READ                     ***/
/*************************************************************************/

597  4              ELSE IF (Bytes_Read <> ((Num_Recs - 1) * 204)) THEN
598  4                DO;  /*** BEGIN 3RD-LEVEL "ELSEIF" ***/
599  5                  Dword_Var = DOUBLE(Bytes_Read);
600  5                  CALL Movb(
                          @('Bytes read from DESCDB not consistent with value of NUM_RECS'),
                          @Err_Msg,60);
601  5                  Bytes_Written = RQ$S$WRITE$MOVE(Lprt_Conn,@Err_Msg,80,@Status);
602  5                  CALL Setb(' ',@Err_Msg,78);
603  5                  Continue = 0;
604  5                END;  /*** END 3RD-LEVEL "ELSEIF" ***/
605  4            END;  /*** END 2ND "IF" ***/
606  3        END;  /*** END 1ST "IF-THEN" ***/

607  2      END Get_File;
```

```
608   1      Init_Vars:
                 PROCEDURE;

/************************/
             /* BEGIN PROCESSING */
             /************************/

609   2      Cursor_Pos.CSI = 01BH;
610   2      Cursor_Pos.Bracket = '[';
611   2      Cursor_Pos.Row = 0;
612   2      Cursor_Pos.Semi_Colon = ';';
613   2      Cursor_Pos.Column = 0;
614   2      Cursor_Pos.Terminator = 'H';

615   2      Cor1_Frame = 0;
616   2      Cor2_Frame = 0;
617   2      Cor1_Peak = 0;
618   2      Cor2_Peak = 0;
619   2      Cor1_Width = 0;
620   2      Cor2_Width = 0;

621   2      Scr_Peak = 0;
622   2      Scr_Width = 0;

623   2      Prtr_Response(0) = 0;
624   2      Prtr_Response(1) = ' ';
625   2      Send_To_Printer = 1;

626   2      CALL Setb(' ',@Desc_Msg(0),65);
627   2      CALL Setb(' ',@Desc_Msg(67),65);
628   2      CALL Setb(' ',@Desc_Msg(134),65);
629   2      CALL Setb(' ',@Desc_Msg(201),65);

630   2      Desc_Msg(65) = 0DH;
631   2      Desc_Msg(66) = 0AH;
632   2      Desc_Msg(132) = 0DH;
633   2      Desc_Msg(133) = 0AH;
634   2      Desc_Msg(199) = 0DH;
635   2      Desc_Msg(200) = 0AH;
636   2      Desc_Msg(266) = 0DH;
637   2      Desc_Msg(267) = 0AH;

638   2      CALL Setb(' ',@Prtr_ID_Line,78);
639   2      CALL Movb(@('  ID NUMBER:  '),@Prtr_ID_Line(0),14);
640   2      CALL Movb(@('CORRELATION FRAMES:  '),@Prtr_ID_Line(54),21);
641   2      Prtr_ID_Line(78) = 0DH;
642   2      Prtr_ID_Line(79) = 0AH;

643   2      CALL Setb(' ',@ID_Line,90);
644   2      CALL Movb(@('  ID NUMBER:  '),@ID_Line(0),14);
645   2      CALL Movb(@(01BH,'[7;1m'),@ID_Line(14),6);
646   2      CALL Movb(@(01BH,'[0m'),@ID_Line(28),4);
647   2      CALL Movb(@('CORRELATION FRAMES:  '),@ID_Line(64),21);
648   2      ID_Line(89) = 0DH;
649   2      ID_Line(90) = 0AH;

650   2      CALL Movb(@('     CHANNEL:  '),@Chnl_Width_Line(0),14);
651   2      CALL Setb(' ',@Chnl_Width_Line(16),39);
652   2      CALL Movb(@('CORRELATION WIDTH:  '),@Chnl_Width_Line(55),20);
653   2      Chnl_Width_Line(78) = 0DH;
654   2      Chnl_Width_Line(79) = 0AH;

655   2      CALL Movb(@('        DATE:  '),@Date_Peak_Line(0),14);
```

```
656   2       CALL Setb(' ',@Date_Peak_Line(22),4);
657   2       CALL Setb(' ',@Date_Peak_Line(34),21);
658   2       CALL Movb(@(' CORRELATION PEAK: '),@Date_Peak_Line(55),20);
659   2       Date_Peak_Line(78) = 0DH;
660   2       Date_Peak_Line(79) = 0AH;

661   2       Chnl1_Last_Fade = 0;
662   2       Chnl2_Last_Fade = 0;

663   2       Chnl1_Last_Hit = 0;
664   2       Chnl2_Last_Hit = 0;

665   2       Chnl1_Last_ID = 0;
666   2       Chnl2_Last_ID = 0;

667   2       Since_Last_Chnl1_Fade = 0;
668   2       Since_Last_Chnl2_Fade = 0;

669   2       CALL Movb(@('FADE TO BLACK at '),@Fade_Buf(0),18);
670   2       CALL Movb(@(' on '),@Fade_Buf(25),4);
671   2       CALL Movb(@(' on CHANNEL '),@Fade_Buf(37),12);
672   2       CALL Movb(@(' Seconds since LAST Fade: '),@Fade_Buf(54),27);
673   2       Fade_Buf(51) = '.';
674   2       Fade_Buf(52) = 0DH;
675   2       Fade_Buf(53) = 0AH;
676   2       Fade_Buf(88) = 0DH;
677   2       Fade_Buf(89) = 0AH;
678   2       Fade_Buf(90) = 0AH;

679   2       CALL Setb(' ',@Err_Msg,78);
680   2       Err_Msg(78) = 0DH;
681   2       Err_Msg(79) = 0AH;

682   2       Null_Ptr = 0;

683   2       END Init_Vars;

684   1     Open_T2:
                PROCEDURE;

/**************************************************************/
             /*** TURN OFF EXCEPTION HANDLER SO "NO FILE EXISTS" ERR CAN BE HANDLED ***/
             /**************************************************************/

685   2       New_X_Handler.X_Offset = 0;
686   2       New_X_Handler.X_Base = 0;
687   2       New_X_Handler.X_Mode = 0;

688   2       CALL RQ$GET$EXCEPTION$HANDLER(@Old_X_Handler,@Status);
689   2       CALL RQ$SET$EXCEPTION$HANDLER(@New_X_Handler,@Status);

690   2       T2_Conn = RQ$S$ATTACH$FILE(@(4,':T2:'),@Status);
691   2       IF (Status <> E$OK) THEN
692   2         DO;   /*** BEGIN 1ST "IF" ***/
693   3           Dword_Var = DOUBLE(Status);
694   3           CALL Movb(@('Status from ATTACH$FILE(Receive_Data) = '),@Err_Msg,40);
695   3           Bytes_Written = RQ$S$WRITE$MOVE(Lprt_Conn,@Err_Msg,80,@Status);
696   3           CALL Setb(' ',@Err_Msg,78);
697   3           Continue = 0;
698   3         END;  /*** END 1ST "IF" ***/

699   2       CALL RQ$SET$EXCEPTION$HANDLER(@Old_X_Handler,@Status);
```

/****************************************************************************/
/* OPEN FILE(port) "T2"                                                */
/****************************************************************************/

```
700  2      IF (Continue = 1) THEN
701  2        DO;  /*** BEGIN 1ST "IF-THEN" ***/
702  3          CALL RQ$S$OPEN(T2_Conn,
                               1H,          /*** READ ONLY ***/
                               0,           /*** NUMBER OF BUFFERS ***/
                               @Status);
703  3          IF (Status <> E$OK) THEN
704  3            DO;  /*** BEGIN 2ND "IF-THEN" ***/
705  4              Dword_Var = DOUBLE(Status);
706  4              CALL Movb(@('Status from $OPEN(Receive_Data) = '),@Err_Msg,34);
707  4              Bytes_Written = RQ$S$WRITE$MOVE(Lprt_Conn,@Err_Msg,80,@Status);
708  4              CALL Setb(' ',@Err_Msg,78);
709  4              Continue = 0;
710  4            END;  /*** END 2ND "IF-THEN" ***/
711  3        END;  /*** END 1ST "IF-THEN" ***/

712  2      END Open_T2;

713  1      Print1_Hit:
              PROCEDURE PUBLIC;

/****************************************/
            /*** TASK "PRINT_HIT" DECLARATIONS ***/
            /****************************************/

714  2      DECLARE Segment_Tkn TOKEN,
                    Prt_Buf BASED Segment_Tkn STRUCTURE
                    (Sent_Time DWORD,
                     Sent_ID DWORD,
                     Channel_Num BYTE,
                     Peak BYTE,
                     Width BYTE,
                     Frames WORD);

715  2      DECLARE In_Prt_Buf STRUCTURE
                    (Sent_Time DWORD;
                     Sent_ID DWORD,
                     Channel_Num BYTE,
                     Peak BYTE,
                     Width BYTE,
                     Frames WORD);

716  2      DECLARE Number_Of_Detects BYTE;

/**************************/
            /*** BEGIN PROCESSING ***/
            /**************************/

/****************************************************************/
            /*** INITIALIZE VAR THAT INDICATES NEED FOR "FORM FEED" ON PRINTER ***/
            /****************************************************************/

717  2      Number_Of_Detects = 1;

/************************************/
            /*** INITIALIZE IN-PROC BUFFER ***/
            /************************************/
```

```
718    2    CALL Setb(0,@In_Prt_Buf,13);

/*******************************/
             /*** DO PROCEDURE "FOREVER" ***/
             /*******************************/

719    2    DO FOREVER;

/****************************************************************/
             /* TEMPORARILY SET "EXCEP HANDLER" SO TIMEOUT CAN BE HANDLED BY CODE */
             /****************************************************************/

720    3      New_X_Handler.X_Offset = 0;
721    3      New_X_Handler.X_Base = 0;
722    3      New_X_Handler.X_Mode = 0;

723    3      CALL RQ$GET$EXCEPTION$HANDLER(@Old_X_Handler,@Status);
724    3      CALL RQ$SET$EXCEPTION$HANDLER(@New_X_Handler,@Status);

/*************************************************/
             /*** RECEIVE SEG MSG SENT BY "CHECK_DATA"     ***/
             /*************************************************/

725    3      Segment_Tkn = RQ$RECEIVE$MESSAGE(Chnl1_Mbx_Tkn,500,@Null_Ptr,@Status);
726    3      IF (Status = E$OK) THEN
727    3        DO;   /*** BEGIN 1ST "IF" ***/
728    4          CALL Movb(@Prt_Buf,@In_Prt_Buf,13);

/**************************************************/
             /* DELETE SEGMENT CREATED IN "CHECK_DATA" */
             /**************************************************/

729    4          CALL RQ$DELETE$SEGMENT(Segment_Tkn,@Status);
730    4          IF (Status <> E$OK) THEN
731    4            DO;  /*** BEGIN 2ND "IF-THEN" ***/
732    5              Dword_Var = DOUBLE(Status);
733    5              CALL Movb(@('Status from DELETE$SEG = '),@Err_Msg,25);
734    5              Bytes_Written = RQ$S$WRITE$MOVE(Lprt_Conn,@Err_Msg,80,@Status);
735    5              CALL Setb(' ',@Err_Msg,78);
736    5            END;  /*** END 2ND "IF-THEN" ***/
737    4        END;  /*** END 1ST "IF" ***/
738    3      ELSE IF (Status = E$TIME) AND (In_Prt_Buf.Sent_ID <> 0) THEN
739    3        DO;  /*** BEGIN 1ST "ELSEIF" ***/

/*************************************************/
             /*** RESET EXCEPTION HANDLER TO SYSTEM DEFAULT ***/
             /*************************************************/

740    4          CALL RQ$SET$EXCEPTION$HANDLER(@Old_X_Handler,@Status);

/*************************************************/
             /*** SEARCH "DESCRIPTIVE" DB FOR COMMERCIAL USING "COMM_ID" ***/
             /*************************************************/

741    4          Continue = 0;
742    4          Counter = 1;

/*************************************************************/
             /***===> CHECK IF "Sent_ID" IS ALREADY IN "DESCDB"...       ***/
             /***===>...IF NOT, SEND "TAG DOES NOT EXISTS" ERR MSG...    ***/
             /*************************************************************/
```

```
743   4              DO WHILE (Counter < Num_Recs);
744   5                IF (Descdb_File(Counter).Comm_ID = In_Prt_Buf.Sent_ID) THEN
745   5                  DO; /*** BEGIN 2ND "IF-THEN" ***/
746   6                    Continue = 1;
747   6                    CALL MOVB(@Descdb_File(Counter).Ascii_Desc(0),@Desc_Msg(15),50);
748   6                    CALL MOVB(@Descdb_File(Counter).Ascii_Desc(50),@Desc_Msg(82),50);
749   6                    CALL MOVB(@Descdb_File(Counter).Ascii_Desc(100),@Desc_Msg(149),50);
750   6                    CALL MOVB(@Descdb_File(Counter).Ascii_Desc(150),@Desc_Msg(216),50);
751   6                    Counter = Num_Recs + 1;
752   6                  END;   /*** END 2ND "IF-THEN" ***/
753   5                ELSE
                        DO; /*** BEGIN 2ND "ELSE" ***/
754   6                    Counter = Counter + 1;
755   6                  END;   /*** END 2ND "ELSE" ***/
756   5              END;   /*** END 2ND "DO-WHILE" ***/

757   4              IF (Continue = 0) AND (In_Prt_Buf.Sent_ID <> 0FFFFFFFFH) THEN
758   4                DO; /*** BEGIN 2ND "IF-THEN" ***/
759   5                  CALL Movb(
                           @('TAG NUMBER detected DOES NOT EXIST in descriptive database.  ID = '),
                           @Err_Msg,66);
760   5                  Err_Msg(66) = 10;
761   5                  CALL Binary4_Ascii(In_Prt_Buf.Sent_ID,@Err_Msg(66),@Status);
762   5                  Bytes_Written = RQ$S$WRITE$MOVE(Lprt_Conn,@Err_Msg,80,@Status);
763   5                  CALL Setb(' ',@Err_Msg,78);
764   5                END;   /*** END 2ND "IF-THEN" ***/
765   4              ELSE IF (In_Prt_Buf.Sent_ID = 0FFFFFFFFH) THEN
766   4                DO; /*** BEGIN 2ND "ELSEIF" ***/

/*******************************************************/
                      /***          CONVERT "SYSTEM_TIME" TO ASCII...      ***/
                      /***     ...THEN CALL PROC FOR PRINTING "FADE" MSG   ***/
                      /*******************************************************/

767   5                  Time.Actual_Time = In_Prt_Buf.Sent_Time;
768   5                  CALL DQ$DECODE$TIME(@Time,@Status);

/************************************************************/
                      /***   PRINT "FADE TO BLACK" MSG, CHNL #, & "ASCII_TIME"  ***/
                      /************************************************************/

/*** CONVERT "CHANNEL_NUM" SENT TO ASCII ***/

769   5                  Prt_Byte(0) = 2;
770   5                  CALL Binary2_Ascii(In_Prt_Buf.Channel_Num,@Prt_Byte,@Status);

/*** CONVERT SECONDS SINCE LAST "FADE" TO ASCII ***/

771   5                  Prt_Last_Fade(0) = 7;
772   5                  IF (In_Prt_Buf.Channel_Num = 1) THEN
773   5                    DO; /*** BEGIN 3RD "IF-THEN" ***/
774   6                      CALL Binary4_Ascii(Since_Last_Chnl1_Fade,@Prt_Last_Fade,@Status);
775   6                    END;   /*** END 3RD "IF-THEN" ***/
776   5                  ELSE IF (In_Prt_Buf.Channel_Num = 2) THEN
777   5                    DO; /*** BEGIN 3RD "IF-THEN" ***/
778   6                      CALL Binary4_Ascii(Since_Last_Chnl2_Fade,@Prt_Last_Fade,@Status);
779   6                    END;   /*** END 3RD "IF-THEN" ***/

/*** MOVE ASCII TIME & "CHNL_NUM" INTO BUFFER FOR PRINTING ***/

780   5                  CALL Movb(@Time.Time(0),@Fade_Buf(17),8);
781   5                  CALL Movb(@Time.Date(0),@Fade_Buf(29),8);
782   5                  CALL Movb(@Prt_Byte(1),@Fade_Buf(49),2);
783   5                  CALL Movb(@Prt_Last_Fade(1),@Fade_Buf(81),7);
```

/* PRINT "FADE" MSG, ALONG WITH CHNL #, ASCII TIME & SECS SINCE LAST "FADE" */

```
784  5            IF (Send_To_Printer = 1) THEN
785  5              DO;  /*** BEGIN 3RD "IF-THEN" ***/
786  6                Bytes_Written = RQ$S$WRITE$MOVE(Lprt_Conn,@Fade_Buf,SIZE(Fade_Buf),@Stat
                  us);
787  6              END;  /*** END 3RD "IF-THEN" ***/

/*** DISPLAY ON CONSOLE SAME LINE AS WAS PRINTED ***/

788  5            Bytes_Written = RQ$S$WRITE$MOVE(T1_Conn,@Fade_Buf,SIZE(Fade_Buf),@Status);
789  5            Continue = 0;
790  5          END;  /*** END 2ND "ELSEIF" ***/

/**********************************************/
         /*** SUBTRACT 30 SECONDS FROM "SYSTEM_TIME"... ***/
         /*** ...THEN CONVERT "SYSTEM_TIME" TO ASCII... ***/
         /*** ...THEN STUFF INTO A BUFFER FOR PRINTING ***/
         /**********************************************/

791  4        IF (Continue = 1) THEN
792  4          DO;  /*** BEGIN 2ND "IF-THEN" ***/

793  5            Time.Actual_Time = In_Prt_Buf.Sent_Time - 34;
794  5            CALL DQ$DECODE$TIME(@Time,@Status);
795  5            CALL Movb(@Time.Time(0),@Date_Peak_Line(14),8);
796  5            CALL Movb(@Time.Date(0),@Date_Peak_Line(26),8);

/*****************************************************************/
         /***   BEFORE EACH "DETECT" PRTOUT - SEND TO PRTR EITHER A "FORM  ***/
         /*** FEED" OR 4 "LINE FEEDS"                                      ***/
         /*****************************************************************/

797  5            IF (Number_Of_Detects = 1) AND
                     (Send_To_Printer = 1) THEN
798  5              DO;  /*** BEGIN 3RD "IF-THEN" ***/

/*********************************/
                /* SEND TO PRTR "FORM FEED" */
                /*********************************/

799  6                Bytes_Written = RQ$S$WRITE$MOVE(Lprt_Conn,@(0CH),1,@Status);
800  6              END;  /*** END 3RD "IF-THEN" ***/

/*****************************************************************/
         /***   PRINT COMM ID #, CHNL #, ASCII DESCRIPTION & "ASCII_TIME" ***/
         /***   ....DISPLAY SAME MSGS ON CONSOLE                          ***/
         /*****************************************************************/

/*** CONVERT "CHANNEL_NUM" SENT TO ASCII ***/

801  5            Prt_Byte(0) = 2;
802  5            CALL Binary2_Ascii(DOUBLE(In_Prt_Buf.Channel_Num),@Prt_Byte,@Status);
803  5            IF (Prt_Byte(1) = ' ') THEN
804  5              DO;  /*** BEGIN 3RD "IF-THEN" ***/
805  6                Prt_Byte(1) = '0';
806  6              END;  /*** END 3RD "IF-THEN" ***/
807  5            CALL Movb(@Prt_Byte(1),@Chnl_Width_Line(14),2);

/*** CONVERT "WIDTH" (# OF DETECTS IN 5 SECS) TO ASCII ***/

808  5            Prt_Byte(0) = 3;
809  5            CALL Binary2_Ascii(DOUBLE(In_Prt_Buf.Width),@Prt_Byte,@Status);
```

```
810   5            DO Counter = 1 TO 2;
811   6               IF (Prt_Byte(Counter) = ' ') THEN
812   6                  DO;  /*** BEGIN 3RD "IF-THEN" ***/
813   7                     Prt_Byte(Counter) = '0';
814   7                  END; /*** END 3RD "IF-THEN" ***/
815   6            END;  /*** END ITERATIVE "DO" ***/
816   5            CALL Movb(@Prt_Byte(1),@Chnl_Width_Line(75),3);

/*** CONVERT "FRAMES" (# OF SECS BTWN 1ST & LAST HIT) TO ASCII ***/

817   5            Prt_Byte(0) = 4;
818   5            CALL Binary2_Ascii(In_Prt_Buf.Frames,@Prt_Byte,@Status);
819   5            DO Counter = 2 TO 4;
820   6               IF (Prt_Byte(Counter) = ' ') THEN
821   6                  DO;  /*** BEGIN 3RD "IF-THEN" ***/
822   7                     Prt_Byte(Counter) = '0';
823   7                  END; /*** END 3RD "IF-THEN" ***/
824   6            END;  /*** END ITERATIVE "DO" ***/
825   5            CALL Movb(@Prt_Byte(1),@Prtr_ID_Line(74),4);
826   5            CALL Movb(@Prt_Byte(1),@ID_Line(84),4);

/*** CONVERT "PEAK" (HIGHEST CORR BITS SENT) TO ASCII ***/

827   5            Prt_Byte(0) = 3;
828   5            CALL Binary2_Ascii(DOUBLE(In_Prt_Buf.Peak),@Prt_Byte,@Status);
829   5            DO Counter = 1 TO 2;
830   6               IF (Prt_Byte(Counter) = ' ') THEN
831   6                  DO;  /*** BEGIN 3RD "IF-THEN" ***/
832   7                     Prt_Byte(Counter) = '0';
833   7                  END; /*** END 3RD "IF-THEN" ***/
834   6            END;  /*** END ITERATIVE "DO" ***/
835   5            CALL Movb(@Prt_Byte(1),@Date_Peak_Line(75),3);

/*** CONVERT ID NUMBER SENT TO ASCII ***/

836   5            Prt_ID(0) = 8;
837   5            CALL Binary4_Ascii(In_Prt_Buf.Sent_ID,@Prt_ID,@Status);
838   5            DO Counter = 1 TO 7;
839   6               IF (Prt_ID(Counter) = ' ') THEN
840   6                  DO;  /*** BEGIN 3RD "IF-THEN" ***/
841   7                     Prt_ID(Counter) = '0';
842   7                  END; /*** END 3RD "IF-THEN" ***/
843   6            END;  /*** END ITERATIVE "DO" ***/
844   5            CALL Movb(@Prt_ID(1),@ID_Line(20),8);
845   5            CALL Movb(@Prt_ID(1),@Prtr_ID_Line(14),8);

/**************************************************************************/
      /*** DISPLAY ON CONSOLE:  UPPER "DETECT" BORDER, TAG # DETECTED MSG,    ***/
      /*** UPPER DESC BORDER, COMMERCIAL DESCRIPTION, LOWER DESC MSG, &       ***/
      /*** LOWER "DETECT" BORDER                                              ***/
      /**************************************************************************/

846   5            Bytes_Written = RQ$S$WRITE$MOVE(T1_Conn,@Begin_Console_Msg,SIZE(Begin_Consol
                   -e_Msg),@Status);
847   5            Bytes_Written = RQ$S$WRITE$MOVE(T1_Conn,@ID_Line,SIZE(ID_Line),@Status);
848   5            Bytes_Written = RQ$S$WRITE$MOVE(T1_Conn,@Chnl_Width_Line,SIZE(Chnl_Width_Lin
                   -e),@Status);
849   5            Bytes_Written = RQ$S$WRITE$MOVE(T1_Conn,@Date_Peak_Line,SIZE(Date_Peak_Line)
                   -,@Status);
850   5            Bytes_Written = RQ$S$WRITE$MOVE(T1_Conn,@DB_Line,SIZE(DB_Line),@Status);
851   5            Bytes_Written = RQ$S$WRITE$MOVE(T1_Conn,@High_Intensity,SIZE(High_Intensity)
                   -,@Status);
852   5            Bytes_Written = RQ$S$WRITE$MOVE(T1_Conn,@Desc_Msg,SIZE(Desc_Msg),@Status);
```

```
853   5          Bytes_Written = RQ$S$WRITE$MOVE(T1_Conn,@Low_Intensity,SIZE(Low_Intensity),@
                 Status);
854   5          Bytes_Written = RQ$S$WRITE$MOVE(T1_Conn,@(0AH,0AH),2,@Status);

/*****************************************************************/
      /*** IF PRINTOUT IS DESIRED, SEND SAME DATA TO LINE PRINTER    ***/
      /*****************************************************************/

855   5          IF (Send_To_Printer = 1) THEN
856   5            DO;  /*** BEGIN 3RD "IF-THEN" ***/
857   6              Bytes_Written = RQ$S$WRITE$MOVE(Lprt_Conn,@Begin_Printer_Msg,SIZE(Begin_
                 Printer_Msg),@Status);
858   6              Bytes_Written = RQ$S$WRITE$MOVE(Lprt_Conn,@Prtr_ID_Line,SIZE(Prtr_ID_Lin
                 e),@Status);
859   6              Bytes_Written = RQ$S$WRITE$MOVE(Lprt_Conn,@Chnl_Width_Line,SIZE(Chnl_Wid
                 th_Line),@Status);
860   6              Bytes_Written = RQ$S$WRITE$MOVE(Lprt_Conn,@Date_Peak_Line,SIZE(Date_Peak
                 _Line),@Status);
861   6              Bytes_Written = RQ$S$WRITE$MOVE(Lprt_Conn,@DB_Line,SIZE(DB_Line),@Status
                 );
862   6              Bytes_Written = RQ$S$WRITE$MOVE(Lprt_Conn,@Desc_Msg,SIZE(Desc_Msg),@Stat
                 us);
863   6              Bytes_Written = RQ$S$WRITE$MOVE(Lprt_Conn,@(0AH),1,@Status);
864   6            END;  /*** END 3RD "IF-THEN" ***/

865   5            Number_Of_Detects = Number_Of_Detects + 1;
866   5            IF (Number_Of_Detects > 6) THEN
867   5              DO;  /*** BEGIN 3RD "IF-THEN" ***/
868   6                Number_Of_Detects = 1;
869   6              END;  /*** END 3RD "IF-THEN" ***/
870   5          END;  /*** END 2ND "IF-THEN" ***/

871   4        CALL Setb(0,@In_Prt_Buf,13);

872   4      END;  /*** END 1ST "ELSEIF" ***/

873   3    CALL RQ$SET$EXCEPTION$HANDLER(@Old_X_Handler,@Status);
874   3    END;  /*** END "DO-FOREVER" ***/

875   2  END Print1_Hit;

876   1  Print2_Hit:
           PROCEDURE PUBLIC;

/***************************************/
      /*** TASK "PRINT_HIT" DECLARATIONS  ***/
      /***************************************/

877   2    DECLARE Segment_Tkn TOKEN,
                   Prt_Buf BASED Segment_Tkn STRUCTURE
                   (Sent_Time DWORD,
                    Sent_ID DWORD,
                    Channel_Num BYTE,
                    Peak BYTE,
                    Width BYTE,
                    Frames WORD);

878   2    DECLARE In_Prt_Buf STRUCTURE
                   (Sent_Time DWORD,
                    Sent_ID DWORD,
                    Channel_Num BYTE,
                    Peak BYTE,
```

```
                    Width BYTE,
                    Frames WORD);

879  2      DECLARE Number_Of_Detects BYTE;

/************************/
            /* BEGIN PROCESSING */
            /************************/

/**************************************************************/
            /*** INITIALIZE VAR THAT INDICATES NEED FOR "FORM FEED" ON PRINTER ***/
            /**************************************************************/

880  2      Number_Of_Detects = 1;

/**********************************/
            /*** INITIALIZE IN-PROC BUFFER ***/
            /**********************************/

881  2      CALL Setb(0,@In_Prt_Buf,13);

/********************************/
            /*** DO PROCEDURE "FOREVER" ***/
            /********************************/
882  2      DO FOREVER;

/****************************************************************/
            /* TEMPORARILY SET "EXCEP HANDLER" SO TIMEOUT CAN BE HANDLED BY CODE */
            /****************************************************************/

883  3        New_X_Handler.X_Offset = 0;
884  3        New_X_Handler.X_Base = 0;
885  3        New_X_Handler.X_Mode = 0;

886  3        CALL RQ$GET$EXCEPTION$HANDLER(@Old_X_Handler,@Status);
887  3        CALL RQ$SET$EXCEPTION$HANDLER(@New_X_Handler,@Status);

/*************************************************************/
            /*** RECEIVE SEG MSG SENT BY "CHECK_DATA"              ***/
            /*************************************************************/

888  3        Segment_Tkn = RQ$RECEIVE$MESSAGE(Chnl2_Mbx_Tkn,500,@Null_Ptr,@Status);
889  3        IF (Status = E$OK) THEN
890  3          DO;   /*** BEGIN 1ST "IF" ***/
891  4            CALL Movb(@Prt_Buf,@In_Prt_Buf,13);

/**************************************************/
            /* DELETE SEGMENT CREATED IN "CHECK_DATA" */
            /**************************************************/

892  4            CALL RQ$DELETE$SEGMENT(Segment_Tkn,@Status);
893  4            IF (Status <> E$OK) THEN
894  4              DO;  /*** BEGIN 2ND "IF-THEN" ***/
895  5                Dword_Var = DOUBLE(Status);
896  5                CALL Movb(@('Status from DELETE$SEG = '),@Err_Msg,25);
897  5                Bytes_Written = RQ$$WRITE$MOVE(Lprt_Conn,@Err_Msg,80,@Status);
898  5                CALL Setb(' ',@Err_Msg,78);
899  5              END;  /*** END 2ND "IF-THEN" ***/
900  4          END;  /*** END 1ST "IF" ***/
901  3        ELSE IF (Status = E$TIME) AND (In_Prt_Buf.Sent_ID <> 0) THEN
902  3          DO;  /*** BEGIN 1ST "ELSEIF" ***/

/****************************************************/
```

```
                /*** RESET EXCEPTION HANDLER TO SYSTEM DEFAULT ***/
                /*************************************************/

903     4           CALL RQ$SET$EXCEPTION$HANDLER(@Old_X_Handler,@Status);

/*******************************************************************/
                /*** SEARCH "DESCRIPTIVE" DB FOR COMMERCIAL USING "COMM_ID" ***/
                /*******************************************************************/

904     4           Continue = 0;
905     4           Counter = 1;

/************************************************************************/
                /***===>   CHECK IF "Sent_ID" IS ALREADY IN "DESCDB"...           ***/
                /***===>...IF NOT, SEND "TAG DOES NOT EXISTS" ERR MSG...          ***/
                /************************************************************************/

906     4           DO WHILE (Counter < Num_Recs);
907     5             IF (Descdb_File(Counter).Comm_ID = In_Prt_Buf.Sent_ID) THEN
908     5               DO;  /*** BEGIN 2ND "IF-THEN" ***/
909     6                 Continue = 1;
910     6                 CALL MOVB(@Descdb_File(Counter).Ascii_Desc(0),@Desc_Msg(15),50);
911     6                 CALL MOVB(@Descdb_File(Counter).Ascii_Desc(50),@Desc_Msg(82),50);
912     6                 CALL MOVB(@Descdb_File(Counter).Ascii_Desc(100),@Desc_Msg(149),50);
913     6                 CALL MOVB(@Descdb_File(Counter).Ascii_Desc(150),@Desc_Msg(216),50);
914     6                 Counter = Num_Recs + 1;
915     6               END;  /*** END 2ND "IF-THEN" ***/
916     5             ELSE
                        DO;  /*** BEGIN 2ND "ELSE" ***/
917     6                 Counter = Counter + 1;
918     6               END;  /*** END 2ND "ELSE" ***/
919     5           END;  /*** END 2ND "DO-WHILE" ***/

920     4           IF (Continue = 0) AND (In_Prt_Buf.Sent_ID <> 0FFFFFFFFH) THEN
921     4             DO;  /*** BEGIN 2ND "IF-THEN" ***/
922     5               CALL Movb(
                         @('TAG NUMBER detected DOES NOT EXIST in descriptive database.  ID = '),
                         @Err_Msg,66);
923     5               Err_Msg(66) = 10;
924     5               CALL Binary4_Ascii(In_Prt_Buf.Sent_ID,@Err_Msg(66),@Status);
925     5               Bytes_Written = RQ$S$WRITE$MOVE(Lprt_Conn,@Err_Msg,80,@Status);
926     5               CALL Setb(' ',@Err_Msg,78);
927     5             END;  /*** END 2ND "IF-THEN" ***/
928     4           ELSE IF (In_Prt_Buf.Sent_ID = 0FFFFFFFFH) THEN
929     4             DO;  /*** BEGIN 2ND "ELSEIF" ***/

/**********************************************************/
                /***         CONVERT "SYSTEM_TIME" TO ASCII...        ***/
                /*** ...THEN CALL PROC FOR PRINTING "FADE" MSG        ***/
                /**********************************************************/

930     5               Time.Actual_Time = In_Prt_Buf.Sent_Time;
931     5               CALL DQ$DECODE$TIME(@Time,@Status);

/**********************************************************************/
                /***   PRINT "FADE TO BLACK" MSG, CHNL #, & "ASCII_TIME"         ***/
                /**********************************************************************/

/*** CONVERT "CHANNEL_NUM" SENT TO ASCII ***/

932     5               Prt_Byte(0) = 2;
933     5               CALL Binary2_Ascii(In_Prt_Buf.Channel_Num,@Prt_Byte,@Status);
```

/* CONVERT SECONDS SINCE LAST "FADE" TO ASCII */

```
934   5              Prt_Last_Fade(0) = 7;
935   5              IF (In_Prt_Buf.Channel_Num = 1) THEN
936   5                DO;  /*** BEGIN 3RD "IF-THEN" ***/
937   6                  CALL Binary4_Ascii(Since_Last_Chnl1_Fade,@Prt_Last_Fade,@Status);
938   6                END; /*** END 3RD "IF-THEN" ***/
939   5              ELSE IF (In_Prt_Buf.Channel_Num = 2) THEN
940   5                DO;  /*** BEGIN 3RD "IF-THEN" ***/
941   6                  CALL Binary4_Ascii(Since_Last_Chnl2_Fade,@Prt_Last_Fade,@Status);
942   6                END; /*** END 3RD "IF-THEN" ***/
```

/* MOVE ASCII TIME & "CHNL_NUM" INTO BUFFER FOR PRINTING */

```
943   5              CALL Movb(@Time.Time(0),@Fade_Buf(17),8);
944   5              CALL Movb(@Time.Date(0),@Fade_Buf(29),8);
945   5              CALL Movb(@Prt_Byte(1),@Fade_Buf(49),2);
946   5              CALL Movb(@Prt_Last_Fade(1),@Fade_Buf(81),7);
```

/* PRINT "FADE" MSG, ALONG WITH CHNL #, ASCII TIME & SECS SINCE LAST "FADE" */

```
947   5              IF (Send_To_Printer = 1) THEN
948   5                DO;  /*** BEGIN 3RD "IF-THEN" ***/
949   6                  Bytes_Written = RQ$S$WRITE$MOVE(Lprt_Conn,@Fade_Buf,SIZE(Fade_Buf),@Stat
             -us);
950   6                END; /*** END 3RD "IF-THEN" ***/
```

/* DISPLAY ON CONSOLE SAME LINE AS WAS PRINTED */

```
951   5              Bytes_Written = RQ$S$WRITE$MOVE(T1_Conn,@Fade_Buf,SIZE(Fade_Buf),@Status);
952   5              Continue = 0;
953   5            END; /*** END 2ND "ELSEIF" ***/
```

/**********************************************/
          /* SUBTRACT 30 SECONDS FROM "SYSTEM_TIME"...  */
          /* ...THEN CONVERT "SYSTEM_TIME" TO ASCII...  */
          /* ...THEN STUFF INTO A BUFFER FOR PRINTING   */
          /**********************************************/

```
954   4          IF (Continue = 1) THEN
955   4            DO;  /*** BEGIN 2ND "IF-THEN" ***/

956   5              Time.Actual_Time = In_Prt_Buf.Sent_Time - 34;
957   5              CALL DQ$DECODE$TIME(@Time,@Status);
958   5              CALL Movb(@Time.Time(0),@Date_Peak_Line(14),8);
959   5              CALL Movb(@Time.Date(0),@Date_Peak_Line(26),8);
```

/****************************************************************/
          /*   BEFORE EACH "DETECT" PRTOUT - SEND TO PRTR EITHER A "FORM   */
          /* FEED" OR 4 "LINE FEEDS"                                       */
          /****************************************************************/

```
960   5              IF (Number_Of_Detects = 1) AND
                        (Send_To_Printer = 1) THEN
961   5                DO;  /*** BEGIN 3RD "IF-THEN" ***/
```

/*********************************/
                    /* SEND TO PRTR "FORM FEED" */
                    /*********************************/

```
962   6                  Bytes_Written = RQ$S$WRITE$MOVE(Lprt_Conn,@(0CH),1,@Status);
963   6                END; /*** END 3RD "IF-THEN" ***/
```

/****************************************************************/

```
/***   PRINT COMM ID #, CHNL #, ASCII DESCRIPTION & "ASCII_TIME"   ***/
/***   ....DISPLAY SAME MSGS ON CONSOLE                            ***/
/********************************************************************/

/*** CONVERT "CHANNEL_NUM" SENT TO ASCII ***/

964   5           Prt_Byte(0) = 2;
965   5           CALL Binary2_Ascii(DOUBLE(In_Prt_Buf.Channel_Num),@Prt_Byte,@Status);
966   5           IF (Prt_Byte(1) = ' ') THEN
967   5             DO;  /*** BEGIN 3RD "IF-THEN" ***/
968   6               Prt_Byte(1) = '0';
969   6             END;  /*** END 3RD "IF-THEN" ***/
970   5           CALL Movb(@Prt_Byte(1),@Chnl_Width_Line(14),2);

/*** CONVERT "WIDTH" (# OF DETECTS IN 5 SECS) TO ASCII ***/

971   5           Prt_Byte(0) = 3;
972   5           CALL Binary2_Ascii(DOUBLE(In_Prt_Buf.Width),@Prt_Byte,@Status);
973   5           DO Counter = 1 TO 2;
974   6             IF (Prt_Byte(Counter) = ' ') THEN
975   6               DO;  /*** BEGIN 3RD "IF-THEN" ***/
976   7                 Prt_Byte(Counter) = '0';
977   7               END;  /*** END 3RD "IF-THEN" ***/
978   6           END;  /*** END ITERATIVE "DO" ***/
979   5           CALL Movb(@Prt_Byte(1),@Chnl_Width_Line(75),3);

/*** CONVERT "FRAMES" (# OF SECS BTWN 1ST & LAST HIT) TO ASCII ***/

980   5           Prt_Byte(0) = 4;
981   5           CALL Binary2_Ascii(In_Prt_Buf.Frames,@Prt_Byte,@Status);
982   5           DO Counter = 2 TO 4;
983   6             IF (Prt_Byte(Counter) = ' ') THEN
984   6               DO;  /*** BEGIN 3RD "IF-THEN" ***/
985   7                 Prt_Byte(Counter) = '0';
986   7               END;  /*** END 3RD "IF-THEN" ***/
987   6           END;  /*** END ITERATIVE "DO" ***/
988   5           CALL Movb(@Prt_Byte(1),@Prtr_ID_Line(74),4);
989   5           CALL Movb(@Prt_Byte(1),@ID_Line(84),4);

/*** CONVERT "PEAK" (HIGHEST CORR BITS SENT) TO ASCII ***/

990   5           Prt_Byte(0) = 3;
991   5           CALL Binary2_Ascii(DOUBLE(In_Prt_Buf.Peak),@Prt_Byte,@Status);
992   5           DO Counter = 1 TO 2;
993   6             IF (Prt_Byte(Counter) = ' ') THEN
994   6               DO;  /*** BEGIN 3RD "IF-THEN" ***/
995   7                 Prt_Byte(Counter) = '0';
996   7               END;  /*** END 3RD "IF-THEN" ***/
997   6           END;  /*** END ITERATIVE "DO" ***/
998   5           CALL Movb(@Prt_Byte(1),@Date_Peak_Line(75),3);

/*** CONVERT ID NUMBER SENT TO ASCII ***/

999   5           Prt_ID(0) = 8;
1000  5           CALL Binary4_Ascii(In_Prt_Buf.Sent_ID,@Prt_ID,@Status);
1001  5           DO Counter = 1 TO 7;
1002  6             IF (Prt_ID(Counter) = ' ') THEN
1003  6               DO;  /*** BEGIN 3RD "IF-THEN" ***/
1004  7                 Prt_ID(Counter) = '0';
1005  7               END;  /*** END 3RD "IF-THEN" ***/
1006  6           END;  /*** END ITERATIVE "DO" ***/
1007. 5           CALL Movb(@Prt_ID(1),@ID_Line(20),8);
1008  5           CALL Movb(@Prt_ID(1),@Prtr_ID_Line(14),8);
```

/****************************************************************/
/* DISPLAY ON CONSOLE: UPPER "DETECT" BORDER, TAG # DETECTED MSG, */
/* UPPER DESC BORDER, COMMERCIAL DESCRIPTION, LOWER DESC MSG, & */
/* LOWER "DETECT" BORDER */
/****************************************************************/

```
1009  5         Bytes_Written = RQ$S$WRITE$MOVE(T1_Conn,@Begin_Console_Msg,SIZE(Begin_Consol
                -e_Msg),@Status);
1010  5         Bytes_Written = RQ$S$WRITE$MOVE(T1_Conn,@ID_Line,SIZE(ID_Line),@Status);
1011  5         Bytes_Written = RQ$S$WRITE$MOVE(T1_Conn,@Chnl_Width_Line,SIZE(Chnl_Width_Lin
                -e),@Status);
1012  5         Bytes_Written = RQ$S$WRITE$MOVE(T1_Conn,@Date_Peak_Line,SIZE(Date_Peak_Line)
                -,@Status);
1013  5         Bytes_Written = RQ$S$WRITE$MOVE(T1_Conn,@DB_Line,SIZE(DB_Line),@Status);
1014  5         Bytes_Written = RQ$S$WRITE$MOVE(T1_Conn,@High_Intensity,SIZE(High_Intensity)
                -,@Status);
1015  5         Bytes_Written = RQ$S$WRITE$MOVE(T1_Conn,@Desc_Msg,SIZE(Desc_Msg),@Status);
1016  5         Bytes_Written = RQ$S$WRITE$MOVE(T1_Conn,@Low_Intensity,SIZE(Low_Intensity),@
                -Status);
1017  5         Bytes_Written = RQ$S$WRITE$MOVE(T1_Conn,@(0AH,0AH),2,@Status);
```

/****************************************************************/
/* IF PRINTOUT IS DESIRED, SEND SAME DATA TO LINE PRINTER */
/****************************************************************/

```
1018  5         IF (Send_To_Printer = 1) THEN
1019  5            DO;  /*** BEGIN 3RD "IF-THEN" ***/
1020  6               Bytes_Written = RQ$S$WRITE$MOVE(Lprt_Conn,@Begin_Printer_Msg,SIZE(Begin_
                -Printer_Msg),@Status);
1021  6               Bytes_Written = RQ$S$WRITE$MOVE(Lprt_Conn,@Prtr_ID_Line,SIZE(Prtr_ID_Lin
                -e),@Status);
1022  6               Bytes_Written = RQ$S$WRITE$MOVE(Lprt_Conn,@Chnl_Width_Line,SIZE(Chnl_Wid
                -th_Line),@Status);
1023  6               Bytes_Written = RQ$S$WRITE$MOVE(Lprt_Conn,@Date_Peak_Line,SIZE(Date_Peak
                -_Line),@Status);
1024  6               Bytes_Written = RQ$S$WRITE$MOVE(Lprt_Conn,@DB_Line,SIZE(DB_Line),@Status
                -);
1025  6               Bytes_Written = RQ$S$WRITE$MOVE(Lprt_Conn,@Desc_Msg,SIZE(Desc_Msg),@Stat
                -us);
1026  6               Bytes_Written = RQ$S$WRITE$MOVE(Lprt_Conn,@(0AH),1,@Status);
1027  6            END;  /*** END 3RD "IF-THEN" ***/

1028  5         Number_Of_Detects = Number_Of_Detects + 1;
1029  5         IF (Number_Of_Detects > 6) THEN
1030  5            DO;  /*** BEGIN 3RD "IF-THEN" ***/
1031  6               Number_Of_Detects = 1;
1032  6            END;  /*** END 3RD "IF-THEN" ***/
1033  5         END;  /*** END 2ND "IF-THEN" ***/

1034  4      CALL Setb(0,@In_Prt_Buf,13);

1035  4    END;  /*** END 1ST "ELSEIF" ***/

1036  3    CALL RQ$SET$EXCEPTION$HANDLER(@Old_X_Handler,@Status);

1037  3    END;  /*** END "DO-FOREVER" ***/

1038  2  END Print2_Hit;

1039  1  Receive_Data:
            PROCEDURE PUBLIC;
```

/***************************/

```
                /*** BEGIN PROCESSING ***/
                /*************************/

/*******************************/
                /*** INITIALIZE VARIABLES ***/
                /*******************************/

1040    2       CALL Init_Vars;
1041    2       CALL RQSC$SEND$CO$RESPONSE(
                      @Prtr_Response,SIZE(Prtr_Response),
                      @(38,'Enter "Y" to send detects to printer: '),@Status);
1042    2       IF (Prtr_Response(1) <> 'Y') AND
                   (Prtr_Response(1) <> 'y') THEN
1043    2         DO;
1044    3           Send_To_Printer = 0;
1045    3         END;

/********************************************************************/
                /*** ATTACH TO LINE PRINTER, OPEN CONNECTION                     ***/
                /********************************************************************/

1046    2       Lprt_Conn = RQ$S$ATTACH$FILE(@(4,':LP:'),@Status);
1047    2       CALL RQ$S$OPEN(Lprt_Conn,2,0,@Status);

/********************************************************************/
                /*** ATTACH TO "T1" (CONSOLE DISPLAY), OPEN CONNECTION           ***/
                /********************************************************************/

1048    2       T1_Conn = RQ$S$ATTACH$FILE(@(4,':T1:'),@Status);
1049    2       CALL RQ$S$OPEN(T1_Conn,2,0,@Status);

/********************************************************************/
                /*** READ FILE "DESCDB" INTO MEMORY SO "PRINT_HIT" CAN USE DATA ***/
                /********************************************************************/

1050    2       CALL Get_File;
1051    2       CALL Close_File;

1052    2       First_Detect = 1;
1053    2       First_Fade = 1;
1054    2       Continue = 1;

/*********************************/
                /*** OPEN "FILE" (PORT) "T2" ***/
                /*********************************/

1055    2       CALL Open_T2;

/********************************************************************/
                /*** CREATE MAILBOXES AND TASKS "PRINT1_HIT" & "PRINT2_HIT" ***/
                /********************************************************************/

1056    2       Chnl1_Mbx_Tkn = RQ$CREATE$MAILBOX(0,@Status);
1057    2       IF (Status <> E$OK) THEN
1058    2         DO;    /*** BEGIN 1ST "IF-THEN" ***/
1059    3           Continue = 0;
1060    3           Dword_Var = DOUBLE(Status);
1061    3           CALL Movb(@('Status from CREATE$MBX(RECV_DATA) = '),@Err_Msg,31);
1062    3           Bytes_Written = RQ$S$WRITE$MOVE(Lprt_Conn,@Err_Msg,80,@Status);
1063    3           CALL Setb(' ',@Err_Msg,78);
1064    3         END;  /*** END 1ST "IF-THEN" ***/
```

```
1065  2      Chnl2_Mbx_Tkn = RQ$CREATE$MAILBOX(0,@Status);
1066  2      IF (Status <> E$OK) THEN
1067  2        DO;   /*** BEGIN 1ST "IF-THEN" ***/
1068  3          Continue = 0;
1069  3          Dword_Var = DOUBLE(Status);
1070  3          CALL Movb(@('Status from CREATE$MBX(RECV_DATA) = '),@Err_Msg,31);
1071  3          Bytes_Written = RQ$S$WRITE$MOVE(Lprt_Conn,@Err_Msg,80,@Status);
1072  3          CALL Setb(' ',@Err_Msg,78);
1073  3        END;  /*** END 1ST "IF-THEN" ***/

1074  2      Prt1_Task_Tkn = RQ$CREATE$TASK(0,@Print1_Hit,0,Null_Ptr,512,0,@Status);
1075  2      IF (Status <> E$OK) THEN
1076  2        DO;   /*** BEGIN 1ST "IF-THEN" ***/
1077  3          Continue = 0;
1078  3          Dword_Var = DOUBLE(Status);
1079  3          CALL Movb(@('Status from CREATE$TASK = '),@Err_Msg,26);
1080  3          Bytes_Written = RQ$S$WRITE$MOVE(Lprt_Conn,@Err_Msg,80,@Status);
1081  3          CALL Setb(' ',@Err_Msg,78);
1082  3        END;  /*** END 1ST "IF-THEN" ***/

1083  2      Prt2_Task_Tkn = RQ$CREATE$TASK(0,@Print2_Hit,0,Null_Ptr,512,0,@Status);
1084  2      IF (Status <> E$OK) THEN
1085  2        DO;   /*** BEGIN 1ST "IF-THEN" ***/
1086  3          Continue = 0;
1087  3          Dword_Var = DOUBLE(Status);
1088  3          CALL Movb(@('Status from CREATE$TASK = '),@Err_Msg,26);
1089  3          Bytes_Written = RQ$S$WRITE$MOVE(Lprt_Conn,@Err_Msg,80,@Status);
1090  3          CALL Setb(' ',@Err_Msg,78);
1091  3        END;  /*** END 1ST "IF-THEN" ***/

/*****************************************************************/
             /*** SET UP PARAMETERS FOR TERMINAL & CLEAR OUT INPUT BUFFER   ***/
             /*****************************************************************/

1092  2      CALL Clear_Buff;

/*****************************************************************/
             /*** DO FOREVER - READ DATA, CHECK THAT NO GARBAGE EXISTS IN READ-FROM ***/
             /***    BUFFER BY LOOKING FOR FIRST FOUR BYTES THAT EQUAL ZERO...    ***/
             /***    ....IF FIRST FOUR BYTES ARE CORRECT, SEND DATA TO "CHECK_DATA" ***/
             /***    ....IF LAST BYTE IS INCORRECT, START OVER, LOOKING AT 1ST BYTE ***/
             /*****************************************************************/

1093  2      IF (Continue = 1) THEN
1094  2        DO FOREVER;  /*** BEGIN 1ST "IF-THEN" & 1ST "DO-WHILE" ***/
1095  3          CALL SETB(1,@Receive_Buf.Check_Bytes(0),4);
1096  3          Already_Read = 0;
1097  3          DO WHILE (Receive_Buf.Check_Bytes(0) <> 0) OR
                           (Receive_Buf.Check_Bytes(1) <> 0) OR
                           (Receive_Buf.Check_Bytes(2) <> 0) OR
                           (Receive_Buf.Check_Bytes(3) <> 0);
1098  4            Bytes_Read = 0;
1099  4            DO WHILE (Bytes_Read = 0);  /*** BEGIN 3RD "DO-WHILE" ***/
1100  5              Bytes_Read = RQ$S$READ$MOVE(T2_Conn,
                                   @Receive_Buf.Check_Bytes(Already_Read),
                                   1,
                                   @Status);
1101  5              Dword_Var = DOUBLE(Bytes_Read);
1102  5              IF (Status <> E$OK) THEN
1103  5                DO;  /*** BEGIN 2ND "IF-THEN" ***/
1104  6                  Continue = 0;
1105  6                  Dword_Var = DOUBLE(Status);
1106  6                  CALL Movb(@('Status from 1-byte READ$MOVE = '),@Err_Msg,31);
1107  6                  Bytes_Written = RQ$S$WRITE$MOVE(Lprt_Conn,@Err_Msg,80,@Status);
```

```
1108   6              CALL Setb(' ',@Err_Msg,78);
1109   6            END;   /*** END 2ND "IF-THEN" ***/
1110   5          END;   /*** END 3RD "DO-WHILE" ***/
1111   4          IF (Receive_Buf.Check_Bytes(Already_Read) <> 0) THEN
1112   4            DO;   /*** BEGIN 2ND "IF-THEN" ***/
1113   5              Already_Read = 0;
1114   5            END;   /*** END 2ND "IF-THEN" ***/
1115   4          ELSE
                   DO;   /*** BEGIN 2ND "IF-THEN" ***/
1116   5              Already_Read = Already_Read + Bytes_Read;
1117   5            END;   /*** END 2ND "IF-THEN" ***/
1118   4        END;   /*** END 2ND "DO-WHILE" ***/
1119   3        Already_Read = 4;
1120   3        Left_To_Read = 16;
1121   3        DO WHILE (Already_Read < 16);
1122   4          Left_To_Read = Left_To_Read - Already_Read;
1123   4          Bytes_Read = RQ$S$READ$MOVE(T2_Conn,
                                 @Receive_Buf.Check_Bytes(Already_Read),
                                 Left_To_Read,           /*** SIZE OF BUFFER SENT BY "GET
            -SIG" ***/
                                 @Status);
1124   4          IF (Status <> E$OK) THEN
1125   4            DO;   /*** BEGIN 2ND "IF-THEN" ***/
1126   5              Stay_In_Loop = 0;
1127   5              Dword_Var = DOUBLE(Status);
1128   5              CALL Movb(@('Status from 14-byte READ$MOVE = '),@Err_Msg,32);
1129   5              Bytes_Written = RQ$S$WRITE$MOVE(Lprt_Conn,@Err_Msg,80,@Status);
1130   5              CALL Setb(' ',@Err_Msg,78);
1131   5            END;   /*** END 2ND "IF-THEN" ***/
1132   4          Already_Read = Already_Read + Bytes_Read;
1133   4        END;   /*** END 2ND "DO-WHILE" ***/
1134   3        CALL Check_Data;
1135   3        Stay_In_Loop = 1;
1136   3        DO WHILE (Stay_In_Loop = 1);
1137   4          Already_Read = 0;
1138   4          Left_To_Read = 16;
1139   4          Left_To_Read = Left_To_Read - Already_Read;
1140   4          Bytes_Read = RQ$S$READ$MOVE(T2_Conn,
                                 @Receive_Buf.Check_Bytes(Already_Read),
                                 Left_To_Read,           /*** SIZE OF BUFFER SENT BY "GET
            -SIG" ***/
                                 @Status);
1141   4          IF (Status <> E$OK) THEN
1142   4            DO;   /*** BEGIN 2ND "IF-THEN" ***/
1143   5              Continue = 0;
1144   5              Dword_Var = DOUBLE(Status);
1145   5              CALL Movb(@('Status from 14-byte READ$MOVE = '),@Err_Msg,32);
1146   5              Bytes_Written = RQ$S$WRITE$MOVE(Lprt_Conn,@Err_Msg,80,@Status);
1147   5              CALL Setb(' ',@Err_Msg,78);
1148   5            END;   /*** END 2ND "IF-THEN" ***/
1149   4          Already_Read = Already_Read + Bytes_Read;
1150   4          IF (Receive_Buf.Check_Bytes(0) <> 0) OR
                     (Receive_Buf.Check_Bytes(1) <> 0) OR
                     (Receive_Buf.Check_Bytes(2) <> 0) OR
                     (Receive_Buf.Check_Bytes(3) <> 0) THEN
1151   4            DO;   /*** BEGIN 2ND-LEVEL "ELSEIF" ***/
1152   5              CALL Clear_Buff;
1153   5              CALL Movb(
            @('Packet not in sync...some data will be lost.  Packet received:'),@Err_Msg,62);
1154   5              Bytes_Written = RQ$S$WRITE$MOVE(Lprt_Conn,@Err_Msg,80,@Status);
1155   5              CALL Setb(' ',@Err_Msg,78);
                      /*** NEXT 29 LINES ADDED TO DISPLAY BAD DATA READ FROM PORT "T1" ***/
1156   5              CALL Byte_Ascii(Receive_Buf.Check_Bytes(0),@Err_Msg(0),4,@Status);
1157   5              CALL Movb(@('*'),@Err_Msg(4),1);
```

```
1158   5              CALL Byte_Ascii(Receive_Buf.Check_Bytes(1),@Err_Msg(5),4,@Status);
1159   5              CALL Movb(@('*'),@Err_Msg(9),1);
1160   5              CALL Byte_Ascii(Receive_Buf.Check_Bytes(2),@Err_Msg(10),4,@Status);
1161   5              CALL Movb(@('*'),@Err_Msg(14),1);
1162   5              CALL Byte_Ascii(Receive_Buf.Check_Bytes(3),@Err_Msg(15),4,@Status);
1163   5              CALL Movb(@('*'),@Err_Msg(19),1);
1164   5              CALL Byte_Ascii(Receive_Buf.Check_Bytes(4),@Err_Msg(20),4,@Status);
1165   5              CALL Movb(@('*'),@Err_Msg(24),1);
1166   5              CALL Byte_Ascii(Receive_Buf.Check_Bytes(5),@Err_Msg(25),4,@Status);
1167   5              CALL Movb(@('*'),@Err_Msg(29),1);
1168   5              CALL Byte_Ascii(Receive_Buf.Check_Bytes(6),@Err_Msg(30),4,@Status);
1169   5              CALL Movb(@('*'),@Err_Msg(34),1);
1170   5              CALL Byte_Ascii(Receive_Buf.Check_Bytes(7),@Err_Msg(35),4,@Status);
1171   5              CALL Movb(@('*'),@Err_Msg(39),1);
1172   5              CALL Byte_Ascii(Receive_Buf.Check_Bytes(8),@Err_Msg(40),4,@Status);
1173   5              CALL Movb(@('*'),@Err_Msg(44),1);
1174   5              CALL Byte_Ascii(Receive_Buf.Check_Bytes(9),@Err_Msg(45),4,@Status);
1175   5              CALL Movb(@('*'),@Err_Msg(49),1);
1176   5              CALL Byte_Ascii(Receive_Buf.Check_Bytes(10),@Err_Msg(50),4,@Status);
1177   5              CALL Movb(@('*'),@Err_Msg(54),1);
1178   5              CALL Byte_Ascii(Receive_Buf.Check_Bytes(11),@Err_Msg(55),4,@Status);
1179   5              CALL Movb(@('*'),@Err_Msg(59),1);
1180   5              CALL Byte_Ascii(Receive_Buf.Check_Bytes(12),@Err_Msg(60),4,@Status);
1181   5              CALL Movb(@('*'),@Err_Msg(64),1);
1182   5              CALL Byte_Ascii(Receive_Buf.Check_Bytes(13),@Err_Msg(65),4,@Status);
1183   5              Bytes_Written = RQ$S$WRITE$MOVE(Lprt_Conn,@Err_Msg,80,@Status);
1184   5              Bytes_Written = RQ$S$WRITE$MOVE(T1_Conn,@Err_Msg,80,@Status);
1185   5              CALL Setb(' ',@Err_Msg,78);
1186   5          END;  /*** END 2ND-LEVEL "ELSEIF" ***/
1187   4        ELSE
                    DO;  /*** BEGIN 2ND "ELSE" ***/
1188   5            CALL Check_Data;
1189   5          END;  /*** END 2ND "ELSE" ***/
1190   4       END;  /*** END 2ND "DO-WHILE" ***/
1191   3     END;  /*** END "DO FOREVER" & 1st "IF-THEN" ***/

1192   2   END Receive_Data;

/***************************************/
           /*** ===> BELOW IS FOR TESTING ONLY ***/
           /***************************************/
1193   1   DO WHILE 1;
1194   2       CALL Receive_Data;
1195   2   END;

1196   1   END Prthit;
```

MODULE INFORMATION:

CODE AREA SIZE     = 2441H    9281D
    CONSTANT AREA SIZE = 064AH    1610D
    VARIABLE AREA SIZE = 53A3H   21411D
    MAXIMUM STACK SIZE = 0022H      34D
    2528 LINES READ
    0 PROGRAM WARNINGS
    0 PROGRAM ERRORS

DICTIONARY SUMMARY:

498KB MEMORY AVAILABLE
    27KB MEMORY USED    (5%)
    0KB DISK SPACE USED

END OF PL/M-86 COMPILATION

What is claimed is:

1. A method for continuous pattern recognition of broadcast segments, each of said segments having at least one of an audio portion and a video portion, said method comprising:

constructing a digital signature from a known sample of a segment to be reconcgnized by digitally parametizing said segment, selecting frames from among random frame locations throughout said parametized segment in accordance with a set of predefined rules to form said signature, and associating with said signature the locations of said selected frames relative to a reference location;

storing said signature and said associated frame locations in a library of signatures, each signature in said library being identified with a particular segment to be recognized;

monitoring a broadcast signal;

digitally parametizing said monitored signal; and for each frame of said parametized monitored signal, searching said library for signatures potentially associated therewith and, using the frame location information associated with said potentially associated stored signatures, comparing each of said potentially associated stored signatures to the appropriate frames of said parametized monitored signal.

2. The method of claim 1 wherein each of said segments has at least a video portion and said signatures and parametized signals are derived from the video portion of said segments and said monitored signal.

3. The method of claim 1 wherein each of said segments has an audio portion and a video portion and said signatures and parametized signals are derived from both the audio and video portions of said segments and said monitored signals.

4. The method of claim 2 wherein said signatures and said parametized signals are derived from the luminance of said video portion.

5. The method of claim 4 wherein said signature and said parametized signals each comprise a plurality of digital words, each digital word of said signature and said parametized signals being derived by comparing the average luminances of selected areas of a frame of said segment to the average luminance of at least one reference area, each of said selected areas providing a bit of said digital word.

6. The method of claim 5 wherein said selected areas are asymmetrically spaced about the center of said frame.

7. The method of claim 5 wherein said at least one reference area is said entire frame.

8. The method of claim 5 wherein said at least one reference area is, for each of said selected areas, a different preselected area of said frame.

9. The method of claim 5 wherein said at least one reference area is, for each of said selected areas, the corresponding area of a previous frame.

10. The method of claim 5 wherein said at least one reference area is, for each of said selected areas, a different preselected area of a previous frame.

11. The method of claim 3 wherein said signatures and said parametized signals are derived at least in part from the frequency spectrum of said audio portion.

12. The method of claim 11 wherein said signature and said parametized signals each comprise a plurality of digital words, each digital word of said signatures and said paramatized signals being derived by comparing selected frequency bands of said audio portion to at least one reference band, each of said selected bands providing a bit of said digital word.

13. The method of claim 1 further comprising reducing the amount of data on which said searching step is performed.

14. The method of claim 13 wherein said data reduction step comprises associating a digital word representing a designated frame of each of said segments with the signature of said segment, said association being nonexclusive, said searching step comprising, for each digital word in said parametized monitored signal, searching said library for any stored signature for which said digital word represents said designated frame.

15. A method of continous pattern recognition of broadacst segments, each of said segments having at least one of an audio portion and a video portion, said method comprising:

constructing a digital signature from a known sample of a segment to be recognized by digitally parametizing said segment to form a string of digital words, each of said words representing one frame of said segment, identifying a word representing a designated frame in said segment, the association with said segment of the word representing said designated frame being nonexclusive, selecting a plurality of additional frames from among random frame locations throughout said segment in accordance with a set of predefined rules, and storing in a library of signatures the digital words representing said designated frame and said additional frames along with information representing the offsets of said additional frames relative to said designated frame;

monitoring a broadcast signal;

digitally parametizing said monitored signal into a string of digital words; and for each monitored digital word of said parametized monitored signal, searching said library for any signature for which said word represents said designated frame, and comparing the additional words of any such signature with the words of said parametized monitored signal at said offsets relative to said monitored digital word.

16. The method of claim 15 wherein each of said segments has at least a video portion and said signatures and parametized signals are derived from the video portion of said segments and said monitored signal.

17. The method of claim 15 wherein each of said segments has an audio portion and a video portion and said signatures and parametized signals are derived from both the audio and video portions of said segments and said monitored signals.

18. The method of claim 16 wherein said signatures and said parametized signals are derived from the luminance of said video portion.

19. The method of claim 18 wherein each digital word of said signature and said parametized signals is derived by comparing the average luminances of selected areas of a frame of said segment to the average luminance of at least one reference area, each of said selected areas providing a bit of said digital word.

20. The method of claim 19 wherein said selected areas are asymmetrically spaced about the center of said frame.

21. The method of claim 19 wherein said at least one reference area is said entire frame.

22. The method of claim 19 wherein said at least one reference area is, for each of said selected areas, a different preselected area of said frame.

23. The method of claim 19 wherein said at least one reference area is, for each of said selected areas, the corresponding area of a previous frame.

24. The method of claim 19 wherein said at least one reference area is, for each of said selected areas, a different preselected area of a previous frame.

25. The method of claim 17 wherein said signatures and said parametized signals are derived at least in part from the frequency spectrum of said audio portion.

26. The method of claim 25 wherein each digital word of said signatures and said parametized signals are derived by comparing selected frequency bands of said audio portion to at least one reference band, each of said selected bands providing one bit of said digital word.

27. Apparatus for continuous pattern recognition of broadcast segments, each of said segments having at least one of an audio portion and a video portion, said apparatus comprising:
   means for constructing a digital signature from a known sample of a segment to be recognized by digitally parametizing said segments, selecting frames from among random frame locations throughout said parametized segment in accordance with a set of predefined rules to form said signature, and associating with said signature the locations of said selected frames relative to a reference location;
   means for storing a library of signatures and associated frame locations, each signature in said library being identified with a particular segment to be recognized;
   means for monitoring a broadcast signal;
   means for digitally parametizing said monitored signal; and
   means for searching said libary for signatures potentially associated with each frame of said parametized monitored signal and, using the frame location information associated with said potentially associated stored signatures, for comparing each of said potentially associated stored signatures to the appropriate frames of said parametized monitored signal.

28. The apparatus of claim 27 wherein each of said segments has at least a video portion and said constructing means operates on the video portion of said segment.

29. The apparatus of claim 27 wherein each of said segments has an audio portion and a video portion and said constructing means operates on both the audio and video portions of said segment.

30. Apparatus for continuous pattern recognition of broadcast segments, each of said segments haing at least one of an audio portion and a video portion, said apparatus comprising:
   means for constructing a digital signature from a known sample of a segment to be identified by digitally parametizing said segment to form a string of digital words, each of said words representing one frame of said segment, identifying a word representing a designated frame in said segment, the association with said segment of the word representing said designated frame being nonexclusive, selecting a plurality of additional frames from among random frame locations throughout said segment in accordance with a set of predefined rules, and storing in a library of signatures the digital words representing said designated frame and said additional frames along with the offsets of said additional frames relative to said designated frame;
   means for monitoring a broadcast signal;
   means for digitally parametizing said monitored signal; and
   means for searching said library for any signature for which any monitored digital word represents said designated frame and comparing the additional words of any such signature with the words of said parametized monitored signal at said offsets relative to said monitored digital word.

31. The apparatus of claim 30 wherein each of said segments has at least a video portion and said constructing means operates on the video portion of said segment.

32. The apparatus of claim 30 wherein each of said segments has an audio portion and a video portion and said constructing means operates on both the audio and video portions of said segment.

33. A system for continuous pattern recognition of broadcast segments, each of said segments having at least one of an audio portion and a video portion, said system comprising:
   means for constructing a digital signature from a known sample of a segment to be recognized by digitally parametizing said segments, selecting frames from among random frame locations throughout said parametized segment in accordance with a set of predefined rules to form said signature, and associating with said signature the locations of said selected frames relative to a reference location;
   means for storing a library of signatures and associated frame locations, each signature in said library being identified with a particular segment to be recognized;
   means for monitoring a broadcast signal;
   means for digitally parametizing said monitored signal;
   means for searching said library for signatures potentially associated with each frame of said parametized monitored signal and, using the frame location information associated with said potentially associated stored signatures, for comparing each of said potentially associated stored signatures to the appropriate frames of said parametized monitored signal;
   means for detecting, in said monitored signal, the occurrence of artifacts characteristic of potential unknown segments to be recognized; and
   means for classifying and identifying said potential unknown segments.

34. The system of claim 33 further comprising:
a plurality of local sites, each of said sites located in a different geographic region for monitoring broadcast signals in said region;
a central site; and
a communications network linking said central site and said plurality of local sites; wherein:
each of said local sites maintains a local library of segment signatures applicable to broadcast signals in its geographic region, each of said local sites having at least said storing means, said monitoring means, said searching means, said comparing means, and said detecting means;

said central site has said constructing means and maintains a global library containing all of the information in all of said local libraries; and said classifying and identifying means comprises:

means at each of said local sites for generating compressed audio and video information, a temporary digital signature, and parametized monitored signal information for a potential unknown segment not found in the respective local library and for transmitting at least said parametized monitored signal information and said temporary digital signature for a potential unknown segment via said communications network to said central site;

means at said central site for searching and comparing signatures stored in said global library with said transmitted parametized montiored signal information;

means at said central site for grouping together like potential unknown segments received by said central site from said local sites and not found in said global library;

means at said central site for requesting at least one of said compressed audio and video information for at least one of said grouped potential unknown segments and for allowing an operator to play back said at least one of said audio and video information to classify said segment and to instruct said constructing means to automatically construct a signature for said segment; and means for adding said signature constructed by said constructing means at said central site to said global library and for transmitting it via said commmunciations network to said local libraries.

35. The system of claim 34 wherein said grouping means comprises:

means for comparing the temporary digital signatures of other potential unknown segments to a parametized potential unknown segment;

for all potential unknown segments matching a given temporary digital signature, means for temporally aligning the parametized monitored signal information of said segments; and means for constructing a best fit to said aligned parametized monitored signal information.

36. The system of claim 34 further comprising means for transmitting from each of said local sites to said central site information concerning the occurrence of broadcast segments and means at said central site for logging said information.

37. The system of claim 36 further comprising means at said local site for storing the temporary digital signature of a potential unknown segment and for logging the occurrences of said potential unknown segment based on said stored temporary signature, and means for transmitting said log information to said central site after said central site has identified said potential unknown segment.

38. For use in a system for continuous pattern recognition of broadcast segments, each of said segments having at least one of an audio portion and a video portion, said system including:

a plurality of local sites, each of said sites located in a different geographic region for monitoring broadcast signals in said region;
a central site; and
a communications network linking said central site and said plurality of local sites;
each of said local sites maintaining a local library of segment signatures applicable to broadcast signals in its geographic region and having at least means for monitoring a broadcast signal, means for searching said local library for any signature potentially associated with each frame of said parametized monitored signal and for comparing said signatures to said parametized monitored signal, and means for detecting, in said monitored signal, the occurrence of artifacts characteristic of potential unknown segments to be recognized; and said central site maintaining a global library containing all of the information stored in all of said local libraries; the method of classifying and identifying said potental unknown segments, said method comprising:

parametizing at one of said local sites said potential unknown segment;

constructing at said local site a temporary digital signature for said potential unknown segment;

generating at said local site compressed digitized audio and video information for said potential unknown segment;

transmitting said parametized unknown segment and said temporary digital signature, and, as determined by said central site at least one of said compressed audio and video information from said local site to said central site;

comparing the signatures in said global library to said parametized unknown segment to determine if said unknown segment was previously received by another of said local sites and if so replacing said temporary signature at said local site with an appropriate global signature;

grouping together like unknown segments received from several local sites;

allowing an operator to play back said at least one of said compressed audio and video information to identify said unknown segments;

constructing a new global signature for said identified segment;

transmitting said new global signature to those of said local sites for which it is appropriate.

39. The method of claim 38 wherein said grouping step comprises:

comparing the temporary digital signatures of other potential unknown segments to a parametized potential unknown segment;

for all potential unknown segments matched by a given temporary digital signature, temporally aligning the parametized signal information of said segments; and constructing a best fit to said aligned parametized signal information.

40. The method of claim 39 wherein said step of constructing a best fit comprises polling each bit position of such aligned parametized signal information and assigning to the corresponding bit position of said best fit the value of the majority of parametized segments in said bit location.

41. The method of claim 38 further comprising confirming said new global signature by testing said new global signature against each potential unknown segment in said group.

42. A method for continuous patern recognition of broadcast segments, each of said sgements having at least one of an audio portion and a video portion and further having a first portion that is the same each time the segment is broadcast and a second portion that may differ each time the segment is broadcast, said method comprising:

constructing a signature from a known sample of the first portion of such a segment to be recognized;

recording additional data from known samples of said second portion;

storing said signature and said additional data;

associating with said stored signature an indication of the existence of said second portion;

monitoring a broadcast signal;

identifying the first portion of a broadcast segment in said monitored broadcast signal with said signature; and using said additional data to identify the second portion of said broadcast segment.

43. The method of claim 42 wherein:

said step of recording additional data comprises constructing a second signature for said second portion; and said using step comprises identifying the second portion of said broadcast segment with said second signature.

44. The method of claim 42 wherein:

each of said segments has at least a video portion and said step of recording additonal data comprises recording at least one video frame of said second portion; and said using step comprises performing a direct comparision of said at least one video frame and at least one video frame of said monitored broadcast signal.

45. Apparatus for continuous pattern recognition of broadcast segments, each of said segments having at least one of an audio portion and a video portion, and having a first portion that is the same each time the segment is broadcast and a second portion that may differ each time the segment is broadcast, said apparatus comprising:

means for construction a signature from a known sample of the first portion of such a segment to be recognized;

means for recording additional data from known samples of said second portion;

means for storing said signature and said additional data;

means for associating with said stored signature an indication of the existence of said second portion;

means for monitoring a broadcst signal;

means for identifying the first portion of a broadcast segment in said monitored broadcast signal with said signature; and means for using said additional data to identify the second portion of said broadcast segment.

46. The apparatus of claim 45 wherein:

said recording means comprises means for constructing a second signature for said second portion; and said using means comprises means for identify the second portion of said broadcast segment with said second signature.

47. The apparatus of claim 45 wherein:

each of said segments has at least a video poriton and said recording means comprises means for recording at least one video frame of said second portion; and said using means comprises means for performing a direct comparison of said at least one video frame and at least one video frame of said monitored broadcast signal.

* * * * *

UNITED STATES PATENT AND TRADEMARK OFFICE
CERTIFICATE OF CORRECTION

PATENT NO. : 4,739,398

DATED : April 19, 1988

INVENTOR(S) : William L. Thomas et al.

It is certified that error appears in the above-identified patent and that said Letters Patent is hereby corrected as shown below:

Column 3, line 11, after "4B" should be inserted
-- (hereinafter referred to collectively as FIG. 4) --;

line 13, after "5C" should be inserted
-- (hereinafter referred to collectively as FIG. 5) --;

line 15, after "6B" should be inserted
-- (hereinafter referred to collectively as FIG. 6) --;

line 17, after "7B" should be inserted
-- (hereinafter referred to collectively as FIG. 7) --.

Column 15, line 4, "matching" (second occurrence) should be deleted.

Columns 81-82 (second occurrence of each) should be deleted.

Column 97, after line 23, should be inserted
-- Appendix C --.

Column 123, after line 13, should be inserted
-- Appendix D --.

Claim 30, line 2, "haing" should be -- having --.

Claim 34, line 29, "monitiored" should be -- monitored --.

Claim 38, line 6, "monitioring" should be -- monitoring --.

UNITED STATES PATENT AND TRADEMARK OFFICE
CERTIFICATE OF CORRECTION

PATENT NO. : 4,739,398

DATED : April 19, 1988

INVENTOR(S) : William L. Thomas et al.

It is certified that error appears in the above-identified patent and that said Letters Patent is hereby corrected as shown below:

Claim 42, line 1, "patern" should be -- pattern --;

line 2, "sgements" should be -- segments --.

Claim 45, line 8, "construction" should be -- constructing --;

line 17, "broadcst" should be -- broadcast --.

Claim 46, line 4, "identify" should be -- identifying --.

Claim 47, line 2, "poriton" should be -- portion --.

Signed and Sealed this

Twenty-ninth Day of November, 1988

*Attest:*

DONALD J. QUIGG

*Attesting Officer*  *Commissioner of Patents and Trademarks*